United States Patent
Kim et al.

(10) Patent No.: US 11,902,626 B2
(45) Date of Patent: *Feb. 13, 2024

(54) CONTROL METHOD OF PLAYING CONTENT AND CONTENT PLAYING APPARATUS PERFORMING THE SAME

(71) Applicant: SAMSUNG ELECTRONICS CO., LTD., Suwon-si (KR)

(72) Inventors: Hyun-jee Kim, Seoul (KR); Won-keun Kong, Suwon-si (KR); Nam-suk Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 121 days.

This patent is subject to a terminal disclaimer.

(21) Appl. No.: 17/124,294

(22) Filed: Dec. 16, 2020

(65) Prior Publication Data

US 2021/0105535 A1   Apr. 8, 2021

Related U.S. Application Data

(63) Continuation of application No. 14/783,228, filed as application No. PCT/KR2015/002537 on Mar. 16, 2015, now Pat. No. 10,887,654.

(30) Foreign Application Priority Data

Mar. 16, 2014 (KR) .................. 10-2014-0030675
Jul. 31, 2014 (KR) .................. 10-2014-0098586

(51) Int. Cl.
*H04N 21/418* (2011.01)
*H04N 21/442* (2011.01)
(Continued)

(52) U.S. Cl.
CPC ..... *H04N 21/4751* (2013.01); *H04N 21/4182* (2013.01); *H04N 21/4223* (2013.01);
(Continued)

(58) Field of Classification Search
CPC ......... H04N 21/4182; H04N 21/42201; H04N 21/4415; H04N 21/4532; H04N 21/475; H04N 21/4751; H04N 21/44218
See application file for complete search history.

(56) References Cited

U.S. PATENT DOCUMENTS 7,134,130 B1 * 11/2006 Thomas ................. H04N 7/163
725/25
8,836,530 B1   9/2014 Bowers
(Continued)

FOREIGN PATENT DOCUMENTS

CN   101690181   3/2010
JP   2011-205353   10/2011
(Continued)

OTHER PUBLICATIONS

Notification of Due Registration Formalities and Notification of Granting of Patent Right to Invention dated Feb. 2, 2021 in counterpart Chinese Patent Application No. 201580014504.1 and English-language translation.
(Continued)

*Primary Examiner* — Pinkal R Chokshi
(74) *Attorney, Agent, or Firm* — Nixon & Vanderhye, P.C.

(57) ABSTRACT

An example content playing apparatus includes an output unit configured to output an image and voice; a user recognition unit configured to recognize a plurality of users viewing content played by the output unit; and a controller configured to select at least one of the plurality of users
(Continued)

based on predetermined criteria and control playing of the content according to the at least one selected user.

15 Claims, 60 Drawing Sheets

(51) Int. Cl.
*H04N 21/475* (2011.01)
*H04N 21/45* (2011.01)
*H04N 21/454* (2011.01)
*H04N 21/422* (2011.01)
*H04N 21/4415* (2011.01)
*H04N 21/4223* (2011.01)

(52) U.S. Cl.
CPC . *H04N 21/42201* (2013.01); *H04N 21/42203* (2013.01); *H04N 21/4415* (2013.01); *H04N 21/44218* (2013.01); *H04N 21/4532* (2013.01); *H04N 21/4542* (2013.01)

(56) References Cited

U.S. PATENT DOCUMENTS

| | | | |
|---|---|---|---|
| 9,288,387 B1* | 3/2016 | Keller | H04L 67/18 |
| 9,491,033 B1 | 11/2016 | Soyannwo | |
| 2003/0028875 A1 | 6/2003 | Piotrowski | |
| 2008/0092156 A1* | 4/2008 | Ferrone | H04N 21/44218 725/13 |
| 2008/0271078 A1 | 10/2008 | Gossweiler et al. | |
| 2008/0317346 A1 | 12/2008 | Taub | |
| 2009/0133051 A1* | 5/2009 | Hildreth | H04N 21/4223 725/28 |
| 2009/0138805 A1 | 5/2009 | Hildreth | |
| 2010/0205628 A1 | 8/2010 | Davis | |
| 2011/0058028 A1* | 3/2011 | Sakai | G06K 9/00342 348/77 |
| 2011/0072452 A1 | 3/2011 | Shimy | |
| 2011/0237324 A1 | 9/2011 | Clavin | |
| 2011/0254846 A1 | 10/2011 | Lee | |
| 2013/0120243 A1 | 5/2013 | Kim | |
| 2013/0218885 A1 | 8/2013 | Satyanarayanan | |
| 2013/0219417 A1 | 8/2013 | Gilson | |
| 2013/0291123 A1 | 10/2013 | Rajkumar | |
| 2014/0067828 A1 | 3/2014 | Archibong | |
| 2014/0088952 A1 | 3/2014 | Fife | |
| 2014/0150002 A1 | 5/2014 | Hough | |
| 2014/0218461 A1 | 8/2014 | Deland | |
| 2014/0270243 A1 | 9/2014 | Bennett | |
| 2015/0089551 A1 | 3/2015 | Bruhn | |
| 2015/0120653 A1 | 4/2015 | Luo | |
| 2015/0127603 A1* | 5/2015 | Cohen | G06Q 10/101 707/608 |
| 2015/0237389 A1 | 8/2015 | Grouf | |
| 2016/0205426 A1* | 7/2016 | Fife | H04N 21/4826 725/14 |
| 2016/0219332 A1 | 7/2016 | Asbun | |

FOREIGN PATENT DOCUMENTS

| | | |
|---|---|---|
| KR | 10-2004-0004355 | 1/2004 |
| KR | 10-2006-0071173 | 6/2006 |
| KR | 10-2009-0083521 | 8/2009 |
| KR | 10-2010-0089349 | 8/2010 |
| KR | 10-2011-0023496 | 3/2011 |
| KR | 10-2012-0042314 | 5/2012 |
| KR | 10-2012-0051210 | 5/2012 |
| KR | 10-2014-0010673 | 1/2014 |

OTHER PUBLICATIONS

Notice of Non-Final Rejection dated Feb. 23, 2021 in counterpart Korean Patent Application No. 10-2016-7007420 and English-language translation.
International Search Report dated May 25, 2015 in counterpart International Patent Application No. PCT/KR2015/002537.
Written Opinion of the International Searching Authority in counterpart International Patent Application No. PCT/KR2015/002537.
Extended Search Report dated Jan. 26, 2017 in counterpart European Patent Application No. 15736370.6.
First Office Action dated Jul. 4, 2018 in counterpart Chinese Patent Application No. 201580014504.1 and English translation thereof.
Second Office Action dated Mar. 5, 2019 in counterpart Chinese Patent Application No. 201580014504.1 and English-language translation.
Office Action dated Sep. 10, 2019 in counterpart CN Patent Application No. 201580014504.1 and English-language translation.
Decision of rejection dated Mar. 5, 2020 in counterpart Chinese Patent Application No. 201580014504.1 and English-language machine translation of same.
Kim et al., U.S. Appl. No. 14/783,228, filed Oct. 8, 2015.

* cited by examiner

SKIP SOME SCENES AND CONTINUE
TO REPRODUCE CONTENT

MOSAIC PORTION OF SCENE

REPRODUCE SUBSTITUTE IMAGE

CERTAIN TIME PASSES

RECOGNIZE USERS AND SELECT ONE OF USERS

RECOGNIZE USERS AND SELECT ONE OF USERS AGAIN WHEN CERTAIN TIME PASSES

CONTROL METHOD OF PLAYING CONTENT AND CONTENT PLAYING APPARATUS PERFORMING THE SAME

CROSS-REFERENCE TO RELATED APPLICATIONS

This application is a continuation of U.S. application Ser. No. 14/783,228, filed on Oct. 8, 2015, now U.S. Pat. No. 10,887,654, which is a national stage application of International Patent Application No. PCT/KR2015/002537, filed on Mar. 16, 2015, which designates the United States, and which claims priority to Korean Patent Application No. 10-2014-0030675, filed Mar. 16, 2014, and to Korean Patent Application No. 10-2014-0098586, filed Jul. 31, 2014. The contents of each of these applications are incorporated herein in their entirety.

BACKGROUND AND SUMMARY

The inventive concept relates to a method of controlling playing of content viewed by a plurality of users and a content playing apparatus performing the method.

When it is assumed that users view the same content, for example, when the users watch TV at home, the content may include some inappropriate material for some of the users, or content that some of the users prefer not to watch may be played.

A method of controlling playing of content by taking into account users viewing the content is suggested to solve the above problems. Since criteria such as age, preference, etc. of each user differs for each user, it is necessary to find the most appropriate method of controlling playing of the content by taking into account the users based on predetermined criteria.

The inventive concept provides a method of controlling playing of content according to a plurality of users viewing the content when the plurality of users view the content together, and an apparatus therefor.

According to one or more exemplary embodiments, at least one user is selected based on predetermined criteria from among a plurality of users viewing the content, and content is played according to the at least one selected user.

Playing of content viewed by a plurality of users may be appropriately controlled.

DETAILED DESCRIPTION

Figure 1:
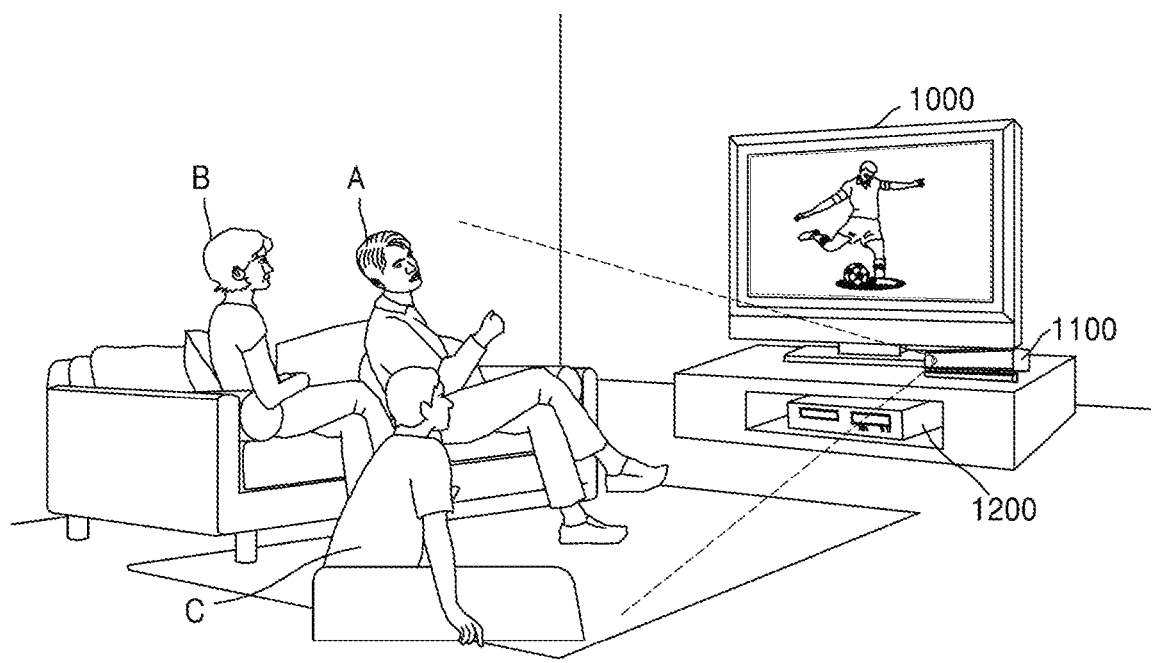
FIG. 1 shows an environment in which a method of controlling playing of content is implemented according to an exemplary embodiment.

According to one or more exemplary embodiments, there is provided a content playing apparatus including: an output unit configured to output an image and voice; a user recognition unit configured to recognize a plurality of users viewing content played by the output unit; and a controller configured to select at least one of the plurality of users based on predetermined criteria and control playing of the content according to the at least one selected user.

The user recognition unit may be configured to determine ages of the plurality of users based on at least one of faces, voices, and body shapes of the plurality of users, and the controller may be configured to select the youngest user from among the plurality of users and restrict playing of content which the youngest user is not allowed to view.

The controller may determine a viewing rating based on analysis of the content and compare the determined viewing rating against the age of the youngest user in order to determine whether the youngest user is allowed to view the content.

The user recognition unit may be configured to detect a change in the number of users viewing the content being played, and the controller may be configured to repeat the selection of at least one of the plurality of users when the number of users changes.

The controller may be configured to predict at least one additional user based on analysis of voices of the plurality of users viewing the content being played, the voices included in conversations between the plurality of users, and select at least one user from among the plurality of users and the predicted at least one additional user.

Based on changes to the content played through the output unit, the user recognition unit may be configured to repeat the recognition of the plurality of users viewing the content, and the controller may be configured to repeat the selection of at least one of the plurality of recognized users.

The user recognition unit may be configured to periodically recognize the plurality of users, and the controller may be configured to periodically select at least one of the plurality of users.

The user recognition unit may be configured to recognize activities of the plurality of users, and the controller may be configured to select at least one user performing a predetermined activity from among of the plurality of users and control playing of the content according to a preference of the at least one selected user.

The controller may be configured to display, on the output unit, a list of channels or a list of content preferred by the at least one selected user.

According to one or more exemplary embodiments, there is provided a method of controlling playing of content, the method including: recognizing a plurality of users viewing the content; selecting at least one of the plurality of users based on predetermined criteria; and controlling playing of the content according to the at least one selected user.

The recognizing may include determining ages of the plurality of users based on at least one of faces, voices, and body shapes of the plurality of users. The selecting may include selecting the youngest user from among the plurality of users. The controlling may include restricting playing of content which the youngest user is not allowed to view.

The controlling may include: determining a viewing rating based on analysis of the content; comparing the determined viewing rating against the age of the at least one selected user in order to determine whether the at least one selected user is allowed to view the content; and restricting playing of at least some pieces of the content if the youngest user is not allowed to view the pieces of the content.

The recognizing and the selecting may be performed whenever the number of users viewing the content changes.

The recognizing may include: predicting whether at least one additional user will view the content based on analysis of voices of the plurality of users in conversations between the plurality of users; and selecting at least one user from among the plurality of users and the predicted at least one additional user.

The recognizing and the selecting may be performed whenever the content being played changes.

The recognizing and the selecting may be periodically performed.

The recognizing may include recognizing activities of the plurality of users. The selecting may include selecting at least one user performing a predetermined activity from among the plurality of users. The controlling may include controlling playing of the content according to a preference of the at least one selected user.

The method may further include displaying, on a screen, a list of channels or pieces of content preferred by the at least one selected user.

The inventive concept will now be described more fully with reference to the accompanying drawings, in which exemplary embodiments of the inventive concept are shown. These exemplary embodiments are provided so that this disclosure will be thorough and complete, and will fully convey the concept of the inventive concept to those skilled in the art. Detailed description regarding features well known to one of ordinary skill in the art will be omitted.

FIG. 1 shows an environment in which a method of controlling playing of content is implemented according to an exemplary embodiment.

Referring to FIG. 1, users A, B, and C view content played by a display apparatus 1000. The display apparatus 1000 may be connected to a user recognition apparatus 1100 for recognizing a user who views the content and a content playing apparatus 1200 for controlling playing of the content.

The method of controlling the playing of the content is implemented when a plurality of users view the same content together. The display apparatus 1000 shown in FIG. 1 is a TV, but may be another apparatus, for example, a tablet computer, a smart phone, or a laptop, which has a display function. In this case, the content may include various types of information, for example, text, voice and sound (music), images, videos, broadcasts, applications, games, e-books, etc. The playing of the content means that videos, images or voices (music) of broadcasts are played, games or applications are executed, or content of e-books are displayed on a screen.

Since the content may include some material inappropriate for or not preferred by the users viewing the content, the playing of the content needs to be controlled by using a method of reprocessing the content when playing the content, of stopping playing of the content, of recommending content, or the like. When there are a plurality of users viewing the content, as shown in FIG. 1, there may be a problem regarding which user the playing of the content will be based on. In the present exemplary embodiment, the content playing apparatus 1200 selects at least one of the users according to predetermined criteria and controls playing of the content according to the selected user or users.

The criteria relate to demographic features of the users viewing the content, for example, a minimum age, gender, preference for content, relationship between the users, or the like.

The user recognition apparatus 1100 may recognize the users viewing the content. Recognition means that the existence of users is identified, or characteristics of the users are extracted and analyzed.

The content playing apparatus 1200 uses various pieces of user information obtained from recognition results of the users so as to select at least one of the users according to predetermined criteria and controls the playing of the content according to the selected user or users.

Detailed examples in which the content playing apparatus 1200 recognizes the users and obtains the user information are as follows. The content playing apparatus 1200 may recognize faces, body shapes, voices, etc. of the users via the user recognition apparatus 1100 and compare the same with the previously stored user information, and thus, the users may be identified or the ages, preference, etc. of the users may be checked. Alternatively, when no user information has been stored in advance, the content playing apparatus 1200 recognizes the faces, body shapes, voices, etc. of the users and may predict the ages, etc. of the users based on analysis of the recognized faces, body shapes, voices, etc. Alternatively, the content playing apparatus 1200 may recognize a user based on actions performed by the users. Detailed descriptions with regard to recognizing other users and obtaining user information will be provided below.

The content playing apparatus 1200 may select at least one of the users by using the user information obtained after the users are recognized. In this case, the users may be selected according to certain criteria. For example, the content playing apparatus 1200 may select the youngest user when age information of the users is obtained or a user who performs certain actions. In addition, the content playing apparatus 1200 may select users according to various criteria.

When a user is selected, the content playing apparatus 1200 may control playing of the content according to the selected user. The content playing apparatus 1200 may control playing of the content according to users by taking into account various criteria. For example, the content playing apparatus 1200 may control the playing of the content according to the ages of the users or to the preference of the users. If the youngest user is selected, the content playing apparatus 1200 compares the selected user against a viewing rating of the content in order to determine whether the selected user may view the content. If it is determined that the selected user is not allowed to view the content, some material included in the content is reprocessed so that harmful scenes are not displayed, or playing of the content may be stopped. Alternatively, when it is determined that a user in control of content selection (e.g., a user inputting commands via a remote control) is selected, the content playing apparatus 1200 may recommend a list of channels or content preferred by the selected user by simultaneously displaying the content and the list.

The content playing apparatus 1200 may select two or more users from among the plurality of users. When the two or more users are selected, the content playing apparatus 1200 may control the playing of the content by taking into account the ages or preference of the selected users.

Other exemplary embodiments, other than the above exemplary embodiment, may be implemented and will be described with reference to the drawings below.

According to one or more exemplary embodiments to be described below, processes of controlling playing of the content are performed by the content playing apparatus 1200. However, some or all of the processes may be performed by the display apparatus 1000 or another server. That is, the processes may be performed by various devices in accordance with structures of systems. Exemplary embodiments regarding the structures of the systems will be described with reference to FIGS. 51 to 58.

Figure 2:
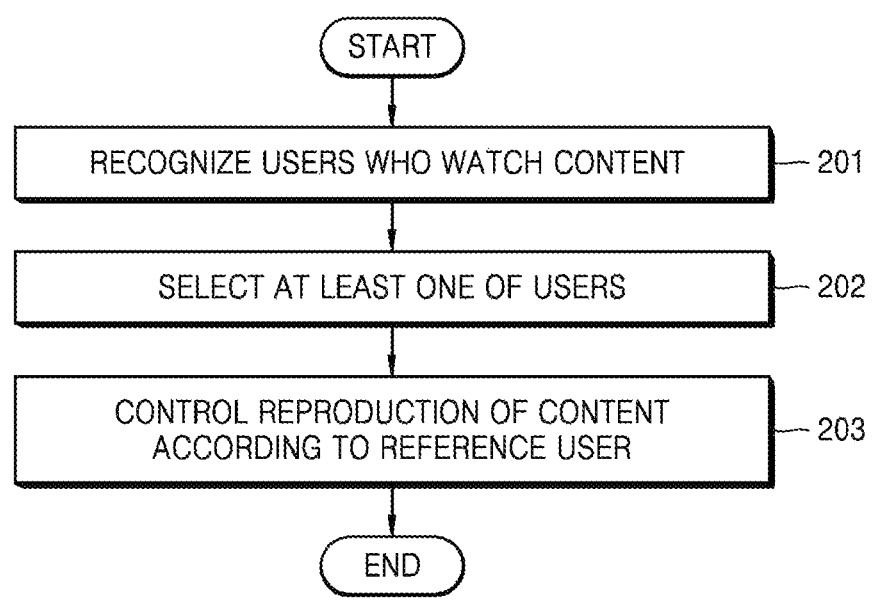
FIG. 2 is a flowchart of a method of controlling playing of content, according to an exemplary embodiment.

FIG. 2 is a flowchart of a method of controlling playing of content, according to an exemplary embodiment.

Referring to FIG. 2, a content playing apparatus recognizes a plurality of users viewing content in operation 201. In this case, the content playing apparatus may recognize faces, body shapes, voices, etc. of the users.

After the faces, body shapes, voices, etc. of the users are recognized, the content playing apparatus selects at least one of the users according to predetermined criteria in operation

202. For example, the content playing apparatus may select the youngest user or a user who performs a certain action.

In operation 203, the content playing apparatus controls playing of the content according to the selected user. For example, the content playing apparatus determines whether the selected user is allowed to view the content by comparing the age of the selected user against a viewing rating of the content. If the selected user is not allowed to view the content, the content playing apparatus may stop playing of the content or reprocess the content and display the reprocessed content on a screen.

Accordingly, the content playing apparatus recognizes users and selects at least one of the users according to predetermined criteria. Then, the content playing apparatus controls the playing of the content according to the selected user or users such that the content playing apparatus may control the playing of the content based on a plurality of users viewing the same content.

Figure 3:
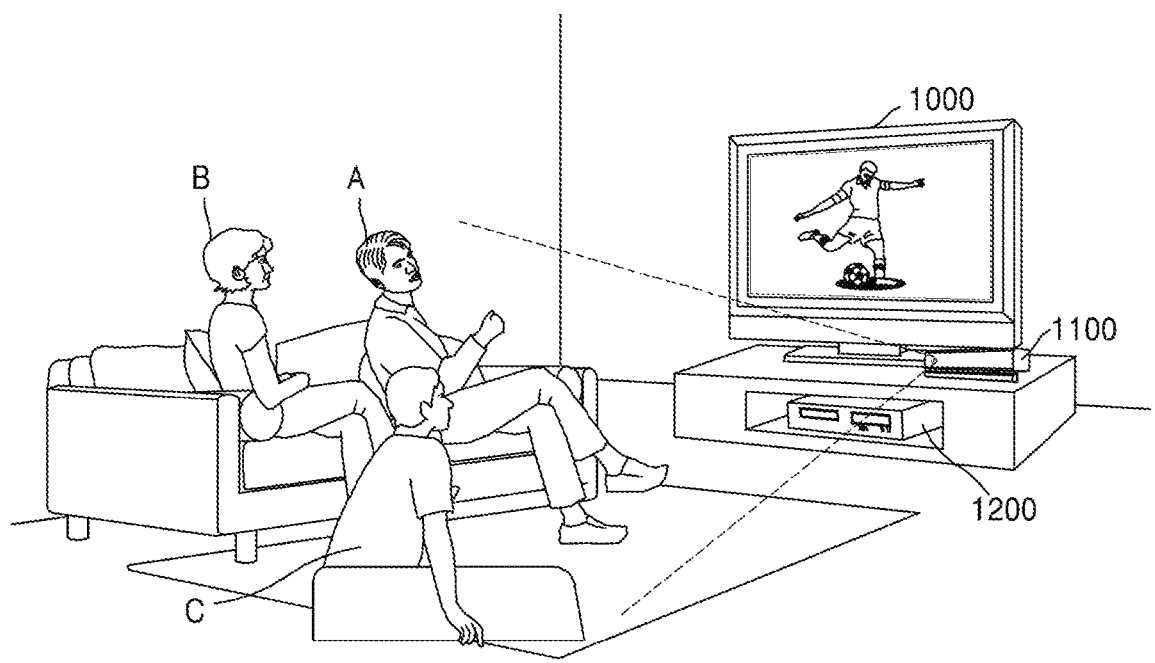
FIGS. 3, 4 and 5 are views for explaining a method of controlling playing of content, according to an exemplary embodiment, the method including selecting a youngest user according to previously stored age information of users.
Figure 4:
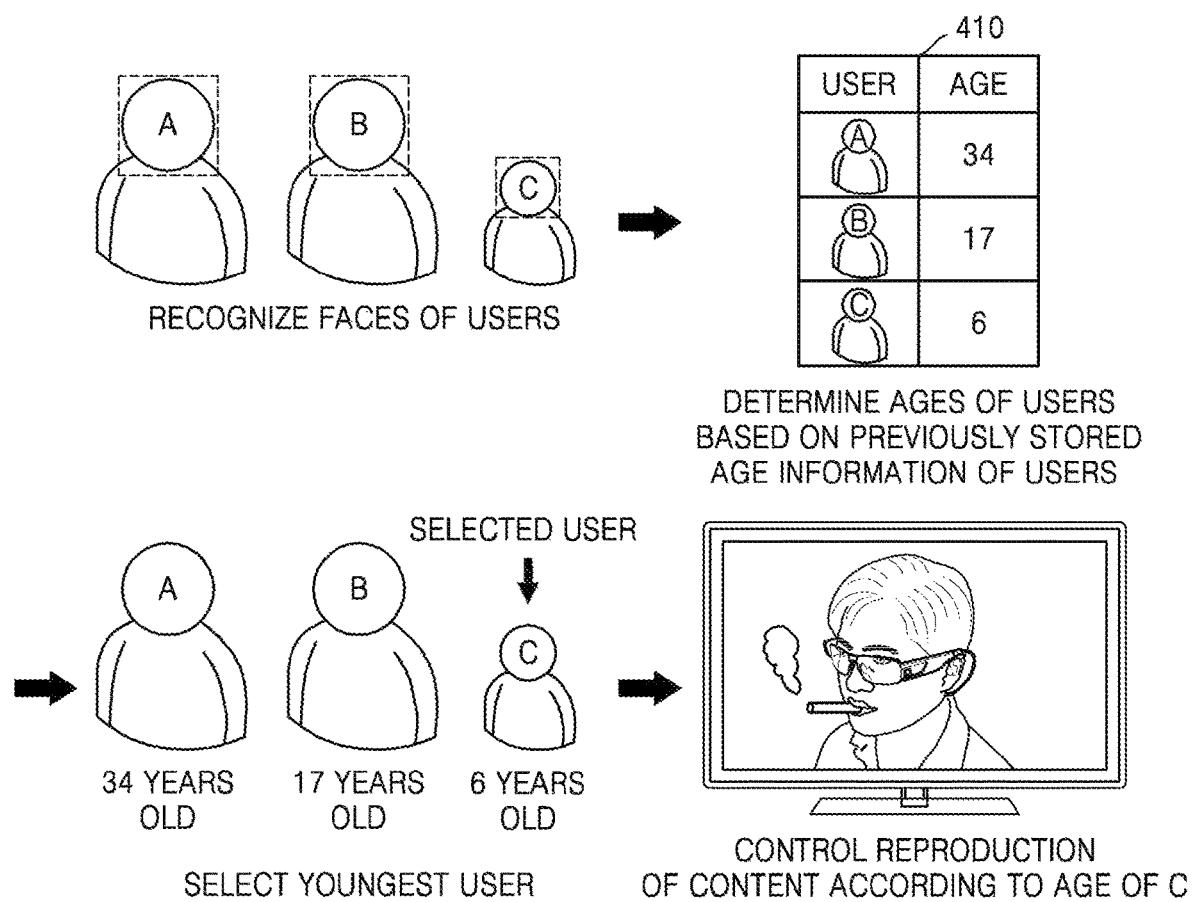
Figure 5:
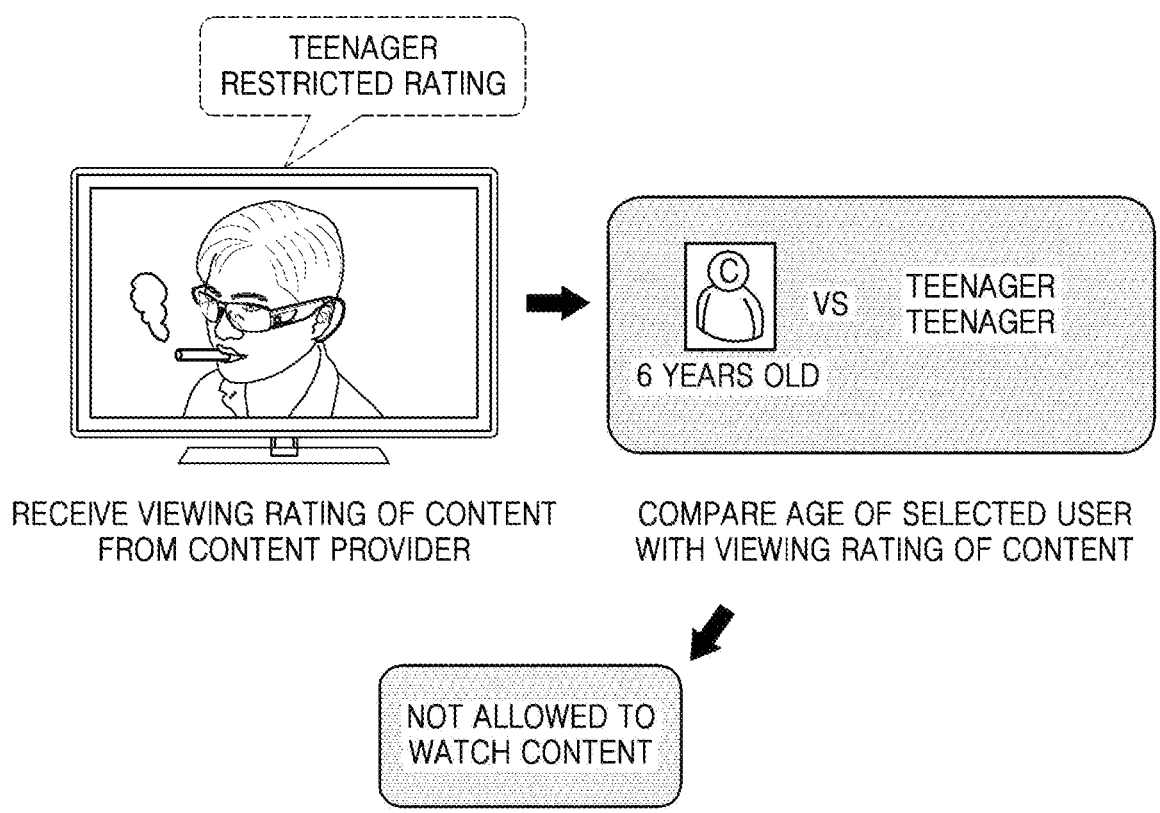

FIGS. 3 to 5 are views for explaining a method of controlling playing of content, according to an exemplary embodiment, the method including selecting a youngest user according to previously stored age information of users. Hereinafter, the method will be described in detail with reference to FIGS. 3 to 5.

Referring to FIG. 3, the users A, B, and C view content played by the display apparatus 1000. The user recognition apparatus 1100 recognizes the multiple users viewing the content. As shown in FIG. 3, the user recognition apparatus 1100 is a camera separated from the display apparatus 1000, but the user recognition apparatus 1100 may be embodied in different forms. For example, the user recognition apparatus 1100 may be a camera installed in a frame of the display apparatus 1000.

Referring to FIG. 4, the user recognition apparatus 1100 and the content playing apparatus 1200 perform facial recognition with regard to users viewing content. Since technology regarding facial recognition is well known, detailed descriptions thereof will be omitted. Briefly, facial recognition may be performed by capturing images of the users, identifying portions of faces of the users from the captured images, analyzing a symmetric facial structure, appearance, hair, colors of the eyes, movements of facial muscle, etc. of each user, and extracting characteristics of the users.

When facial recognition with regard to the users is completed, the content playing apparatus 1200 determines the ages of the users based on previously stored age information of the users. Age information of at least one user may be stored in a storage unit included in the content playing apparatus 1200 in advance. The age information of the users may be formatted such that the ages of the users are respectively mapped to the images of the users (see the table 410 of FIG. 4).

The content playing apparatus 1200 may compare the recognized faces of the users with the images thereof stored in a table 410 so as to determine the age of each user. Referring to the table 410 of FIG. 4, the content playing apparatus 1200 may determine that the users A, B, and C are 34 years old, 17 years old, and 6 years old, respectively.

FIG. 4 shows the user recognition apparatus 1100 and the content playing apparatus 1200 which determine the ages of users by recognizing the faces of the users. However, the user recognition apparatus 1100 and the content playing apparatus 1200 may recognize the body shapes, voices, or the like of the users and may determine the ages of the users by comparing the recognized body shapes, voices, or the like against the previously stored age information of the users. In this case, the age information of the users may be in a table form in which the ages of the users are mapped to information with regard to the body shapes, voices of the users.

Once the ages of the users have been determined, the content playing apparatus 1200 selects at least one of the users based on the ages of the users, according to the predetermined criteria. FIG. 4 shows the content playing apparatus 1200 selecting the youngest user, that is, the user C.

Once at least one of the users has been selected, the content playing apparatus 1200 controls the playing of the content according to the selected user. That is, the content playing apparatus 1200 controls the playing of the content according to the user C.

FIG. 5 shows playing of content based on a determination of whether the content is inappropriate for a selected user, in which the determination is based on a comparison of the age of the selected user and a viewing rating of the content. Referring to FIG. 5, the content playing apparatus 1200 receives the viewing rating of the content from a content provider and compares the received viewing rating with the age of the selected user, that is, the user C. The viewing rating received by the content playing apparatus 1200 from the content provider is a mature rating, and the user C, the selected user, is 6 years old. Thus, the content playing apparatus 1200 determines that the user C is not allowed to view the content.

If the content provider does not provide the viewing rating of the content, the viewing rating of the content may be determined based on an analysis of the content. For example, the viewing rating of the content may be determined by checking whether each image frame of the content includes material harmful to minors. In this case, analysis of the content and determination of a viewing rating may be performed by a cloud server or the content playing apparatus 1200. Alternatively, the viewing rating may also be determined when other users view the same content, and the viewing rating may be stored and later used.

Methods of determining a viewing rating of content based on an analysis of the content may vary. For example, the server or the content playing apparatus 1200 may determine whether each image frame of the content includes harmful material based on analysis of the image frames of the content or based on analysis of voices included in the content. In particular, according to the method of determining whether the image frames of the content includes harmful material based on analysis of the same, the server or the content playing apparatus 1200 recognizes objects included in each image frame of the content, and whether the recognized objects correspond to harmful objects such as knives, guns, or cigarettes. Alternatively, the server or the content playing apparatus 1200 recognizes body parts of a person from the image frames of the content and may determine whether any nudity is included in the image frames based on analysis of colors of the recognized body parts of the person. Furthermore, the analysis of the content and the determination of the viewing rating may be performed by using various methods.

Referring back to FIG. 5, since it is determined that the selected user is not allowed to view the content, the content playing apparatus 1200 may stop playing of the content or reprocess some material of the content in order to control the playing of the content, thereby preventing the selected user from being exposed to harmful material. FIGS. 6 to 13 show detailed examples in which playing of content is controlled by the content playing apparatus 1200.

FIGS. 6 to 13 are views for explaining various methods of controlling playing of content by a content playing apparatus when prohibited scenes are included, according to exemplary embodiments.

Figure 6:
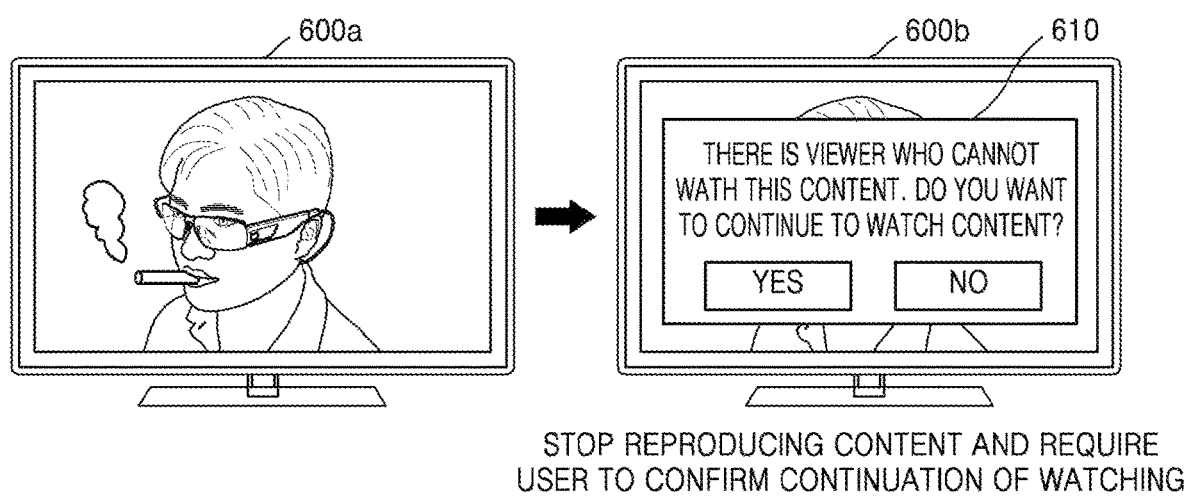
FIGS. 6, 7, 8, 9, 10, 11, 12 and 13 are views for explaining various methods of controlling playing of content by a content playing apparatus when prohibited scenes are included, according to exemplary embodiments.

Referring to FIG. 6, the content playing apparatus 1200 may stop playing of the content when it is determined that the selected user is not allowed to view the content and may display, on the display apparatus 1000, a pop-up message 610 which requests confirmation to continue playing of the content. Content is played normally on a first screen 600a of FIG. 6, and content is played in combination with the pop-up message 610 on a second screen 600b.

In this case, a message indicating the presence of a user who is not allowed to view content currently being played may be included in the pop-up message 610. Also, when a user inputs a selection to continue to view the content, the content playing apparatus 1200 displays, on the display apparatus 1000, a pop-up message which requires the user to enter a password. Once the user enters the correct password, the playing of the content may resume.

Figure 7:
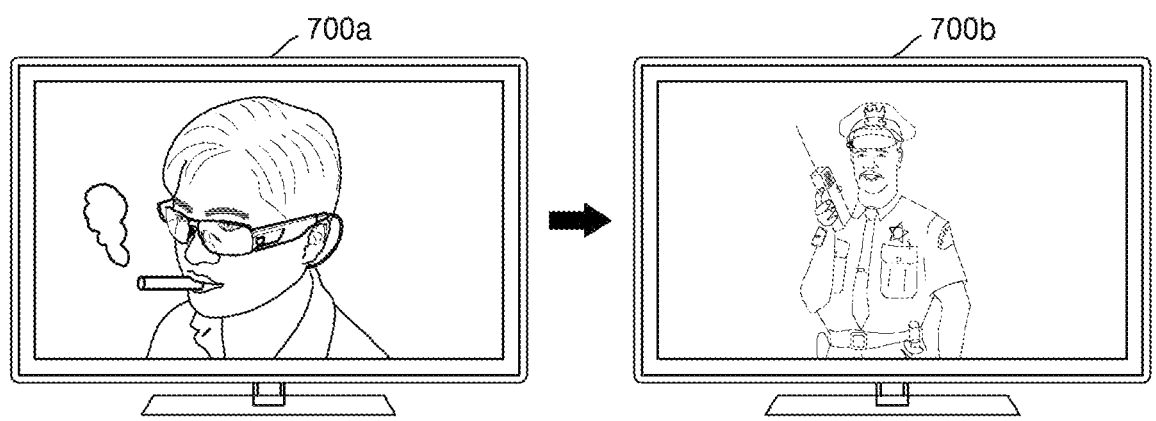

Referring to FIG. 7, the content playing apparatus 1200 may skip scenes including harmful material while the content is being played and then may continue playing of the content, starting from a subsequent scene. When a scene including harmful material (a smoking scene) is displayed on a first screen 700a of FIG. 7, the content playing apparatus 1200 controls the display apparatus 1000 to skip the scene and resume playing of the content, but without the harmful material.

To skip some scenes of content, a viewing rating of the content and information regarding whether harmful material is included in each scene of the content are necessary. The information may be provided by a content provider or may be obtained based on an analysis of the content performed by the server or the content playing apparatus 1200. The method of determining whether the harmful material is included in each scene of the content based on the analysis performed by the server or the content playing apparatus 1200 is the same as the method of determining whether harmful material is included in each image frame of the content based on analysis of the image frames of the content.

When the content of FIG. 7 corresponds to content stored in the content playing apparatus 1200 in advance, the content playing apparatus 1200 may skip some scenes and may immediately play subsequent scenes, without a temporal gap. However, when the content playing apparatus 1200 receives content from an external server in real time, there may be temporal gaps while some scenes are being skipped. Therefore, the content playing apparatus 1200 may display substitute images during the temporal gaps. For example, the content playing apparatus 1200 may display substitute images which are stored in advance or may display title information of the content, advertisements, or the like. Displaying the substitute images will be described in detail with reference to FIGS. 10 to 13.

Figure 8:
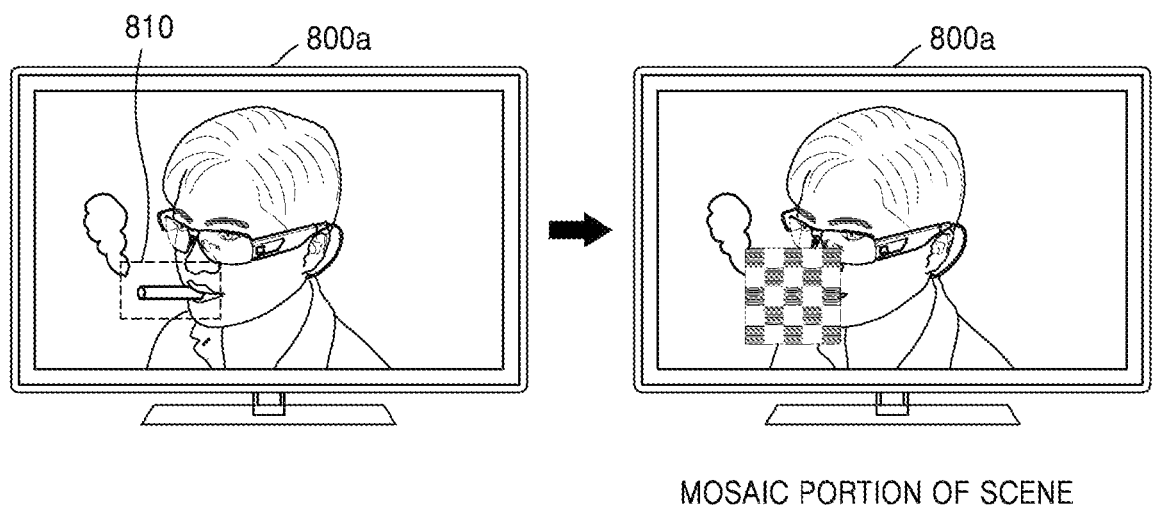

Referring to FIG. 8, the content playing apparatus 1200 may pixelate a portion of a scene being played, the portion corresponding to harmful material. Harmful material 810 is included in a first screen 800a of FIG. 8. Therefore, the content playing apparatus 1200 reprocesses the content in order to pixelate the harmful material displayed on the first screen 800a and may display, on the display apparatus 1000, the reprocessed content on a second screen 800b.

The content playing apparatus 1200 needs to identify which portion of an entire screen includes harmful material in order to pixelate only the portion including the harmful material. Thus, the content playing apparatus 1200 may use information provided by the content provider, may directly analyze the content, or may obtain information analyzed by a cloud server to use the obtained information. For example, the server or the content playing apparatus 1200 may recognize objects included in each image frame of the content and determine whether the included objects correspond to harmful material such as knives, guns, or cigarettes. If the harmful material is found, the content playing apparatus 1200 may pixelate portions corresponding to the harmful material on the entire screen.

Figure 9:
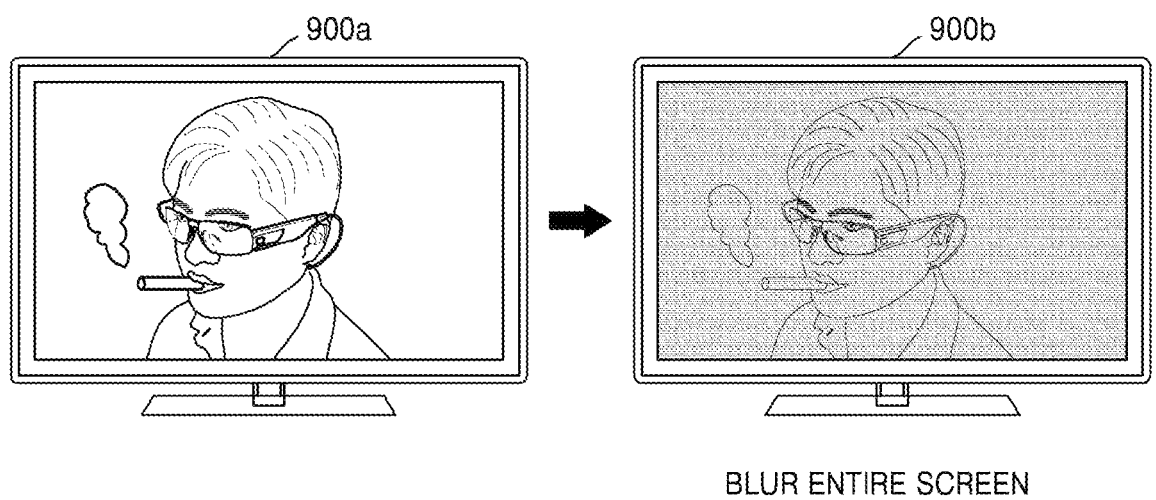

Referring to FIG. 9, the content playing apparatus 1200 may blur the entire screen when a scene includes harmful material while the content is being played. Content is played normally on a first screen 900a of FIG. 9, and blurred content is played on a second screen 900b.

The viewing rating of the content and information regarding whether harmful material is included in each scene of the content are used for determining whether to blur the entire screen. The information may be provided by the content provider or may be obtained based on an analysis of the content performed by the server or the content playing apparatus 1200. The method of determining whether the harmful material is included in each scene of the content based on the analysis performed by the server or the content playing apparatus 1200 is the same as the method of determining whether the harmful material is included in each image frame of the content based on analysis of the image frames of the content.

The content playing apparatus 1200 may stop blurring scenes of the content after scenes including harmful material pass.

Figure 10:
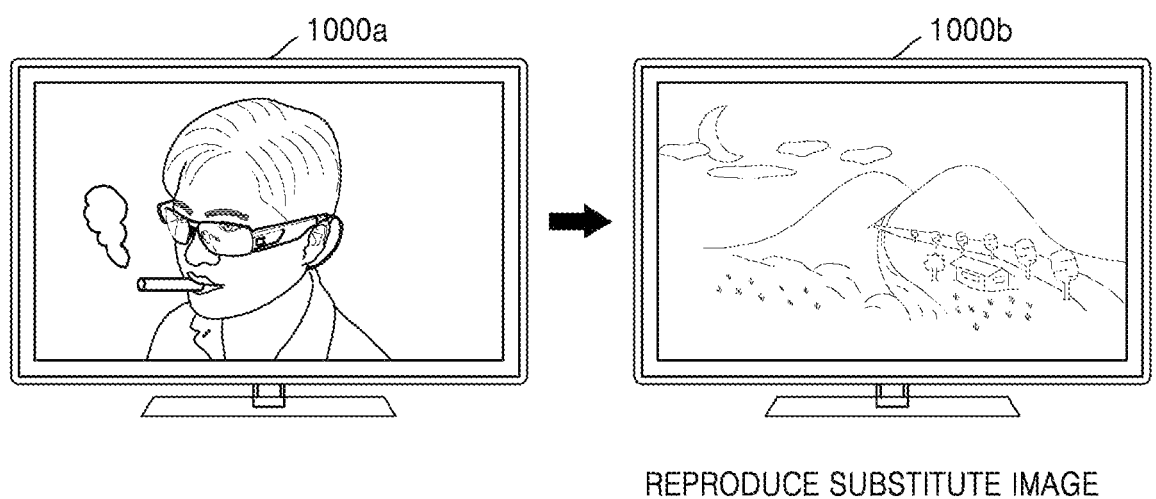

Referring to FIG. 10, the content playing apparatus 1200 may display, on the display apparatus 1000, a substitute image for a scene including harmful material while the content is being played. Content is played normally on a first screen 1000a of FIG. 10, and content is played in combination with the substitute image on a second screen 1000b.

A viewing rating of the content and information regarding whether harmful material is included in each scene of the content are necessary to display the substitute image. The information may be provided by the content provider or may be obtained based on an analysis of the content performed by the server or the content playing apparatus 1200. The method of determining whether the harmful material is included in each scene of the content based on the analysis performed by the server or the content playing apparatus 1200 is the same as the method of determining whether the harmful material is included in each image frame of the content based on analysis of the image frames of the content.

The substitute image may be stored in the content playing apparatus 1200 in advance or may be provided by a cloud server which provides the content.

The content playing apparatus 1200 may stop displaying the substitute image after scenes including harmful material pass.

Figure 11:
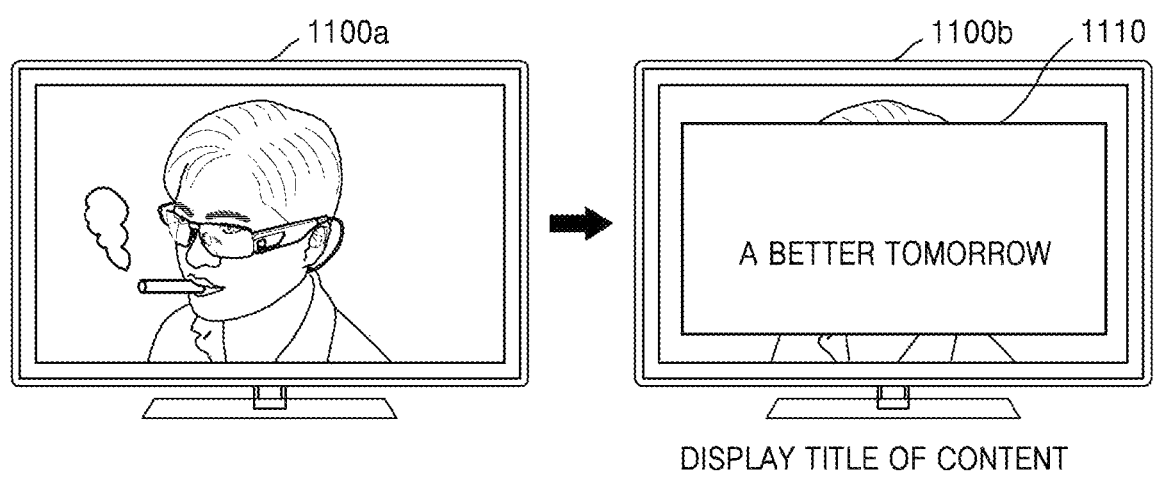

Referring to FIG. 11, the content playing apparatus 1200 may display a title 1110 of the content being played instead of playing a scene including harmful material. Content is played normally on a first screen 1100a of FIG. 11, and content is played in combination with the title 1110 on a second screen 1100b.

A viewing rating of the content and information regarding whether harmful material is included in each scene of the content are necessary to display the title 1110. The information may be provided by the content provider or may be obtained based on an analysis of the content performed by the server or the content playing apparatus 1200. The method of determining whether the harmful material is included in each scene of the content based on the analysis performed by the server or the content playing apparatus 1200 is the same as the method of determining whether the harmful material is included in each image frame of the content based on analysis of the image frames of the content.

In this case, the content playing apparatus 1200 displays the title 1110 such that the title occupies almost the entire screen, and thus, scenes including harmful material may not be displayed.

The content playing apparatus 1200 may stop playing the title 1110 of the content after scenes including the harmful material pass.

Figure 12:
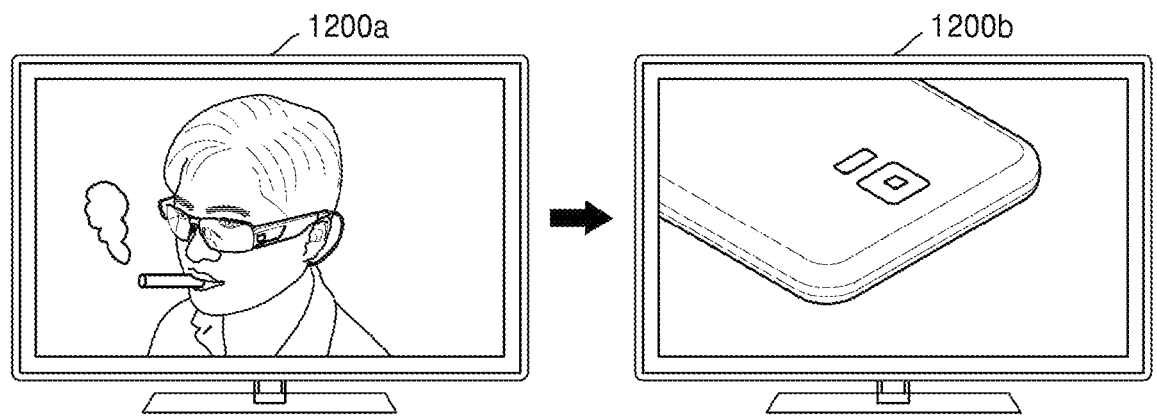

Referring to FIG. 12, the content playing apparatus 1200 may display, on the display apparatus 1000, an advertisement instead of playing scenes including harmful material, while the content is being played. Content is played normally on a first screen 1200*a* of FIG. 12, and content is played in combination with the advertisement on a second screen 1200*b*.

A viewing rating of the content and information regarding whether harmful material is included in each scene of the content are necessary to play the advertisement. The information may be provided by the content provider or may be obtained based on an analysis of the content performed by the server or the content playing apparatus 1200. The method of determining whether the harmful material is included in each scene of the content based on the analysis performed by the server or the content playing apparatus 1200 is the same as the method of determining whether the harmful material is included in each image frame of the content based on analysis of the image frames of the content.

In this case, the content playing apparatus 1200 may receive an advertisement from a cloud server which provides the content.

The content playing apparatus 1200 may stop playing the advertisement after the scenes including the harmful material pass.

Figure 13:
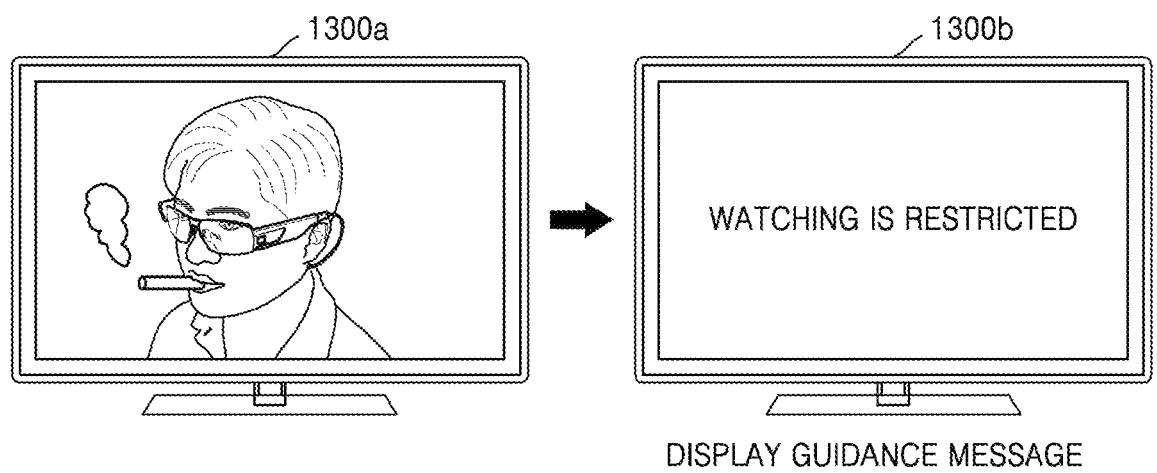

Referring to FIG. 13, the content playing apparatus 1200 may display, on the display apparatus 1000, a guidance message indicating that viewing is restricted, instead of playing scenes including harmful material. Content is played normally on a first screen 1300*a* of FIG. 13, and content is played in combination with the guidance message on a second screen 1300*b*.

A viewing rating of the content and information regarding whether harmful material is included in each scene of the content are necessary to play the guidance message. The information may be provided by the content provider or may be obtained based on an analysis of the content performed by the server or the content playing apparatus 1200. The method of determining whether the harmful material is included in each scene of the content based on the analysis performed by the server or the content playing apparatus 1200 is the same as the method of determining whether the harmful material is included in each image frame of the content based on analysis of the image frames of the content.

In this case, the content playing apparatus 1200 may replace an entire screen with the guidance message, and thus, the scenes including the harmful material may not be played.

The content playing apparatus 1200 may stop displaying the guidance message after the scenes including the harmful material pass.

The content playing apparatus 1200 may provide a different image to each user. In detail, the content playing apparatus 1200 displays, on the display apparatus 1000, one image including two or more pieces of image information on a screen and may display different images according to conditions of the users viewing the screen. For example, the users may view different images according to locations of the users with respect to the display apparatus 1000, glasses that the users wear, viewing angles at which the users view the screen, or the like.

While the content playing apparatus 1200 may provide different images to the respective users, the content playing apparatus 1200 may control playing of an image viewed by the selected user by using the methods described with reference to FIGS. 6 to 13 and may not control playing of an image viewed by remaining users. Alternatively, the content playing apparatus 1200 may select two or more users and may control playing of content such that the selected users and other users may view content.

Figure 14:
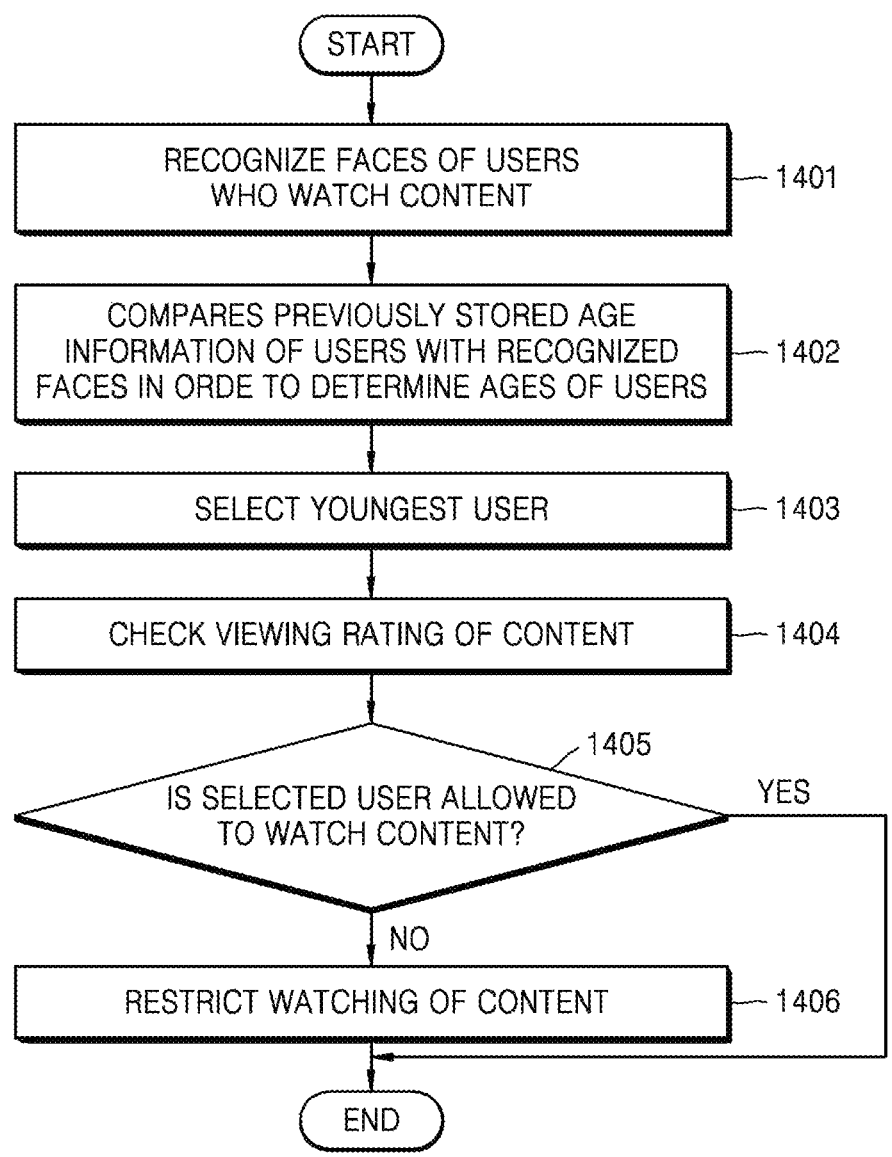
FIG. 14 is a flowchart of a method of controlling playing of content, according to an exemplary embodiment in which a youngest user is selected based on previously stored age information of users.

FIG. 14 is a flowchart of a method of controlling playing of content, according to an exemplary embodiment in which a youngest user is selected based on previously stored age information of users.

Referring to FIG. 14, in operation 1401, the user recognition apparatus 1100 and the content playing apparatus 1200 recognize faces of users viewing content. For example, when the user recognition apparatus 1100 captures images of the users viewing the content and transmits the captured images to the content playing apparatus 1200, the content playing apparatus 1200 may recognize the faces of the users after portions of the faces of the users are identified from the captured images of the users and then facial characteristics are extracted.

In operation 1402, the content playing apparatus 1200 compares the recognized faces of the users against the previously stored age information so as to determine the ages of the users. In this case, the age information of the users is in a table form in which the ages of the users are mapped to the images of the users and may be stored in the content playing apparatus 1200 in advance.

If the ages of the users are determined, the content playing apparatus 1200 selects the youngest user in operation 1403.

In operation 1404, the content playing apparatus 1200 checks a viewing rating of the content being played. In this case, the content playing apparatus 1200 may receive the viewing rating of the content from the content provider or may determine the viewing rating of the content by directly analyzing the content if the content provider does not provide the viewing rating. Alternatively, a cloud server analyzes the content to determine the viewing rating, and the content playing apparatus 1200 may receive the determined viewing rating from the cloud server.

In operation 1405, the content playing apparatus 1200 determines whether the selected user is allowed to view the content after the viewing rating of the content is compared with the age of the selected user.

If it is determined that the selected user is not allowed to view the content because the age of the selected user is lower than a minimum age for viewing the content, the content playing apparatus 1200 restricts the viewing of the content in operation 1406. A method of restricting the viewing of the content which is performed by the content playing apparatus 1200 is the same as the methods described with reference to FIGS. 6 to 13.

Figure 15:
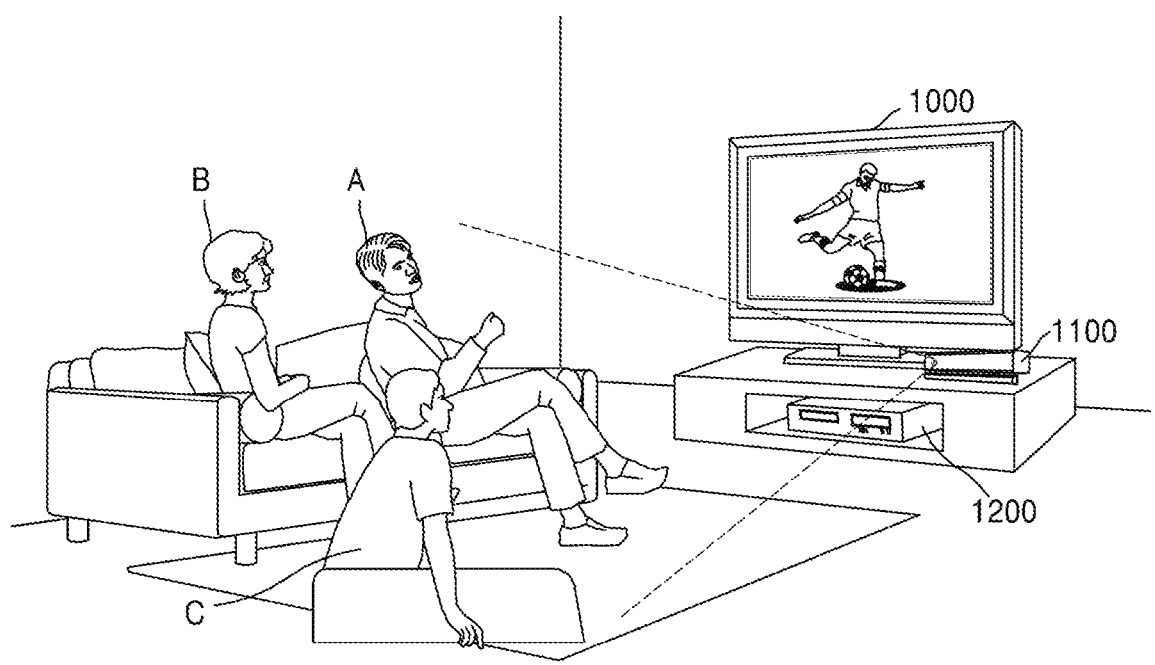
FIGS. 15, 16 and 17 are views for explaining methods of controlling playing of content, according to exemplary embodiments, the methods including predicting the ages of users based on user recognition and selecting the youngest user.
Figure 16:
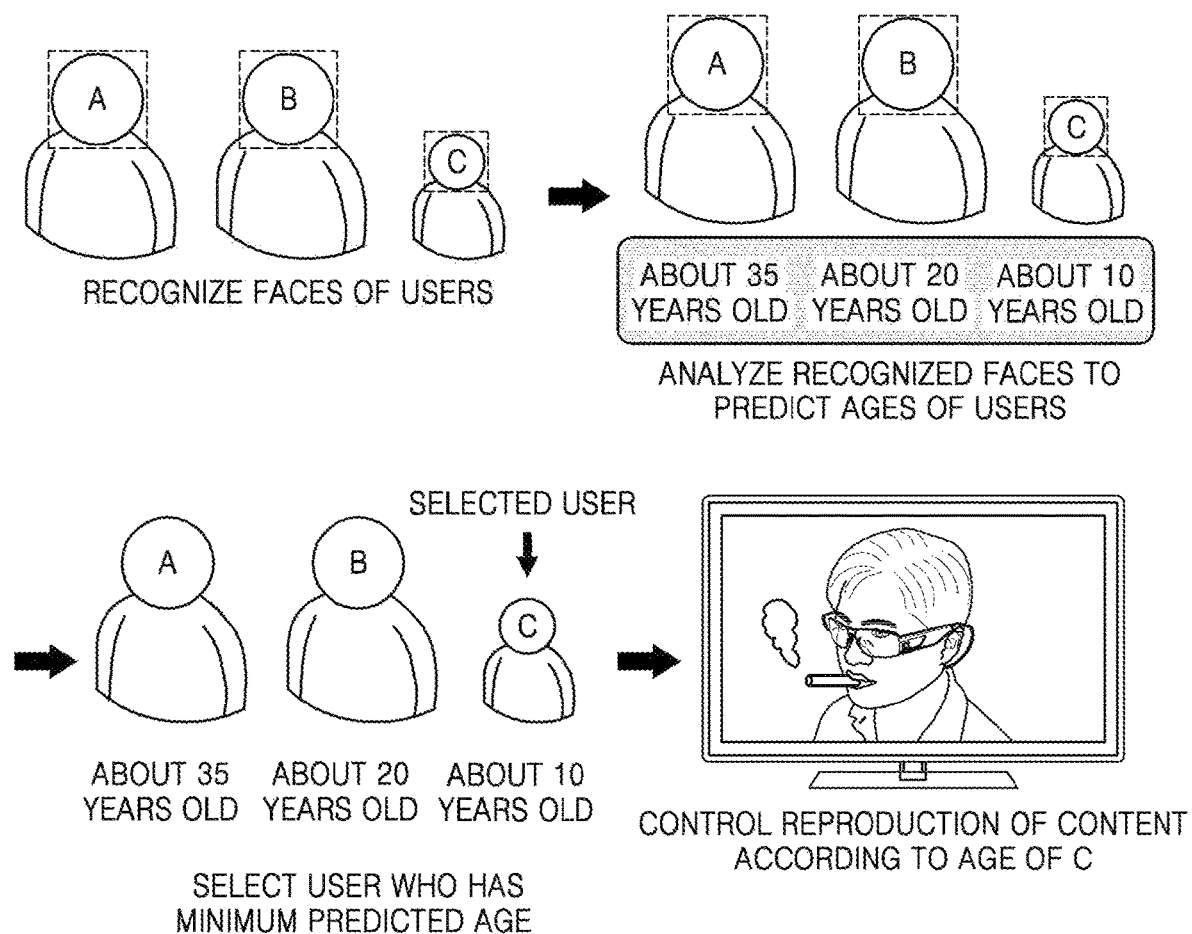
Figure 17:
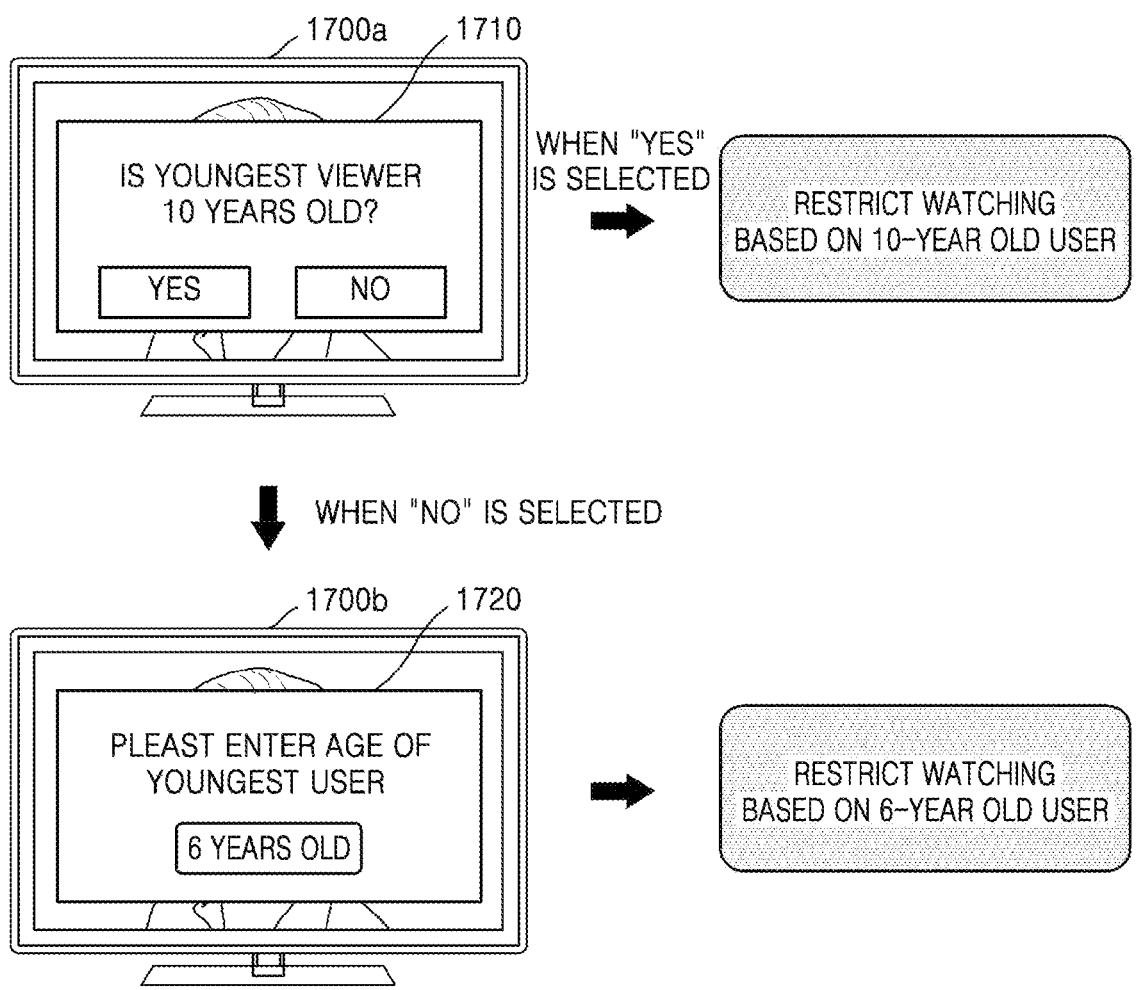

FIGS. 15 to 17 are views for explaining methods of controlling playing of content according to exemplary embodiments, the methods including predicting the ages of users based on user recognition and selecting the youngest user.

Referring to FIG. 15, the users A, B, and C view the content played by the display apparatus 1000. The display apparatus 1000 may be connected to the user recognition apparatus 1100 for recognizing a user who views the content and the content playing apparatus 1200 for controlling the playing of the content.

The user recognition apparatus 1100 recognizes the users viewing the content. In this case, the user recognition apparatus 1100 is a camera separated from the display apparatus 1000, but may be embodied in many different forms. For example, the user recognition apparatus 1100 may be a camera inserted into a frame of the display apparatus 1000.

Referring to FIG. 16, the user recognition apparatus 1100 and the content playing apparatus 1200 recognize faces of the users viewing the content. The method of recognizing the faces is the same as the method described with reference to FIG. 4.

Once the faces of the users have been recognized, the content playing apparatus 1200 may predict the ages of the users by using facial recognition results of the users. For example, the content playing apparatus 1200 may compare facial characteristics of the users, which are determined based on the facial recognition results of the users, with previously stored facial characteristics associated with certain age groups so as to determine which age group each user belongs to and thereby predict the ages of the users. FIG. 16 shows that the content playing apparatus 1200 predicts the users A, B, and C are about 35 years old, 20 years old, and 10 years old, respectively.

Once the ages of the users have been determined, the content playing apparatus 1200 selects at least one of the users based on the predicted ages according to predetermined criteria. FIG. 16 shows the selection of a youngest user, that is, the user C, based on predicted age.

Once the youngest user has been selected, the content playing apparatus 1200 controls playing of the content according to the youngest user. Therefore, the content playing apparatus 1200 may control the playing of the content according to the user C.

When the content playing apparatus 1200 analyzes the facial recognition results in order to predict the ages of the users, the predicted ages may not match with the actual ages of the users, and thus, the content playing apparatus 1200 may require at least one of the users to confirm the predicted ages.

FIG. 17 shows that the content playing apparatus 1200 requires at least one of the users to confirm the predicted ages. Referring to FIG. 17, the content playing apparatus 1200 displays, on a first screen 1700a of the display apparatus 1000, a pop-up message 1710 which requires at least one of the users to confirm whether the predicted ages are correct. In FIG. 16, the user C is predicted to be about 10 years old and is selected because the user C is determined to be the youngest user. Therefore, the pop-up message 1710 requests for confirmation whether the youngest user is 10 years old. When the user selects "Yes" in the pop-up message 1710, the content playing apparatus 1200 determines that the selected user is 10 years old and controls the playing of the content.

On the contrary, when the user selects "No" in the pop-up message 1710, the content playing apparatus 1200 displays a second screen 1700b. A pop-up message 1720 which requires the user to enter the age of the youngest user is displayed on the second screen 1700b. When the user enters that the youngest user is 6 years old in the pop-up message 1720 displayed on the second screen 1700b, the content playing apparatus 1200 determines that the selected user is 6 years old and then controls the playing of the content.

In this case, the content playing apparatus 1200 compares the viewing rating of the content with the age of the selected user and may control the playing of the content according to whether the selected user is allowed to view the content. Detailed descriptions thereof are the same as the descriptions provided with reference to FIG. 5.

Figure 18:
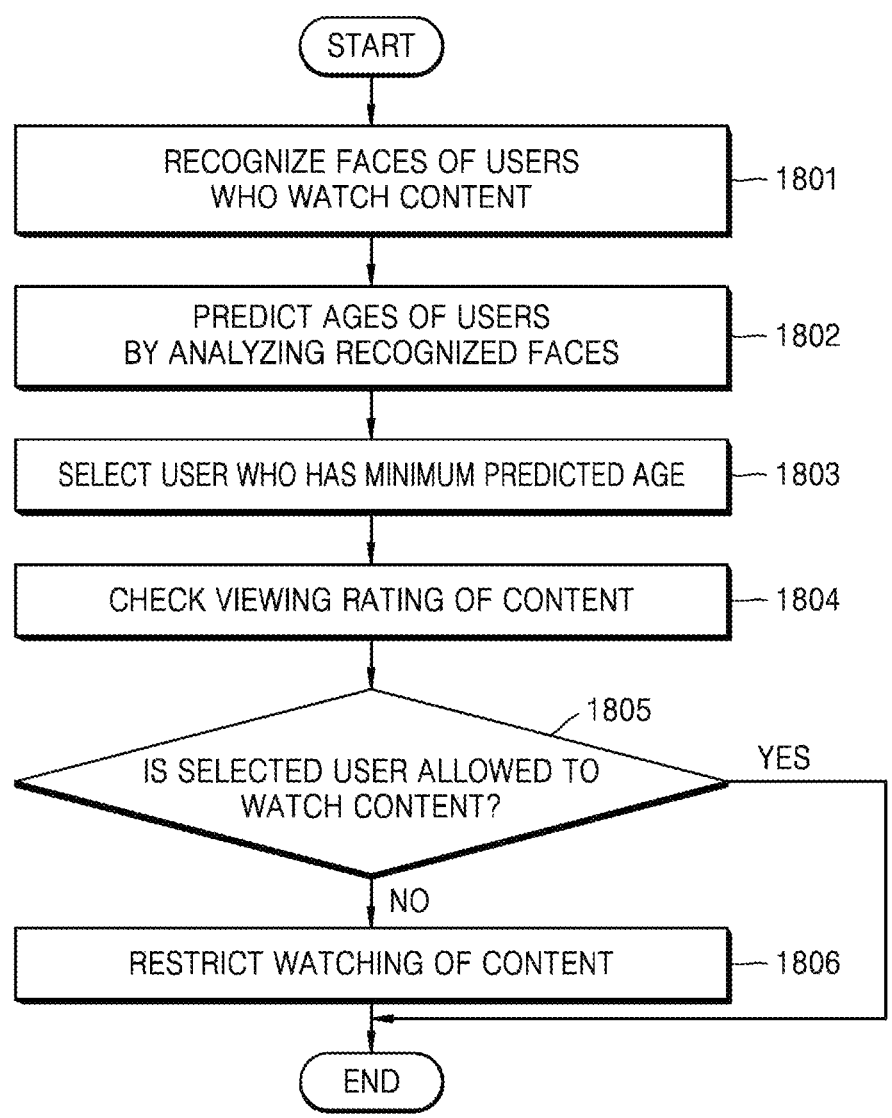
FIGS. 18 and 19 are flowcharts of methods of controlling playing of content, according to exemplary embodiments, the methods including predicting the ages of users based on user recognition and selecting the youngest user.
Figure 19:
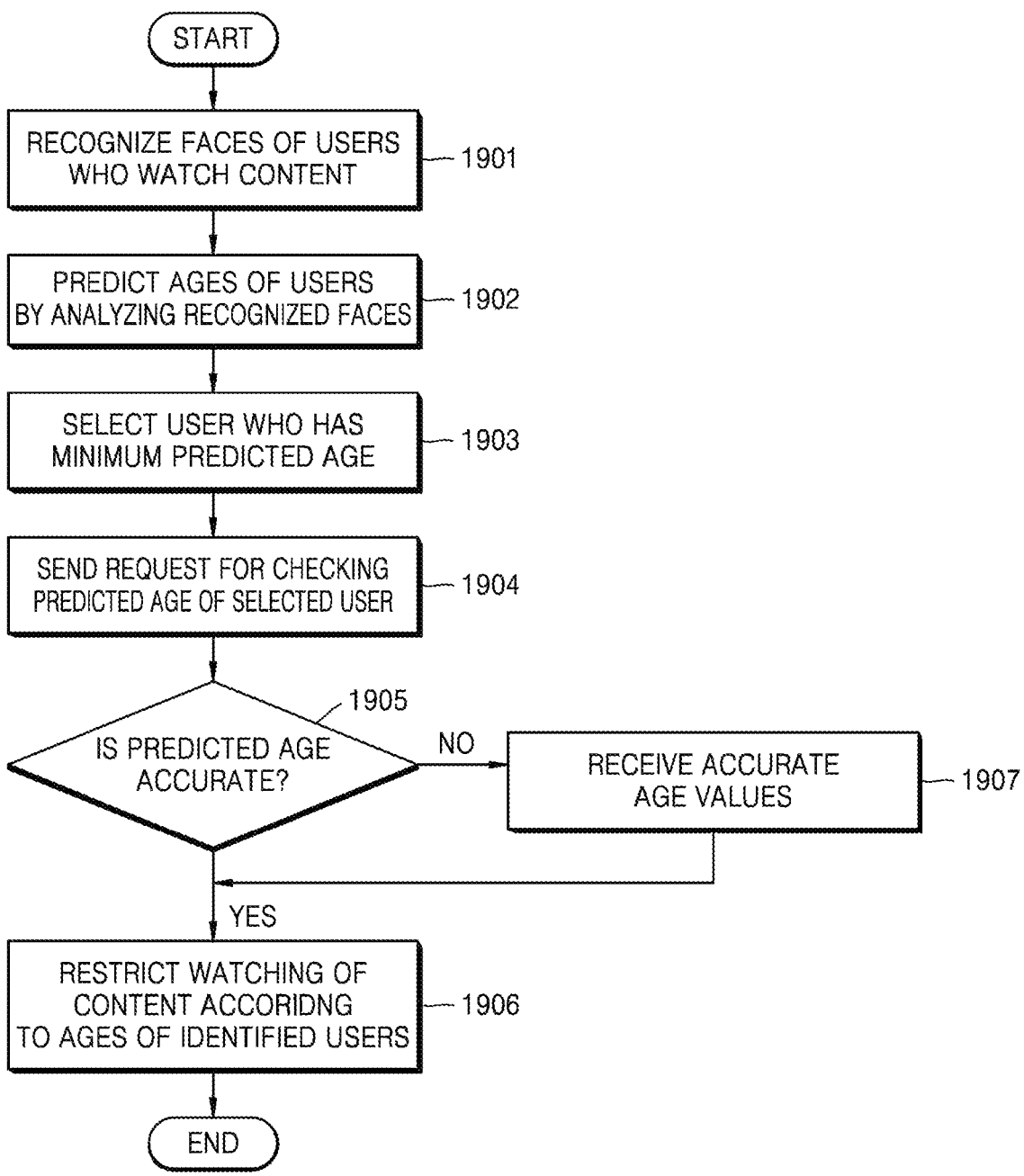

FIGS. 18 and 19 are flowcharts of methods of controlling playing of content according to exemplary embodiments, the methods including using results of recognizing users to predict the ages of users and selecting the youngest user.

Referring to FIG. 18, in operation 1801, the user recognition apparatus 1100 and the content playing apparatus 1200 recognize faces of users viewing the content. For example, when the user recognition apparatus 1100 captures images of the users viewing the content and transmits the captured images to the content playing apparatus 1200, the content playing apparatus 1200 identifies portions of the faces of the users from the captured images, and extracts facial characteristics of the users.

In operation 1802, the content playing apparatus 1200 analyzes facial recognition results of the users in order to predict the ages of the users. For example, the content playing apparatus 1200 compares the extracted facial characteristics with facial characteristics associated with certain age groups so as to determine which age group each user belongs to and thereby predict the ages of the users.

Once the ages of the users have been predicted, the content playing apparatus 1200 selects a user who has a minimum predicted age in operation 1803.

In operation 1804, the content playing apparatus 1200 checks a viewing rating of the content being played. In this case, the content playing apparatus 1200 may receive the viewing rating from the content provider and may determine the viewing rating by directly analyzing the content if the content provider does not provide the viewing rating. Alternatively, a cloud server analyzes the content to determine the viewing rating, and the content playing apparatus 1200 may receive the determined viewing rating from the cloud server.

In operation 1805, the content playing apparatus 1200 compares the viewing rating of the content with the predicted age of the selected user and determines whether the selected user is allowed to view the content.

If it is determined that the predicted age of the selected user is lower than a reference age of the content, the content playing apparatus 1200 restricts viewing of the content in operation 1806. A detailed method of restricting viewing of the content by the content playing apparatus 1200 is the same as the methods described with reference to FIGS. 6 to 13.

Compared with FIG. 18, FIG. 19 further includes an operation of confirming the predicted age of the selected user. Operations 1901 to 1903 of FIG. 19 are the same as operations 1801 to 1803 of FIG. 18, and thus, detailed descriptions thereof will be omitted.

In operation 1904, the content playing apparatus 1200 sends a request for confirming the predicted age of the selected user, through a screen of the display apparatus 1000. For example, the content playing apparatus 1200 may display, on the display apparatus 1000, a pop-up message which requests for confirmation whether the predicted age of the selected user matches the actual age of the selected user.

If the content playing apparatus 1200 determines that the predicted age of the selected user is correct based on a user input received in operation 1905 with regard to the accuracy of the predicted age of the selected user, the content playing apparatus 1200 restricts viewing of the content according to the age of the selected user in operation 1906.

However, if the content playing apparatus 1200 determines that the predicted age of the selected user is incorrect based on the user input received in operation 1905 with regard to the accuracy of the predicted age of the selected user, the content playing apparatus 1200 receives an input regarding the actual age of the selected user from the user. In operation 1906, the content playing apparatus 1200 restricts the viewing of the content according to the actual age of the selected user. A detailed method of restricting the viewing of the content by the content playing apparatus 1200 is the same as the methods described with reference to FIGS. 6 to 13.

Figure 20:
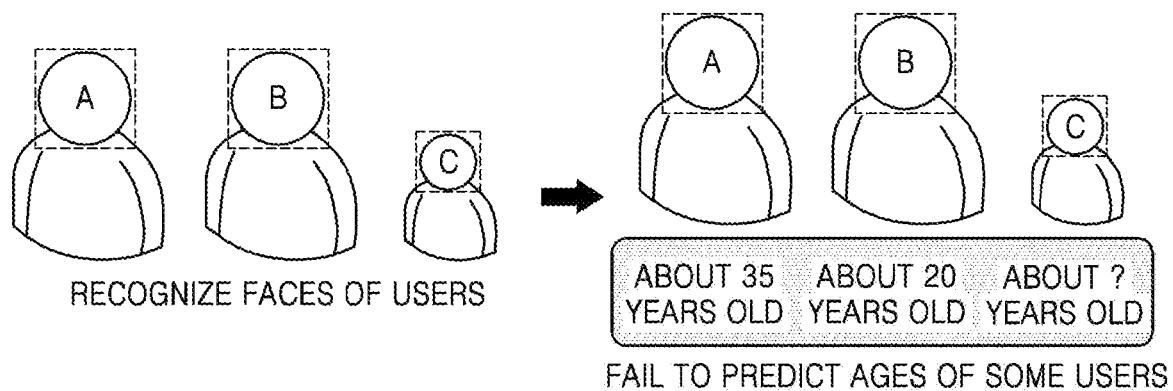
FIG. 20 is a view for explaining a method of controlling playing of content, according to an exemplary embodiment, the method including using age information input by users when prediction of the ages of the users fails and selecting the youngest user.
Figure 20:
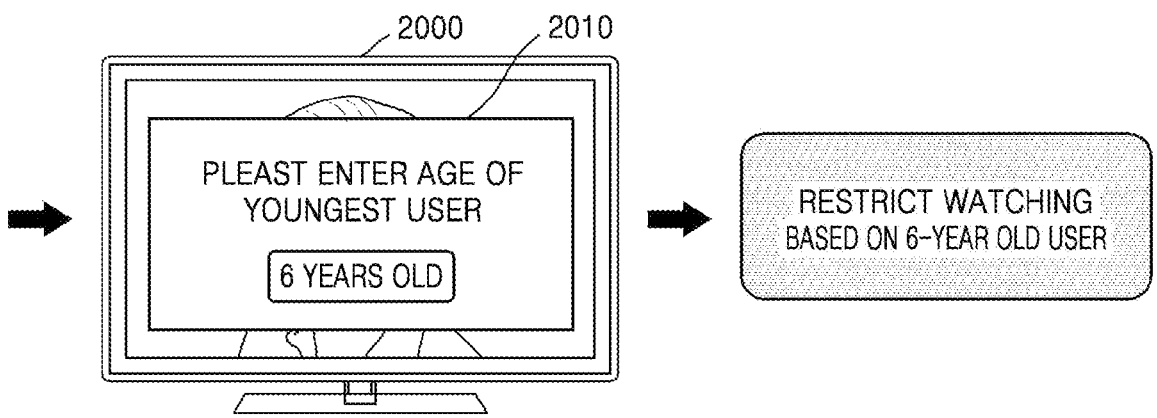

FIG. 20 is a view for explaining a method of controlling playing of content, according to an exemplary embodiment, the method including using age information input by users when prediction of the ages of the users fails and selecting the youngest user.

Referring to FIG. 20, the user recognition apparatus 1100 and the content playing apparatus 1200 recognize faces of the users viewing the content. The method of recognizing the faces of the users is the same as the method described with reference to FIG. 4.

Once the faces of the users have been recognized, the content playing apparatus 1200 may predict the ages of the users by using facial recognition results of the users. For example, the content playing apparatus 1200 compares facial characteristics of the users with previously stored facial characteristics corresponding to age group and may predict the ages of the users by determining which age group each user belongs to.

However, when the content playing apparatus 1200 predicts the ages of the users based on analysis of the facial recognition results of the users, the content playing apparatus 1200 may fail to predict the ages of some users. Failing to predict the ages of some users may result from inaccurately recognizing the faces of the users, failing to match the facial characteristics of the users with the previously stored facial characteristics corresponding to age group, or the like.

Referring to FIG. 20, the content playing apparatus 1200 predicts the users A and B are about 35 years old and 20 years old, respectively, but fails to predict the age of the user C. Therefore, the content playing apparatus 1200 displays, on a screen 2000 of the display apparatus 1000, a pop-up message 2010 which requires the users to enter the age of the youngest user. As shown in FIG. 20, if the users enters that the youngest user is 6 years old, the content playing apparatus 1200 determines that the youngest user is 6 years old and controls the playing of the content.

In this case, the content playing apparatus 1200 compares the viewing rating of the content with the age of the selected user and may control the playing of the content according to whether the selected user is allowed to view the content. Detailed descriptions thereof are the same as the descriptions provided with reference to FIG. 5.

The method of controlling the playing of the content by the content playing apparatus 1200 is the same as the method described with reference to FIGS. 6 to 13.

Figure 21:
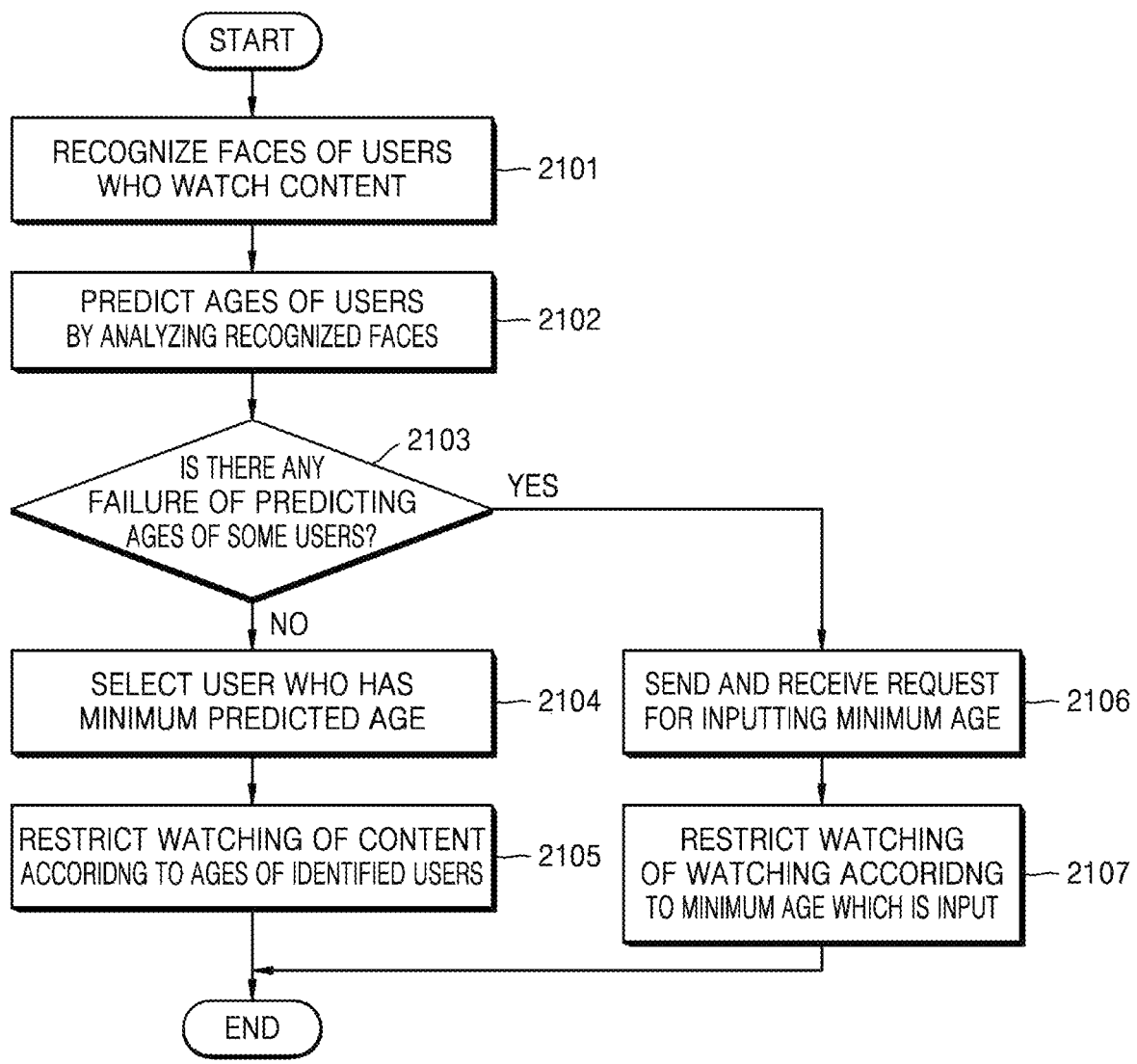
FIG. 21 is a flowchart of a method of controlling playing of content, according to an exemplary embodiment, the method including using age information input by users when prediction of the ages of the users fails and selecting the youngest user.

FIG. 21 is a flowchart of a method of controlling playing of content, according to an exemplary embodiment, the method including using age information input by users when prediction of the ages of the users fails and selecting the youngest user.

Referring to FIG. 21, the user recognition apparatus 1100 and the content playing apparatus 1200 recognize faces of the users viewing the content. For example, when the user recognition apparatus 1100 captures images of the users viewing the content and transmits the captured images to the content playing apparatus 1200, the content playing apparatus 1200 identifies portions of the faces of the users from the captured images and extracts facial characteristics of the users so as to recognize the faces of the users.

In operation 2102, the content playing apparatus 1200 analyzes facial recognition results of the users to predict the ages of the users. For example, the content playing apparatus 1200 compares the extracted facial characteristics of the users with previously stored facial characteristics corresponding to age group and predicts the ages of the users by determining which age group each user belongs to.

In operation 2103, the content playing apparatus 1200 determines whether there is any failure of predicting the ages of the users. When the content playing apparatus 1200 analyzes the facial recognition results of the users in order to predict the ages of the users, the content playing apparatus 1200 may fail to predict the ages of some users. The failure of predicting the ages of the users may result from inaccurate facial recognition of the users, a failure to match the facial characteristics of the users with the previously stored facial characteristics corresponding to age group, or the like.

If there is no failure of predicting the ages of the users in operation 2103, the content playing apparatus 1200 may select a user who has a minimum predicted age in operation 2104.

In operation 2105, the content playing apparatus 1200 restricts viewing of the content according to the age of the selected user. A detailed method of restricting the viewing of the content by the content playing apparatus 1200 is the same as the methods described with reference to FIGS. 6 to 13.

If there is a failure of predicting the ages of the users in operation 2103, the content playing apparatus 1200 requires the users to enter the age of the youngest user and receives the entered age from the users in operation 2106. For example, the content playing apparatus 1200 may display, on a screen, a pop-up message which requires the users to enter the age of the youngest user.

In operation 2107, the content playing apparatus 1200 determines that the age of the youngest user input by the users is the age of the selected user and restricts the viewing of the content. A detailed method of restricting the viewing of the content by the content playing apparatus 1200 is the same as the methods described with reference to FIGS. 6 to 13.

Figure 22:
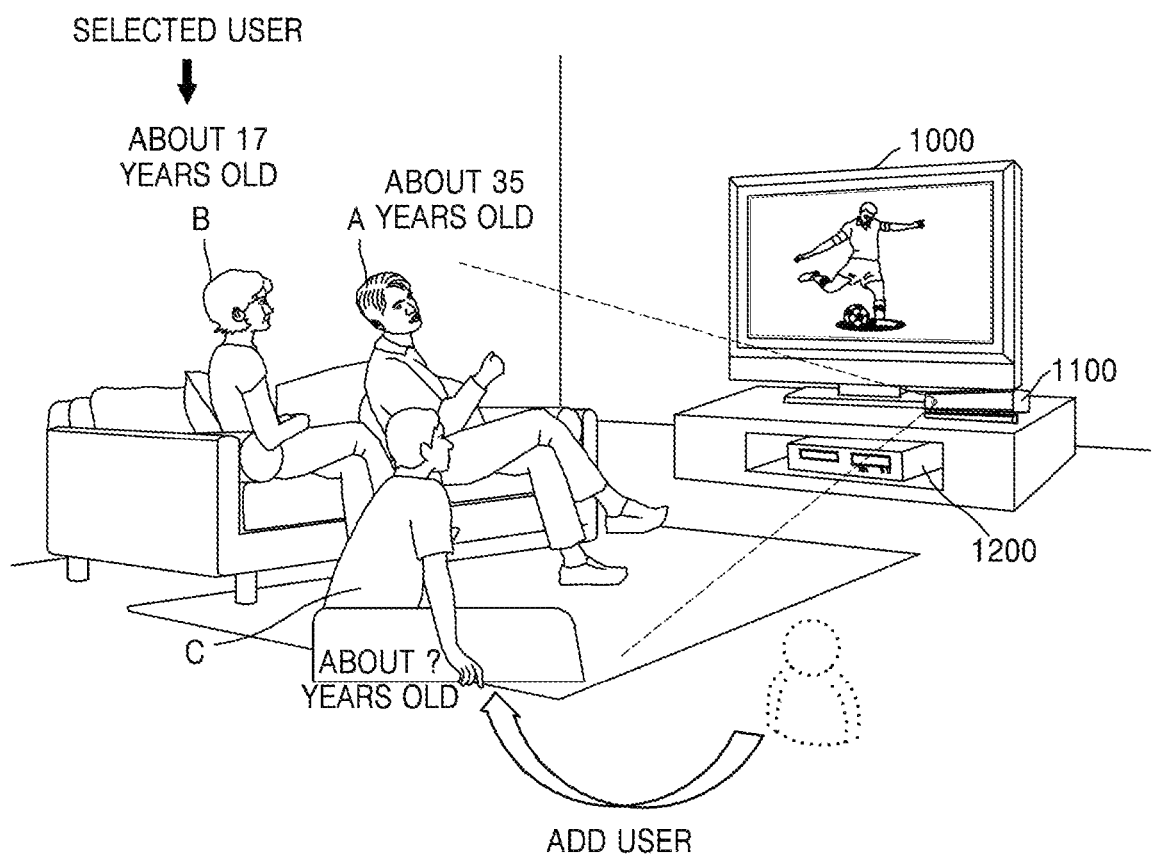
FIGS. 22 and 23 are views for explaining methods of controlling playing of content when another user is added who views the content and the ages of existing users are stored in the content playing apparatus, according to exemplary embodiments.
Figure 23:
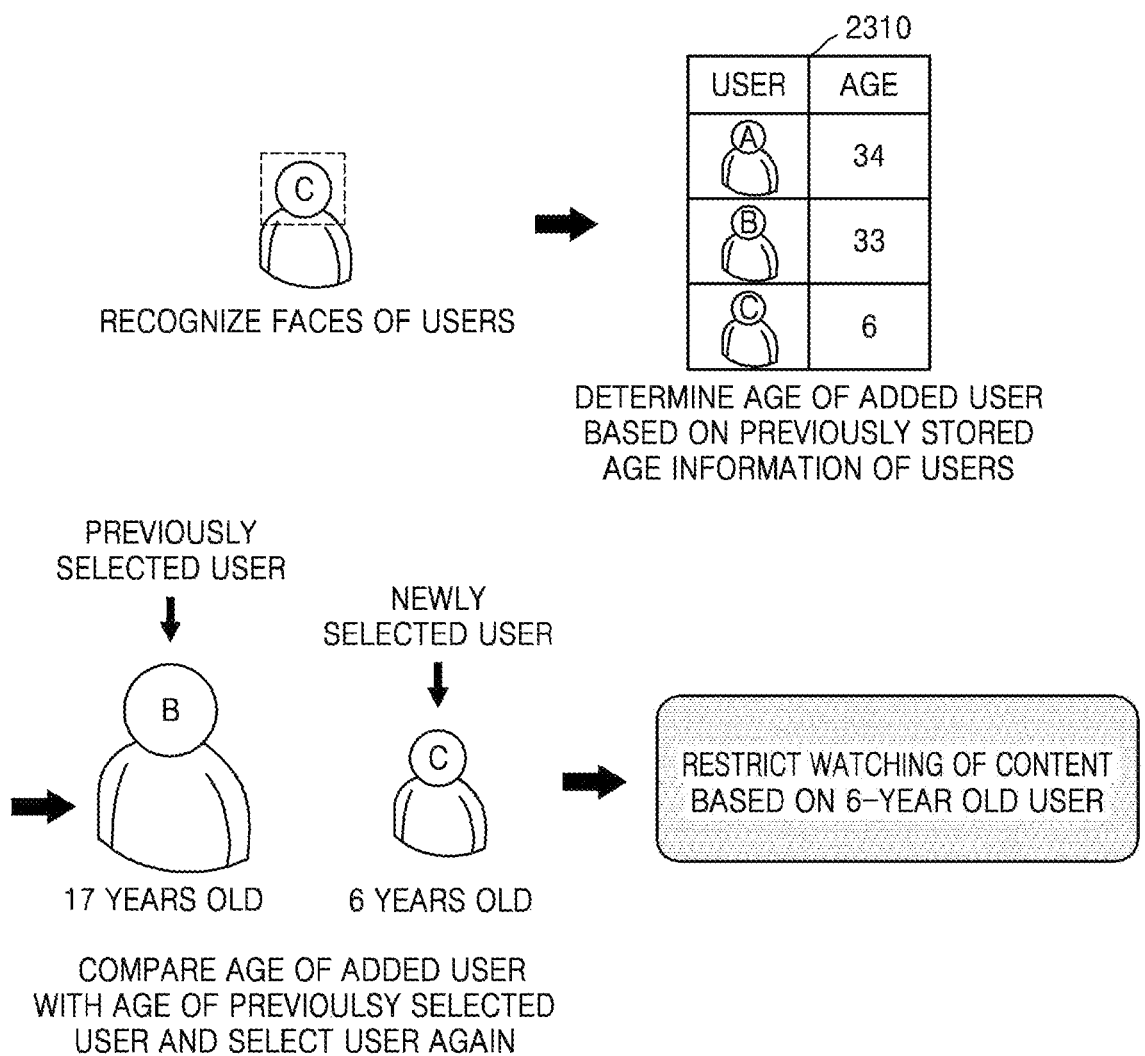

FIGS. 22 and 23 are views for explaining methods of controlling playing of content when another user viewing content is added and when the ages of existing users are stored in the content playing apparatus 1200, according to exemplary embodiments.

Referring to FIG. 22, while users A and B are viewing the content played by the display apparatus 1000, a user C is added. The display apparatus 1000 may be connected to the user recognition apparatus 1100 for recognizing a user who views the content and the content playing apparatus 1200 for controlling playing of the content.

Before the user C is added, the content playing apparatus 1200 selects the user B who is younger than the user A and controls the playing of the content based on the user B. When the user C is added, the user recognition apparatus 1100 recognizes that another user is added, captures an image of the added user, and then transmits the captured image to the content playing apparatus 1200.

In this case, it is assumed that the ages of the users A and B are stored in the content playing apparatus 1200. Therefore, when the content playing apparatus 1200 identifies the age of the user C, the content playing apparatus 1200 may compare the age of the user C with the age of the user B in order to select a new user. Descriptions thereof will be provided with reference to FIG. 23.

Referring to FIG. 23, the user recognition apparatus 1100 and the content playing apparatus 1200 recognize a face of the user C who is newly added. A method of recognizing the face is the same as the method described with reference to FIG. 4.

Once the face of the user C has been recognized, the content playing apparatus 1200 determines the age of the user C based on previously stored age information. Age information of at least one user may be stored in a storage unit of the content playing apparatus 1200 in advance. As shown in a table 2310 of FIG. 23, the age information of the users may be in a form in which the ages of the users are respectively mapped to images of the users.

Once the age of the user C has been determined, the content playing apparatus 1200 compares the age of the user C with the age of the user B, which is stored in the content playing apparatus 1200, and selects the user B again or selects user C. That is, after the age of a previously selected user is compared with the age of a newly added user, if the age of the previously selected user is lower than the age of the newly added user, the previously selected user is selected again, and if the age of the previously selected user is higher than the age of the newly added user, the newly added user is selected. In FIG. 23, since the age (e.g., 6 years old) of the newly added user, that is, the user C, is lower than the age (e.g., 17 years old) of the previously selected user, that is, the user B, the user C is newly selected.

The content playing apparatus 1200 controls the playing of the content according to the selected user, i.e., the newly selected user C. That is, the content playing apparatus 1200 controls the playing of the content according to the selected user C.

In this case, the content playing apparatus 1200 compares the viewing rating of the content with the age of the selected user and may control the playing of the content according to whether the selected user is allowed to view the content. Detailed descriptions thereof are the same as the descriptions provided with reference to FIG. 5. A detailed method of restricting the viewing of the content by the content playing apparatus 1200 is the same as the methods described with reference to FIGS. 6 to 13.

Figure 24:
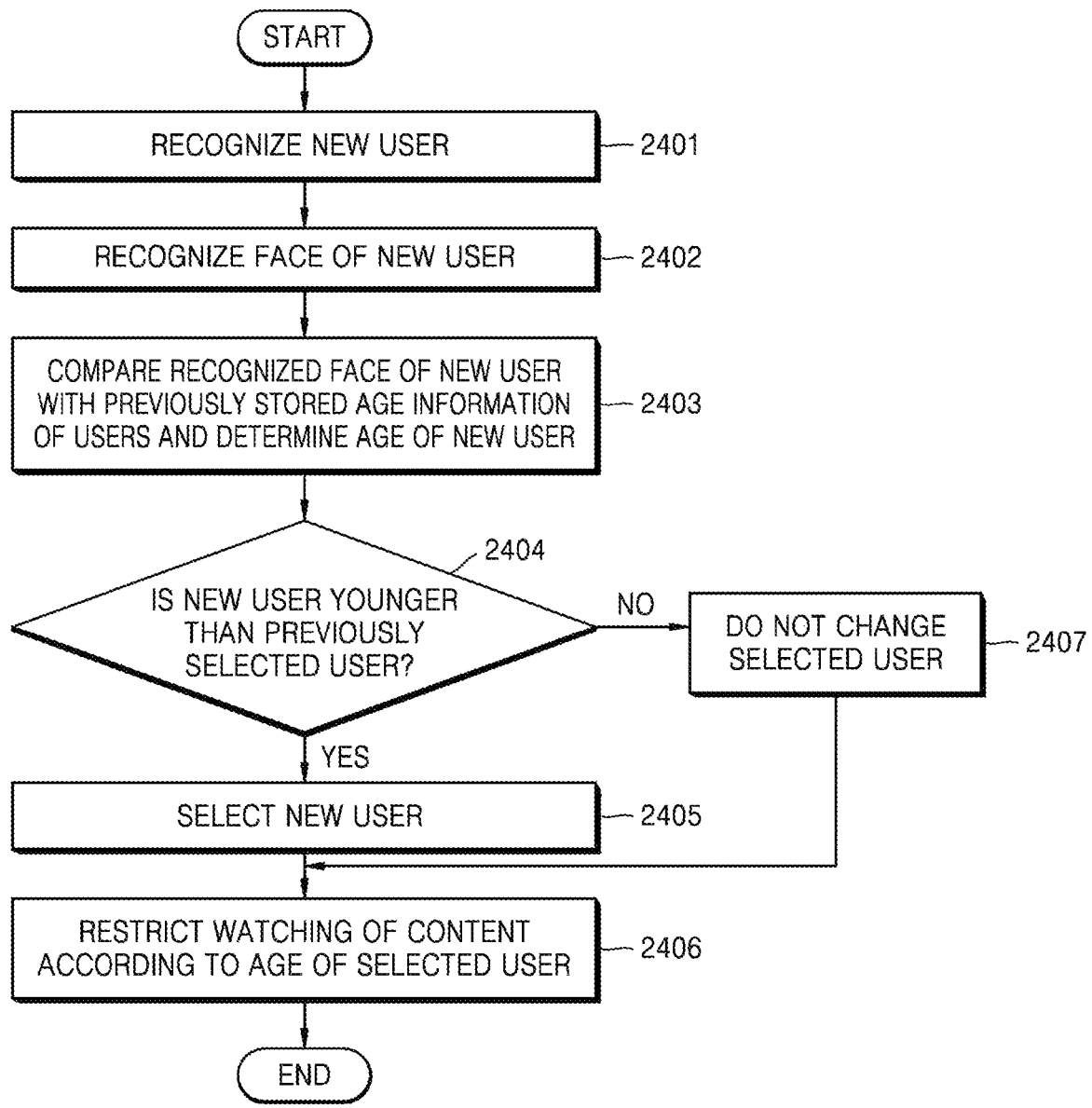
FIG. 24 is a flowchart of a method of controlling playing of content when another user is added who views the content and the ages of existing users are stored in the content playing apparatus, according to an exemplary embodiment.

FIG. 24 is a flowchart of a method of controlling playing of content when another user is added who views the content and the ages of existing users are stored in the content playing apparatus 1200, according to an exemplary embodiment.

Referring to FIG. 24, the user recognition apparatus 1100 and the content playing apparatus 1200 recognize that another user is added in operation 2401. That is, when the user viewing the content is added, the user recognition apparatus 1100 captures an image of the user and transmits the captured image to the content playing apparatus 1200, and the content playing apparatus 1200 recognizes that another user is added who views the content, based on the transmitted image.

In operation 2402, the content playing apparatus 1200 recognizes a face of an added user. For example, when the user recognition apparatus 1100 captures an image of the added user and transmits the captured image to the content playing apparatus 1200, the content playing apparatus 1200 identifies a portion of the face of the added user from the transmitted image and extracts a facial characteristic of the added user in order to recognize the face of the added user.

In operation 2403, the content playing apparatus 1200 compares the recognized face of the added user against previously stored age information of the users and determines the age of the added user. In this case, the age information of the users may be in a table form in which the ages of the users are respectively mapped to the images of the users and may be stored in the content playing apparatus 1200 in advance.

Once the age of the added user has been determined, the content playing apparatus 1200 determines whether the added user is younger than a previously selected user in operation 2404.

If it is determined that the added user is younger than the previously selected user in operation 2404, the content playing apparatus 1200 newly selects the added user in operation 2405, and then, operation 2406 is performed.

However, if it is determined that the added user is older than the previously selected user in operation 2404, operation 2407 is performed, and the content playing apparatus 1200 maintains the current user selection (i.e., the previously selected user is selected again). Then, operation 2406 is performed.

In operation 2406, the content playing apparatus 1200 restricts viewing of the content according to the age of the selected user. A detailed method of restricting the viewing of the content by the content playing apparatus 1200 is the same as the methods described with reference to FIGS. 6 to 13.

Figure 25:
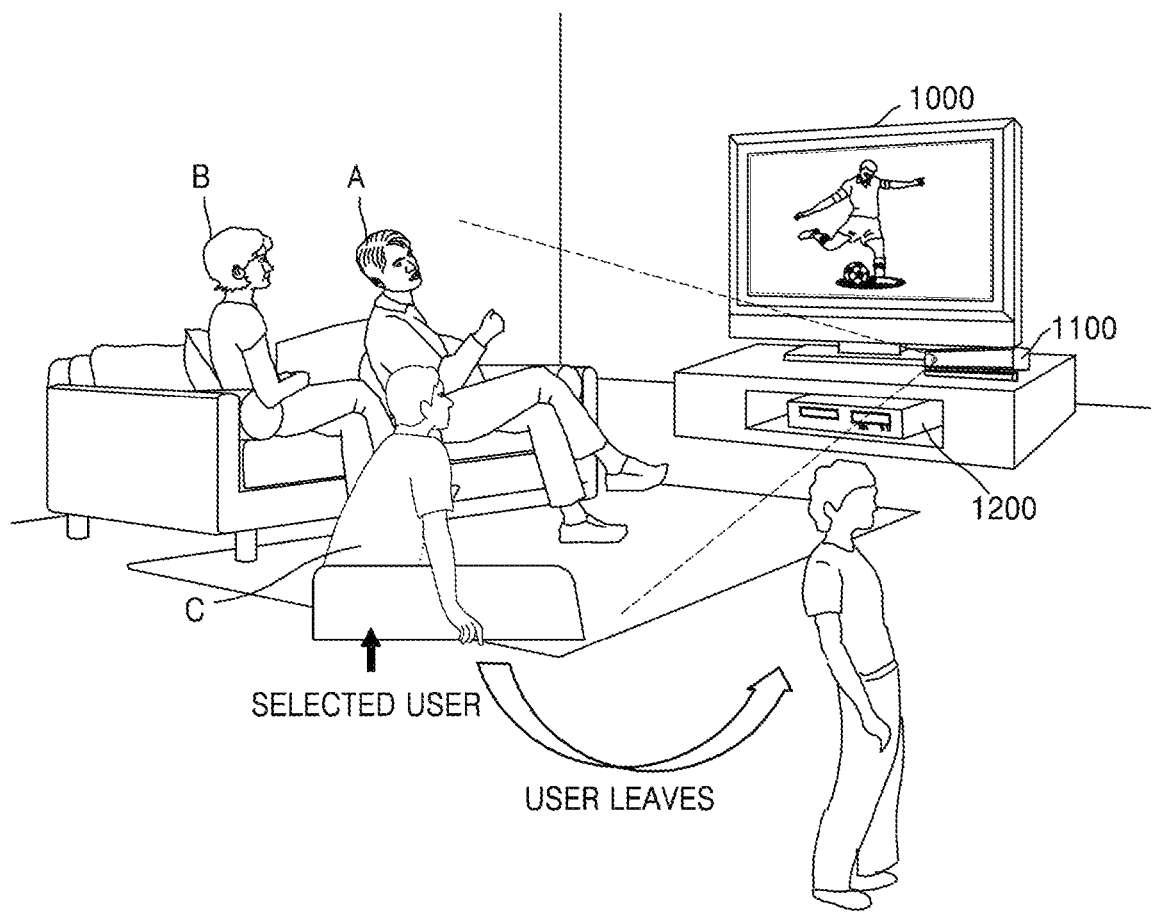
FIGS. 25 and 26 are views for explaining a method of controlling playing of content when some users viewing the content leave and the ages of existing users are stored in the content playing apparatus, according to an exemplary embodiment.
Figure 26:
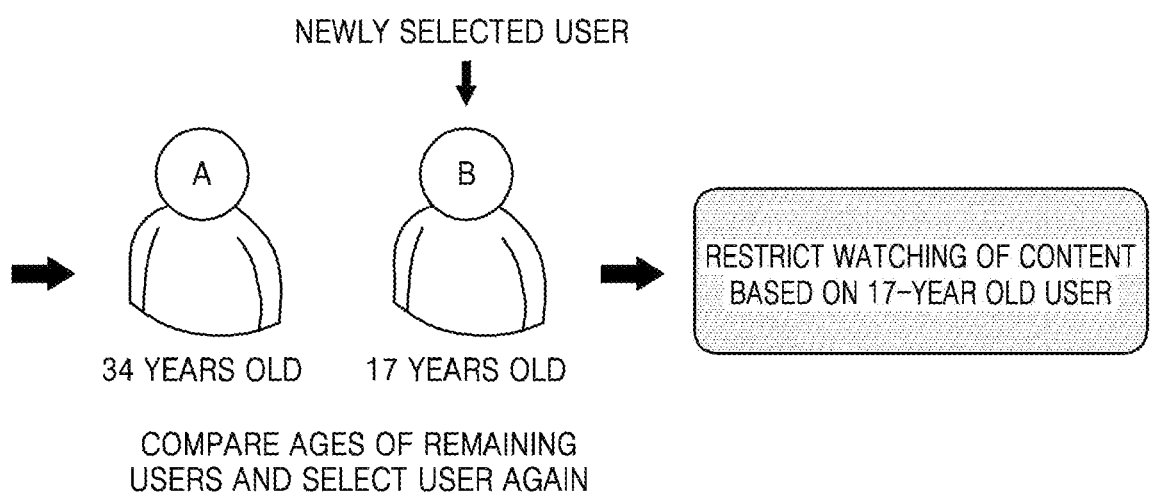

FIGS. 25 and 26 are views for explaining a method of controlling playing of content when some users viewing the content leave and the ages of existing users are stored in the content playing apparatus 1200, according to an exemplary embodiment.

Referring to FIG. 25, while the users A, B, and C are viewing the content played by the display apparatus 1000, the user C leaves. The display apparatus 1000 may be connected to the user recognition apparatus 1100 for recognizing a user who views the content and the content playing apparatus 1200 for controlling playing of the content.

Before the user C leaves, the content playing apparatus 1200 selects the user C who is the youngest, from among the users A, B, and C and controls the playing of the content based on the user C. If the user C leaves, the user recognition apparatus 1100 recognizes that at least one of the users has left, captures images of the users, and transmits the captured images to the content playing apparatus 1200.

In this case, it is assumed that the ages of the users A, B, and C are stored in the content playing apparatus 1200. Therefore, when the user C leaves, the content playing apparatus 1200 compares the ages of the users A and B which are stored therein and may newly select one of the users A and B. A detailed description thereof will be provided with reference to FIG. 26.

Referring to FIG. 26, the content playing apparatus 1200 compares the ages of the users A and B who remain after the user C leaves and selects one of the users A and B. In this case, since the ages of the users A and B are already stored in the content playing apparatus 1200, the content playing apparatus 1200 may compare the ages of the users A and B with each other without having to repeat facial recognition thereof and determination of the ages thereof. In FIG. 26, since the user B, who is 17 years old, is younger than the user A, who is 34 years old, the content playing apparatus 1200 selects the user B.

If the user is newly selected, the content playing apparatus 1200 controls the playing of the content according to the selected user. Therefore, the content playing apparatus 1200 restricts the viewing of the content according to the age (17 years old) of the user B.

The content playing apparatus 1200 compares a viewing rating of the content with the age of the selected user and may control the playing of the content according to whether the selected user is allowed to view the content. Detailed descriptions thereof are the same as the descriptions provided with reference to FIG. 5. Also, a detailed method of restricting the viewing of the content by the content playing apparatus 1200 is the same as the methods described with reference to FIGS. 6 to 13.

Figure 27:
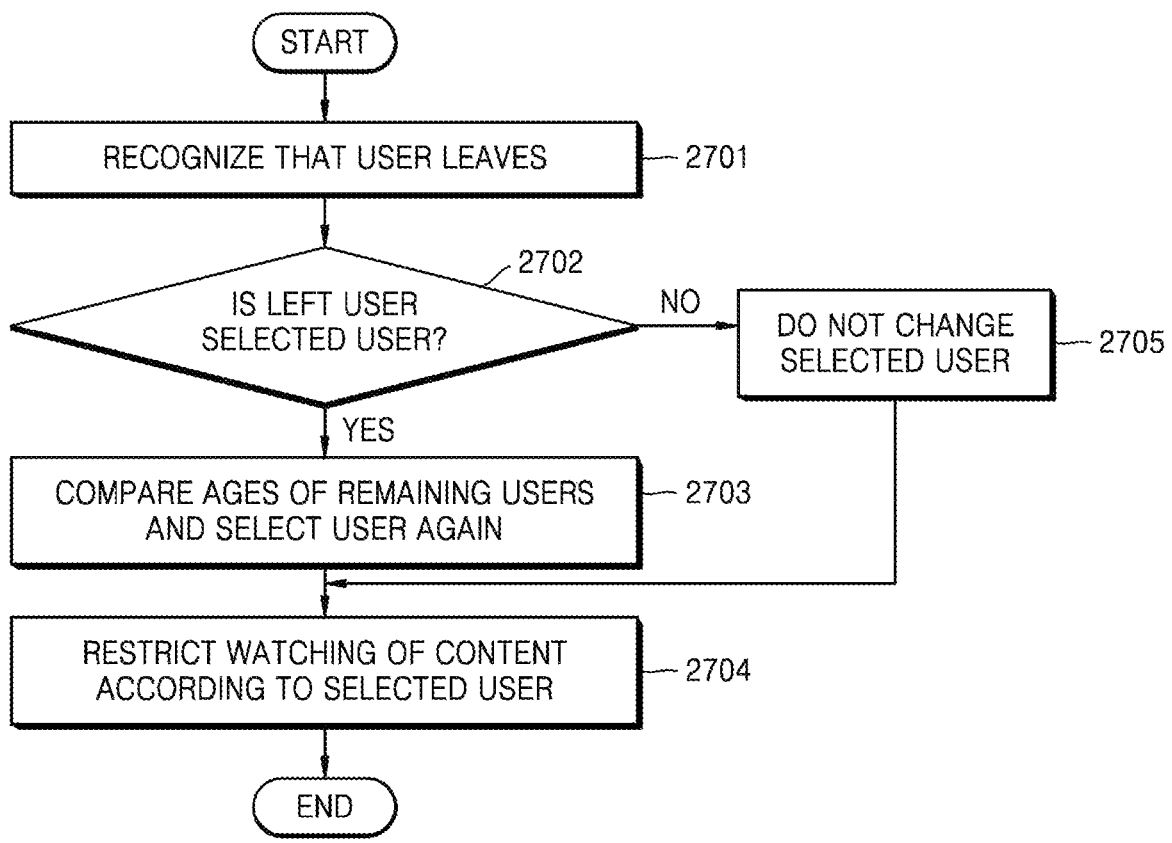
FIG. 27 is a flowchart of a method of controlling playing of content when some users viewing the content leave and the ages of existing users are stored in a content playing apparatus, according to an exemplary embodiment.

FIG. 27 is a flowchart of a method of controlling playing of content when some users viewing the content leave and the ages of existing users are stored in the content playing apparatus 1200, according to an exemplary embodiment.

Referring to FIG. 27, in operation 2701, the user recognition apparatus 1100 and the content playing apparatus 1200 recognize that a user leaves. That is, when some of the users viewing the content have left, the user recognition apparatus 1100 captures images of the users and transmits the captured images to the content playing apparatus 1200, and the content playing apparatus 1200 recognizes that some of the users viewing the content have left, based on the transmitted images.

In operation 2702, the content playing apparatus 1200 determines whether the user who left was the previously selected user.

After the determination is made, if the user who left was not the previously selected user, the content playing apparatus 1200 determines that the previously selected user is still the youngest from among remaining users, and thus, does not change the selected user in operation 2705.

However, if the user who left was the previously selected user, the content playing apparatus 1200 compares the ages of the remaining users and selects one of the users again from among the remaining users in operation 2703. The ages of the remaining users may be stored in the content playing apparatus 1200 in advance or may be identified after the content playing apparatus 1200 recognizes faces of the remaining users and determines the ages thereof.

In operation 2704, the content playing apparatus 1200 restricts viewing of the content according to the age of the selected user. A detailed method of restricting the viewing of the content by the content playing apparatus 1200 is the same as the methods described with reference to FIGS. 6 to 13.

FIGS. 28 to 31 are views for explaining a method of controlling playing of content when the number of users viewing the content changes and the ages of the users are not stored in the content playing apparatus 1200, according to an exemplary embodiment.

A case where another user is added who views the content will be described with reference to FIGS. 28 and 29.

Figure 28:
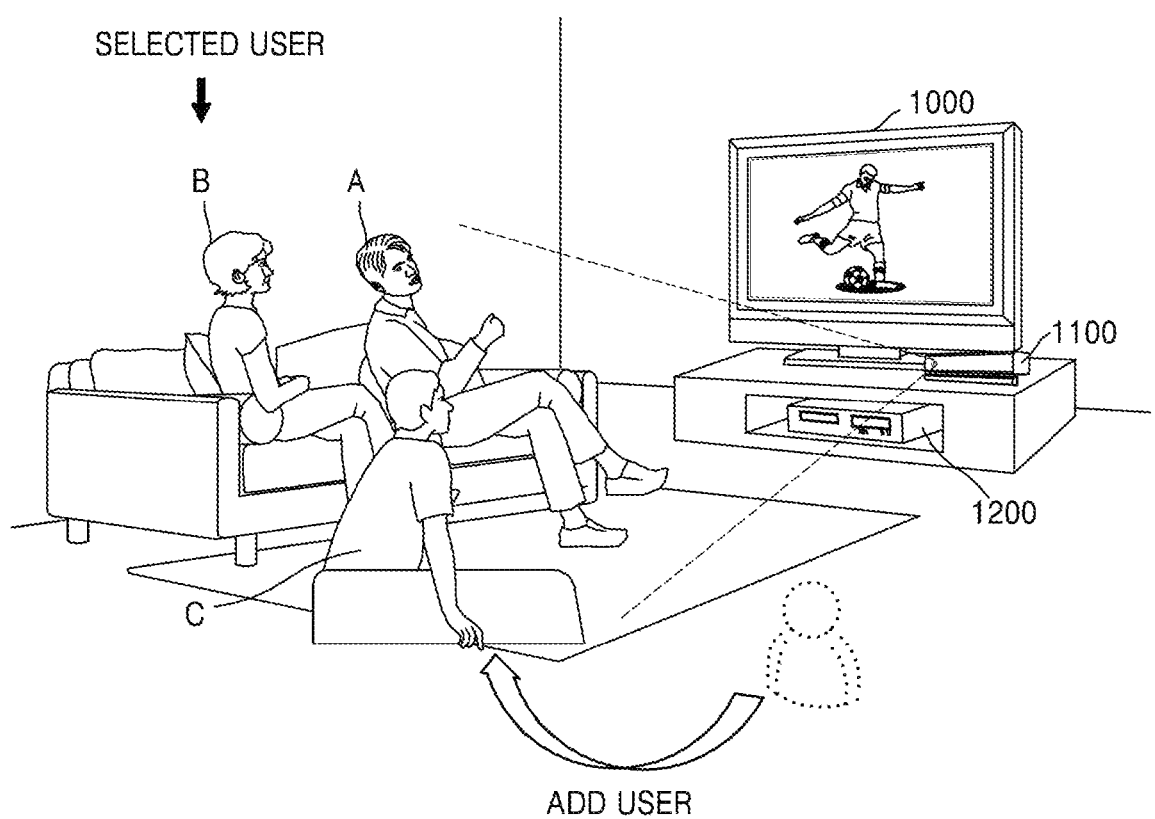
FIGS. 28, 29, 30 and 31 are views for explaining a method of controlling playing of content when the number of users viewing the content changes and the ages of the users are not stored in the content playing apparatus, according to an exemplary embodiment.

Referring to FIG. 28, while the users A and B are viewing the content played by the display apparatus 1000, a user C is added. The display apparatus 1000 may be connected to the user recognition apparatus 1100 for recognizing a user who views the content and the content playing apparatus 1200 for controlling playing of the content.

Before the user C is added, the content playing apparatus 1200 has previously selected the user B and is controlling playing of the content according to the user B. After the user C is added, the user recognition apparatus 1100 recognizes that a new user has been added, captures an image of the added user, and transmits the captured image to the content playing apparatus 1200.

It is assumed that the ages of the users A and B are not stored in the content playing apparatus 1200. Therefore, the content playing apparatus 1200 identifies the ages of the users A and B who are existing users and the age of the user C who is newly added and compares the ages of the users A, B, and C with each other so as to select one of the users A, B, and C. Detailed descriptions thereof will be provided with reference to FIG. 29.

Figure 29:
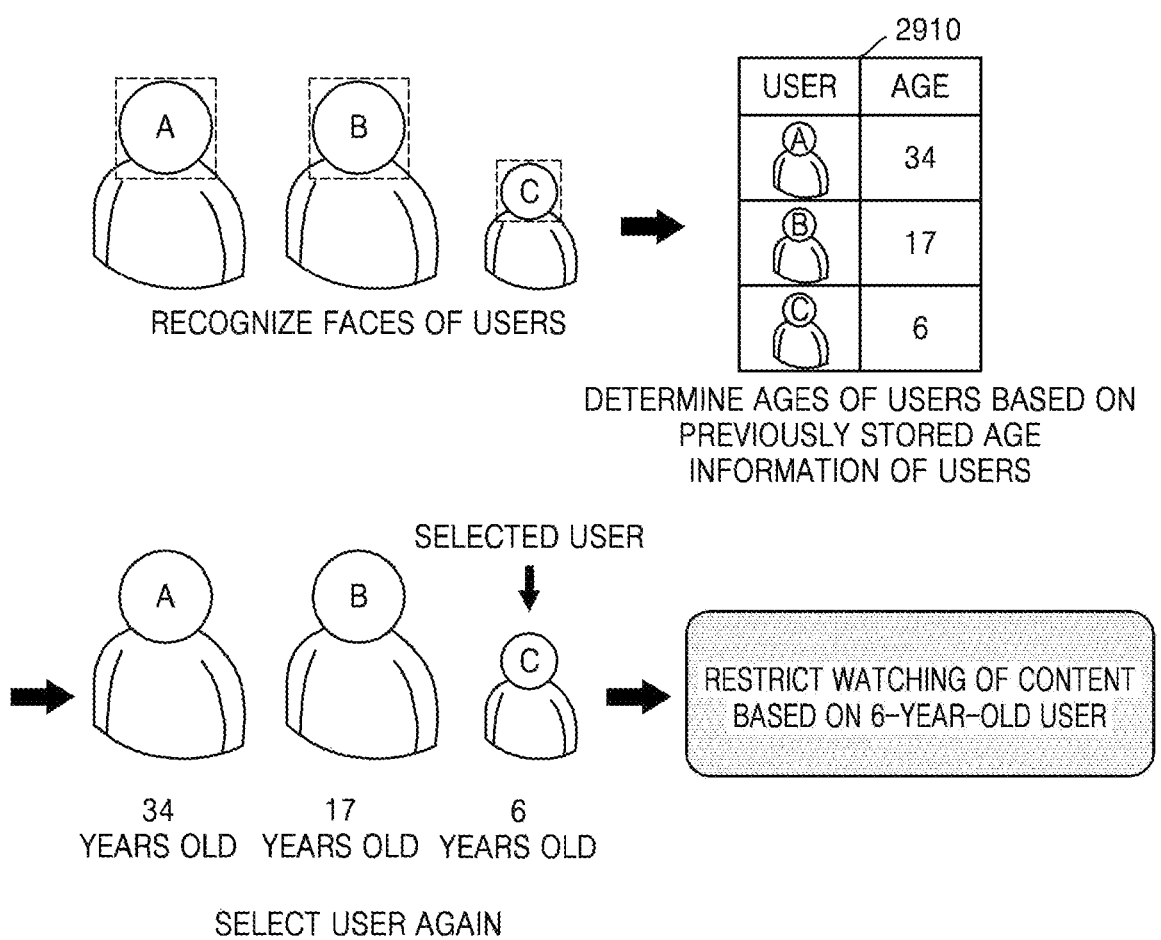

Referring to FIG. 29, the user recognition apparatus 1100 and the content playing apparatus 1200 recognize faces of users A and B who are existing users and a face of the user C who is newly added. A method of recognizing the faces of the users A, B, and C is the same as the method described with reference to FIG. 4.

Once the faces of the users A, B, and C have been recognized, the content playing apparatus 1200 determines the ages of the users A, B, and C based on previously stored age information of the users A, B, and C. Age information of at least one of the users A, B, and C may be stored in the storage unit of the content playing apparatus 1200. The age information may be in a form in which the ages of the users A, B, and C are respectively mapped to images thereof, according to a table 2910 of FIG. 29. Referring to FIG. 29, the content playing apparatus 1200 may determine that the users A, B, and C are 34 years old, 17 years old, and 6 years old, respectively.

Once the ages of the users A, B, and C have been determined, the content playing apparatus 1200 selects the youngest user from among the users A, B, and C. In FIG. 29, since the user C is the youngest, the content playing apparatus 1200 selects the user C.

After the youngest user is selected, the content playing apparatus 1200 controls the playing of the content according to the selected user. Therefore, the content playing apparatus 1200 restricts viewing of the content according to the age (6 years old) of the user C.

In this case, the content playing apparatus 1200 compares a viewing rating of the content with the age of the selected user and may control the playing of the content according to whether the selected user is allowed to view the content. Detailed descriptions thereof are the same as the descriptions provided with reference to FIG. 5. Also, a detailed method of restricting the viewing of the content by the content playing apparatus 1200 is the same as the methods described with reference to FIGS. 6 to 13.

A case where a user who is viewing content leaves will be described with reference to FIGS. 30 and 31.

Figure 30:
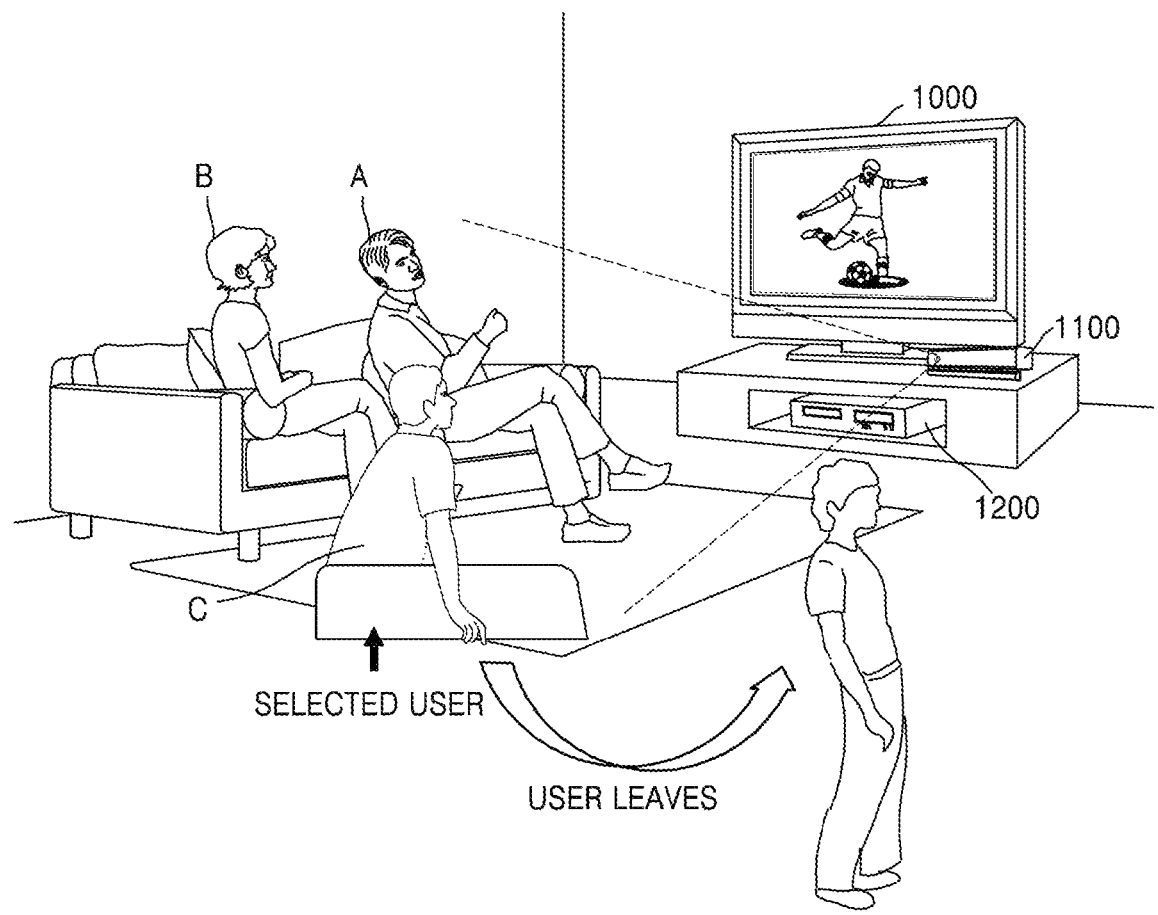

Referring to FIG. 30, while the users A, B, and C are viewing the content played by the display apparatus 1000, the user C leaves. The display apparatus 1000 may be connected to the user recognition apparatus 1100 for recognizing a user who views the content and the content playing apparatus 1200 for controlling playing of the content.

Before the user C leaves, the content playing apparatus 1200 selects the user C who is the youngest, from among the users A, B, and C and controls the playing of the content based on the user C. When the user C leaves, the user recognition apparatus 1100 recognizes that at least one of the users has left, captures images of the users, and transmits the captured images to the content playing apparatus 1200.

In this case, it is assumed that the ages of the users A and B are not stored in the content playing apparatus 1200. Therefore, when the user C leaves, the content playing apparatus 1200 may identify the ages of the users A and B who remain after the user C leaves and compare them in order to select one of the users A and B. A detailed description thereof will be provided with reference to FIG. 31.

Figure 31:
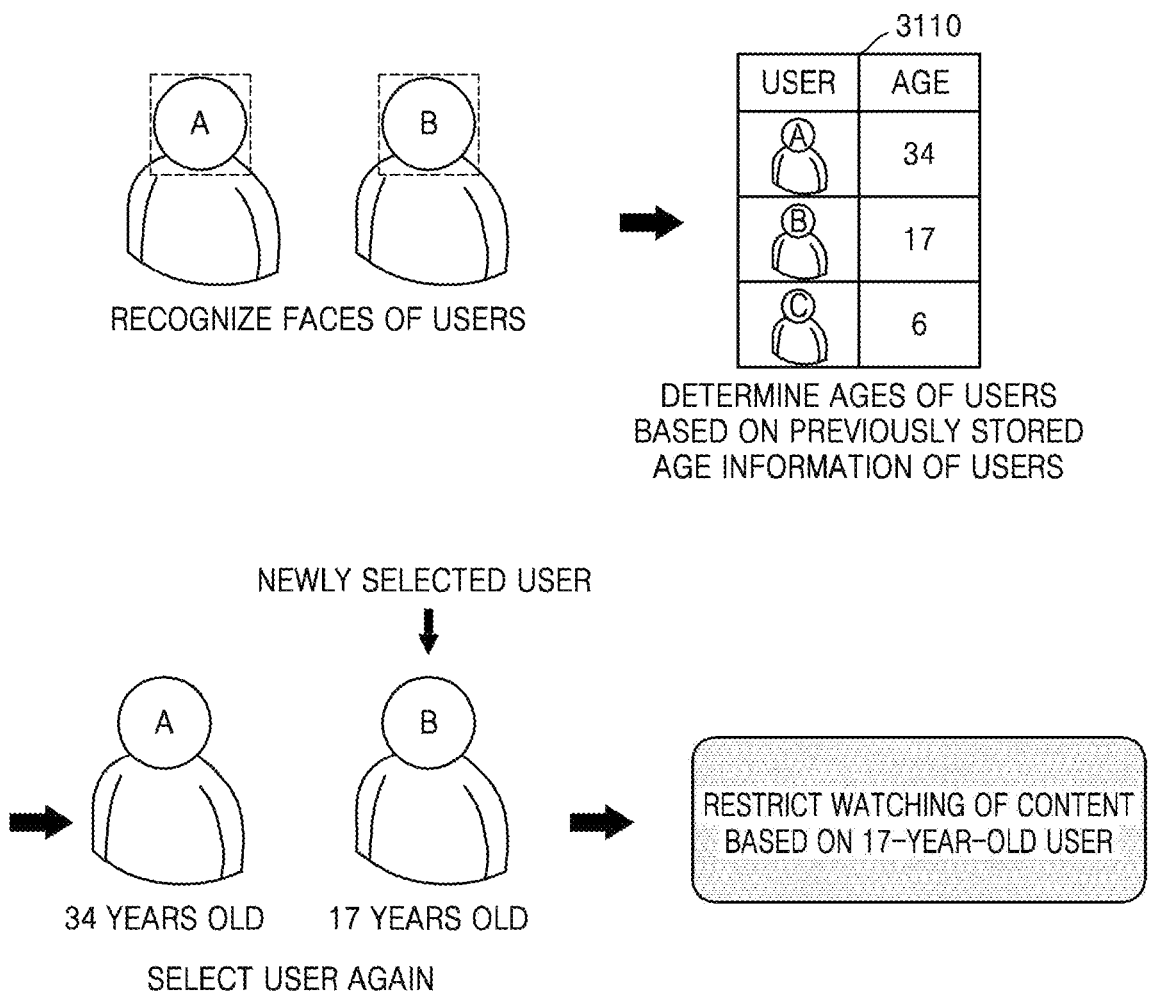

Referring to FIG. 31, the user recognition apparatus 1100 and the content playing apparatus 1200 recognize faces of users A and B who remain. A method of recognizing the faces of the users A and B is the same as the method described with reference to FIG. 4.

Once the faces of the users A and B have been recognized, the content playing apparatus 1200 determines the ages of the users A and B based on previously stored age information of the users A and B. Age information of at least one of the users A and B may be stored in the storage unit of the content playing apparatus 1200. The age information may be in a form in which the ages of the users A and B are respectively mapped to images thereof, according to a table 3110 of FIG. 31.

The content playing apparatus 1200 compares the recognized faces of the users A and B against the images thereof which are stored in the table 3110 so as to determine the ages of the users A and B. Referring to the table 3110 of FIG. 31, the content playing apparatus 1200 may determine that the users A and B are 34 years old and 17 years old, respectively.

Once the ages of the users A and B have been determined, the content playing apparatus 1200 selects the youngest user among the users A and B. Referring to FIG. 31, the user B is the youngest, and thus, the content playing apparatus 1200 selects the user B.

After the selection is completed, the content playing apparatus 1200 controls the playing of the content according to the selected user. Therefore, the content playing apparatus 1200 restricts viewing of the content according to the age (17 years old) of the user B.

In this case, the content playing apparatus 1200 compares a viewing rating of the content with the age of the selected user and may control the playing of the content according to whether the selected user is allowed to view the content. Detailed descriptions thereof are the same as the descriptions provided with reference to FIG. 5. Also, a detailed method of restricting the viewing of the content by the content playing apparatus 1200 is the same as the methods described with reference to FIGS. 6 to 13.

Figure 32:
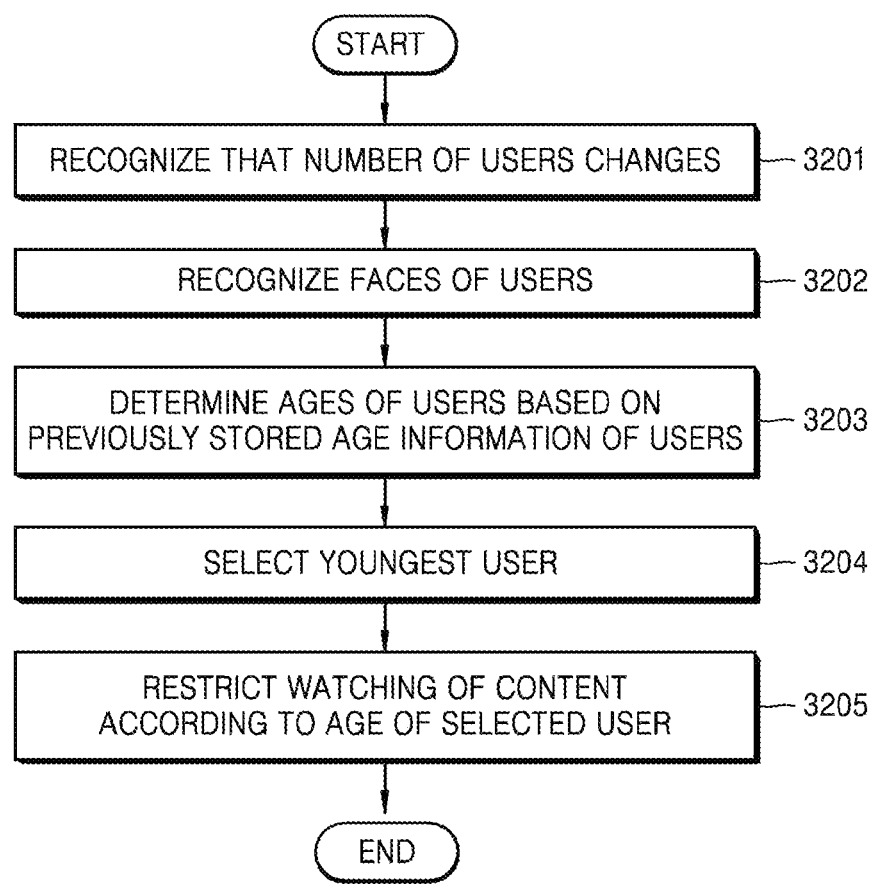
FIG. 32 is a flowchart of a method of controlling playing of content when the number of users viewing the content changes and the ages of the users are not stored in the content playing apparatus, according to an exemplary embodiment.

FIG. 32 is a flowchart of a method of controlling playing of content when the number of users viewing the content changes and the ages of the users are not stored in the content playing apparatus 1200, according to an exemplary embodiment.

Referring to FIG. 32, the user recognition apparatus 1100 and the content playing apparatus 1200 recognize that the number of users changes, in operation 3201. That is, when the number of users viewing the content changes, the user recognition apparatus 1100 captures images of the users and transmits the captured images to the content playing apparatus 1200, and the content playing apparatus 1200 recognizes that another user viewing the content is added or some of the users viewing the content have left, based on the transmitted images.

In operation 3202, the user recognition apparatus 1100 and the content playing apparatus 1200 recognize faces of the users. For example, the user recognition apparatus 1100 captures an image of the added user and transmits the captured image to the content playing apparatus 1200, and the content playing apparatus 1200 recognizes a portion of the face of the added user from the transmitted image and extracts a facial characteristic of the user so as to recognize the face of the user.

In operation 3203, the content playing apparatus 1200 compares the recognized faces of the users against previously stored age information of the users to determine the ages of the users. In this case, the age information of the users is in a table form in which the ages of the users are respectively mapped to the images of the users and may be stored in the content playing apparatus 1200 in advance.

If the ages of the users are determined, the content playing apparatus 1200 selects the youngest user in operation 3204.

In operation 3205, the content playing apparatus 1200 restricts viewing of the content according to the age of the selected user. A detailed method of restricting the viewing of the content by the content playing apparatus 1200 is the same as the methods described with reference to FIGS. 6 to 13.

Figure 33:
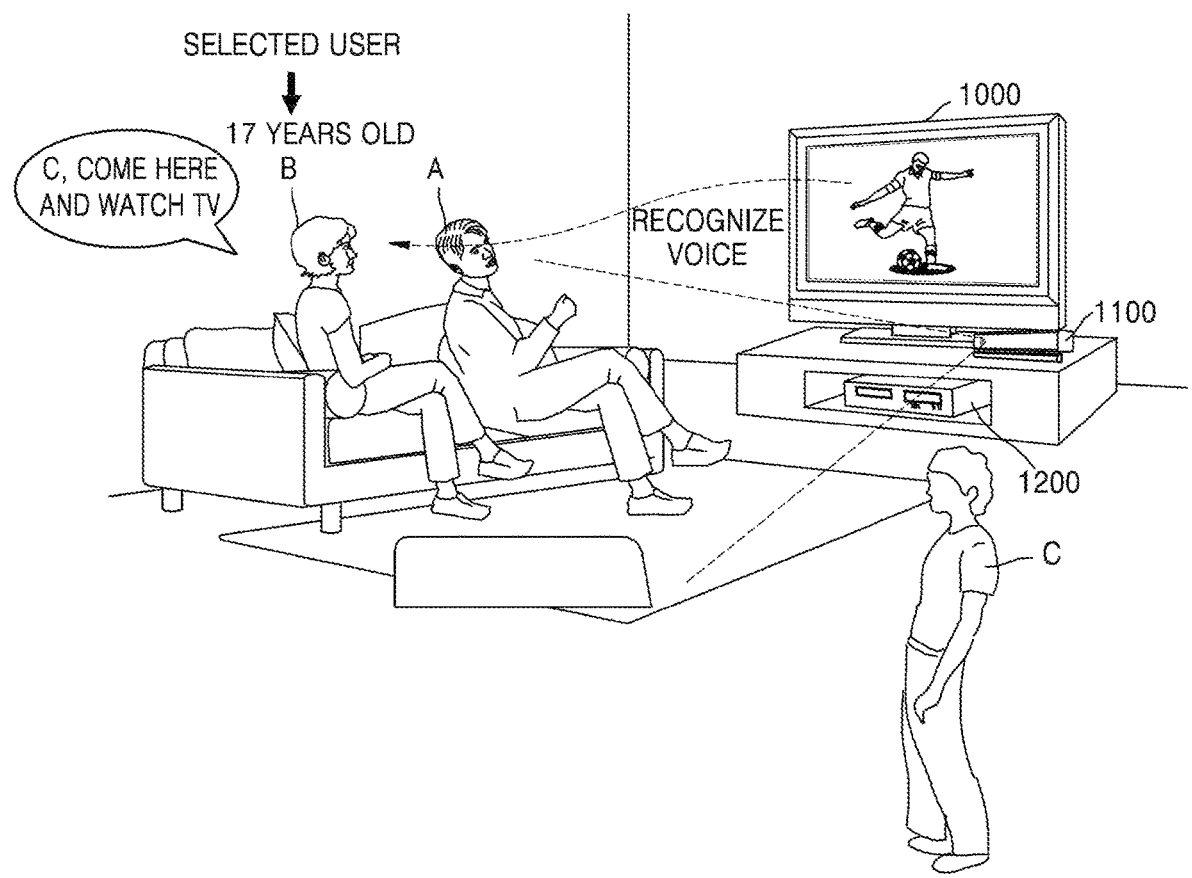
FIGS. 33 and 34 are views of explaining a method of controlling playing of content when conversations between users are analyzed and predicting the addition of a user, according to an exemplary embodiment.
Figure 34:
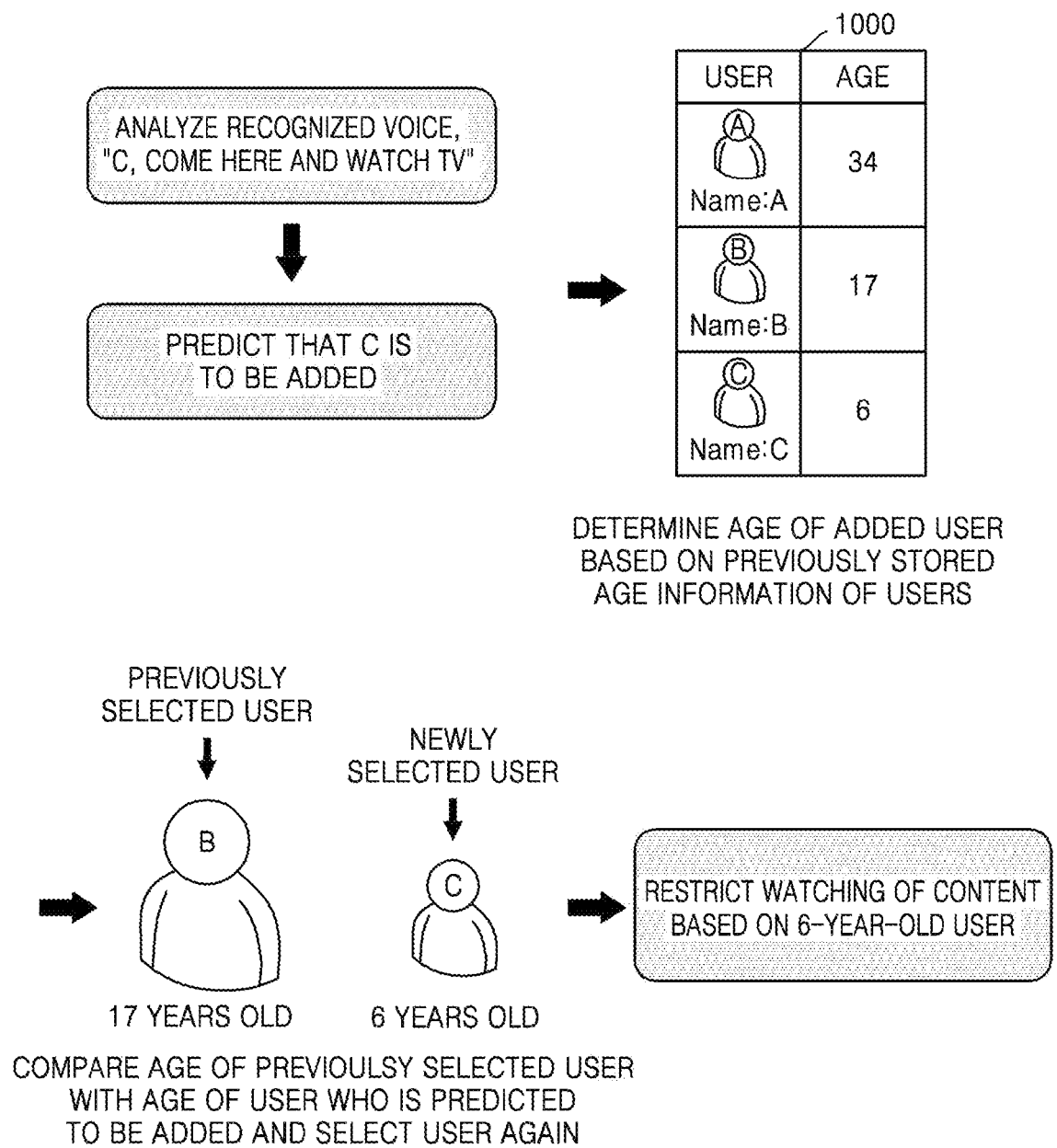

FIGS. 33 and 34 are views of explaining a method of controlling playing of content when conversations between users are analyzed and predicting the addition of a user, according to an exemplary embodiment.

Referring to FIG. 33, users A and B view the content played by the display apparatus 1000, but a user C is not viewing the content. The user recognition apparatus 1100 has recognized that only the users A and B are viewing the content, and the content playing apparatus 1200 has selected the user B, who is the youngest, and is controlling the playing of the content according to the user B.

As shown in FIG. 33, while the users A and B are viewing the content, the user B suggests for the user C to view the content. In this case, it is assumed that the user recognition apparatus 1100 has a function for recognizing voices. For example, the user recognition apparatus 1100 has a microphone which recognizes voices. The content playing apparatus 1200 recognizes and analyzes the voice of the user B which is received from the user recognition apparatus 1100 and may predict that the user C will be added as a user. The content playing apparatus 1200 controls the playing of the content according to the above prediction. Detailed processes of predicting addition of another user and controlling the playing of the content will be described with reference to FIG. 34.

Referring to FIG. 34, the content playing apparatus 1200 analyzes a conversation including a suggestion by the user B for the user C to view the content and predicts that the user C will be added. After the prediction is completed, the content playing apparatus 1200 determines the age of the user C to be added.

The method of predicting the age of the user C, the method performed by the content playing apparatus 1200, is as follows. Since the user C has not yet been added as a user, the user recognition apparatus 1100 may not recognize a face of the user C. However, since the content playing apparatus 1200 identifies the name of the user C through voice recognition, the content playing apparatus 1200 may determine the age of the user C by comparing the name of the user C against previously stored age information of users. The age information of the users may be in a form in which the ages of the users are respectively mapped to the names of the users as shown in a table 3410 of FIG. 34. The content playing apparatus 1200 compares the recognized name of the user C with the table 3410 of FIG. 34 containing the age information of the users and may determine that the user C is 6 years old.

Once the age of the user C has been determined, the content playing apparatus 1200 compares the age of the previously selected user, that is, the user B, with the age of the user C who is predicted to be added and may select one of the users B and C. As a result, since the user C is younger than the user B, the user C is selected.

After the selection is made, the content playing apparatus 1200 controls the playing of the content according to the selected user. Therefore, the content playing apparatus 1200 controls the playing of the content according to the age (6 years old) of the user C.

In this case, the content playing apparatus 1200 compares a viewing rating of the content with the age of the selected user and may control the playing of the content according to whether the selected user is allowed to view the content. Detailed descriptions thereof are the same as the descriptions provided with reference to FIG. 5. Also, a detailed method of restricting the viewing of the content by the content playing apparatus 1200 is the same as the methods described with reference to FIGS. 6 to 13.

Figure 35:
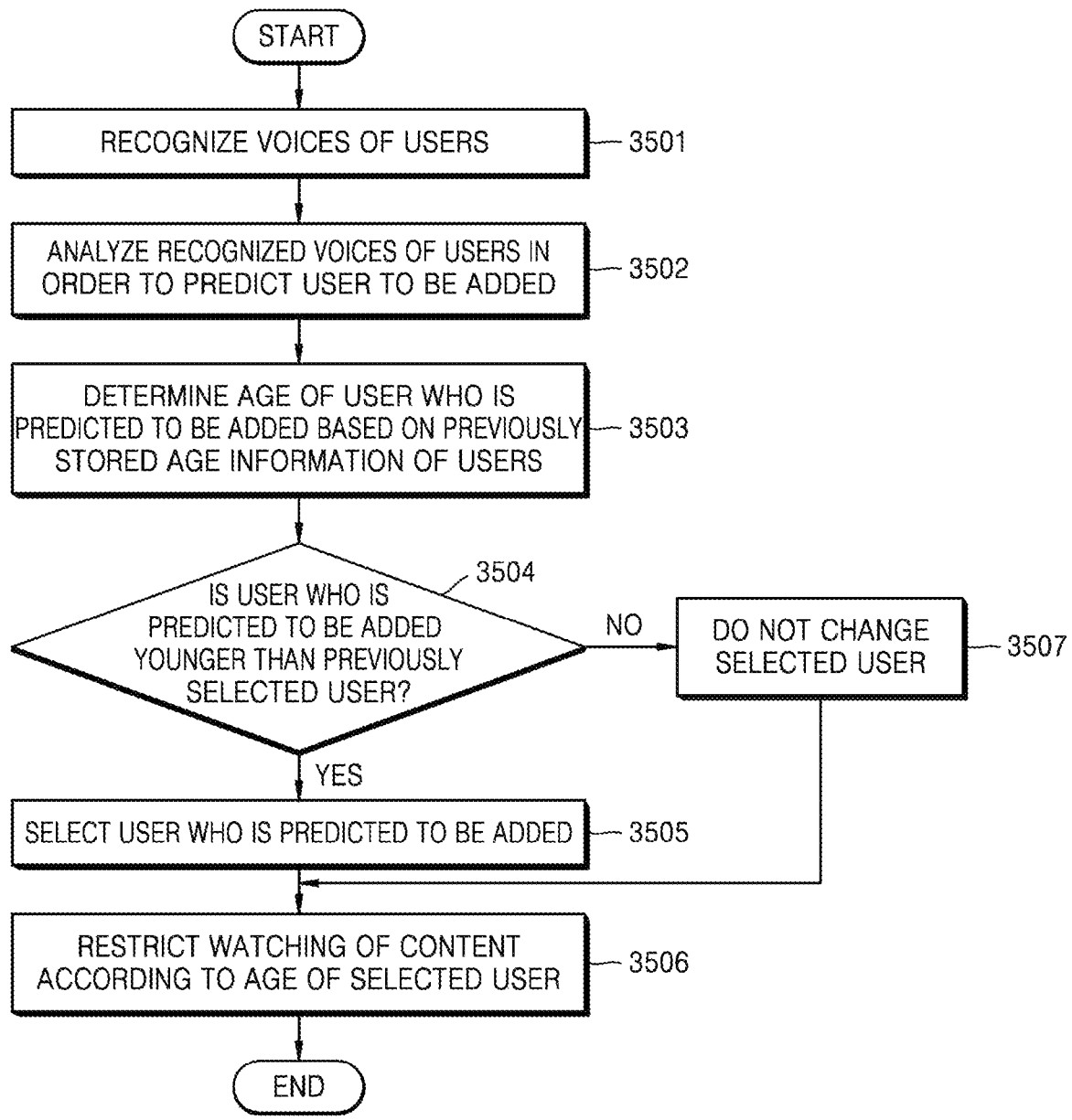
FIG. 35 is a flowchart of a method of controlling playing of content when conversations between users are analyzed and predicting the addition of a user, according to an exemplary embodiment.

FIG. 35 is a flowchart of a method of controlling playing of content when conversations between users are analyzed and predicting the addition of a user, according to an exemplary embodiment.

Referring to FIG. 35, in operation 3501, the user recognition apparatus 1100 and the content playing apparatus 1200 recognize voices of the users. That is, the user recognition apparatus 1100 receives conversations between the users and transmits the received conversations to the content playing apparatus 1200.

In operation 3502, the content playing apparatus 1200 analyzes the recognized voices of the users and predicts that another user is to be added. For example, if the conversations between the users include a suggestion for a new user to view the content, the content playing apparatus 1200 predicts that the new user will be added.

In operation 3503, the content playing apparatus 1200 determines the age of the user who is predicted to be added based on previously stored age information of users. In this case, since the user predicted to be added is not yet present, the content playing apparatus 1200 is unable to recognize a face of the user predicted to be added. Therefore, the content playing apparatus 1200 compares the name of the user predicted to be added, which has been identified through voice recognition, against the age information of the users, and then, determines the age of the user. In this case, the age information may be in a form in which the ages of the users are respectively mapped to the names of the users.

In operation 3504, the content playing apparatus 1200 determines whether the user who is predicted to be added is younger than a previously selected user. If the user who is predicted to be added is younger than the previously selected user, the content playing apparatus 1200 newly selects the user who is predicted to be added in operation 3505. However, if the user who is predicted to be added is older than the previously selected user, operation 3507 is performed, and the content playing apparatus 1200 maintains the current user selection.

If the new selection is made, the content playing apparatus 1200 restricts viewing of the content according to the age of the selected user in operation 3506. A detailed method of restricting the viewing of the content by the content playing apparatus 1200 is the same as the methods described with reference to FIGS. 6 to 13.

Figure 36:
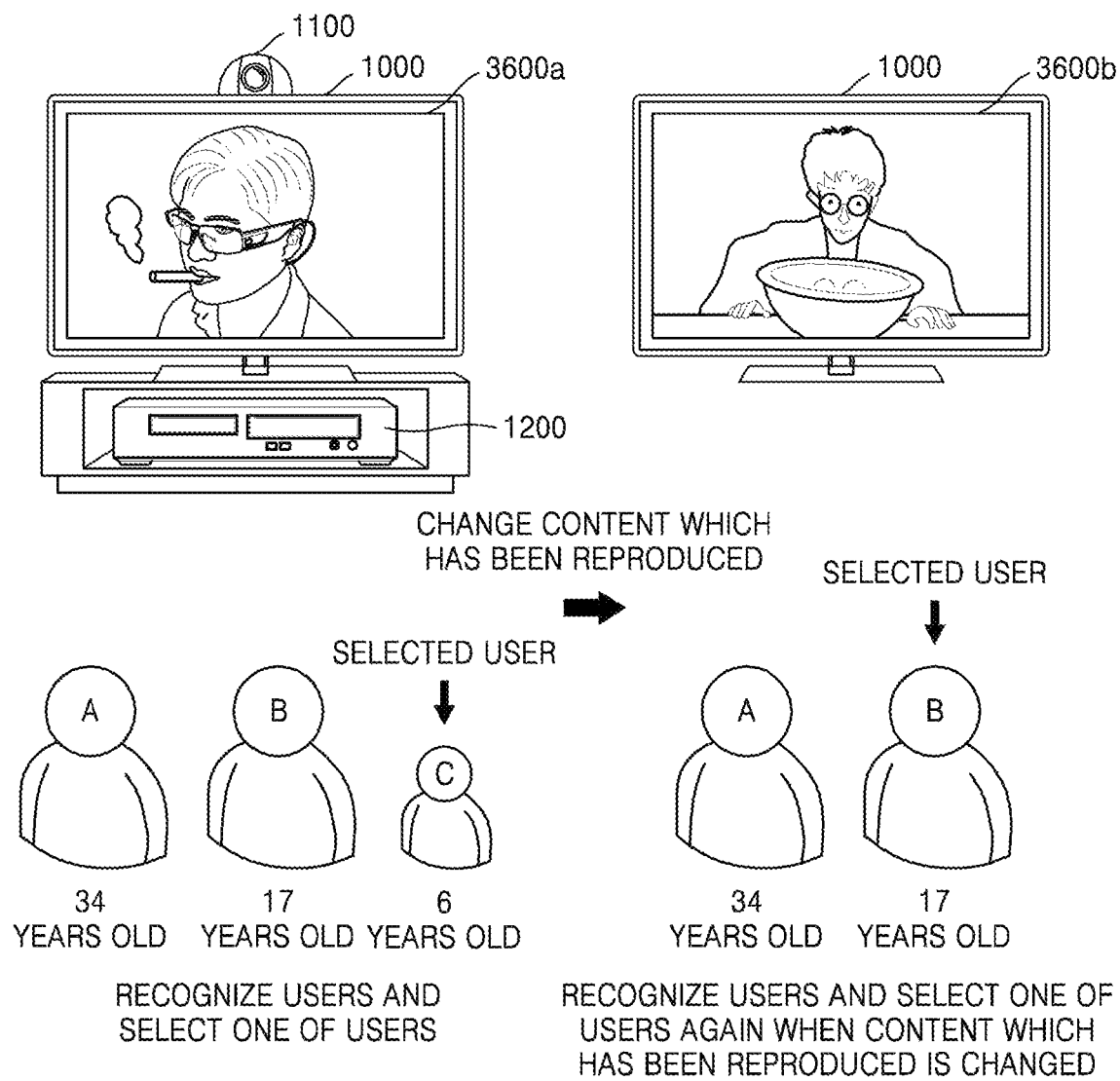
FIGS. 36 and 37 are views for explaining a method of recognizing users when content being played changes and of controlling playing of content, according to an exemplary embodiment.
Figure 37:
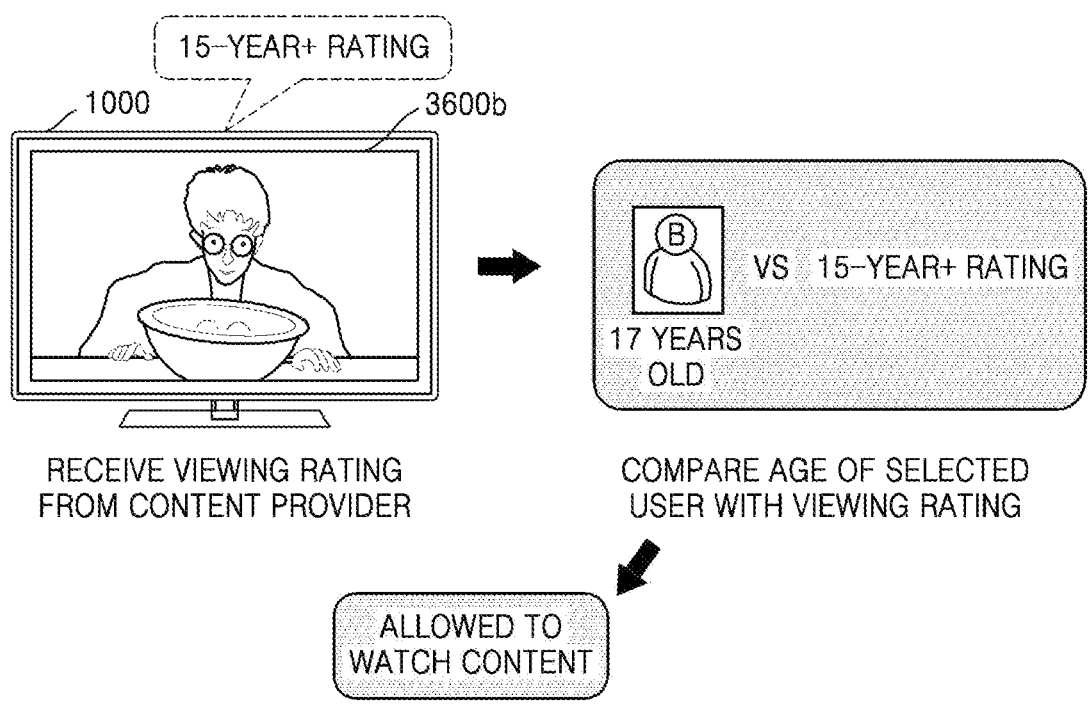

FIGS. 36 and 37 are views for explaining a method of recognizing users when content being played changes and of controlling playing of content, according to an exemplary embodiment.

Referring to FIG. 36, the user recognition apparatus 1100 and the content playing apparatus 1200 recognize users viewing first content 3600*a* and select a user C who is the youngest. The content playing apparatus 1200 controls playing of the first content 3600*a* according to the age (6 years old) of the selected user, that is, the user C.

If content played by the content playing apparatus 1200 changes from the first content 3600*a* to second content 3600*b*, the content playing apparatus 1200 recognizes the users and selects one of the users again. That is, the content playing apparatus 1200 recognizes users A and B viewing the second content 3600*b*, determines the ages of the users A and B, and selects the user B who is the youngest.

Referring to FIG. 37, the content playing apparatus 1200 compares the age of the user B who is newly selected against a viewing rating of the second content 3600*b* and restricts viewing of the content. The content playing apparatus 1200 receives the viewing rating (a 15+ rating) of the second content 3600*b* from a content provider and compares the received viewing rating with the age (17 years old) of the selected user, that is, the user B. Since the age (17 years old) of the selected user is higher than a reference age (15 years old) of the viewing rating of the second content 3600*b*, the content playing apparatus 1200 determines that the user B is allowed to view the second content 3600*b*. Therefore, the content playing apparatus 1200 plays the second content 3600*b* without any restriction.

Figure 38:
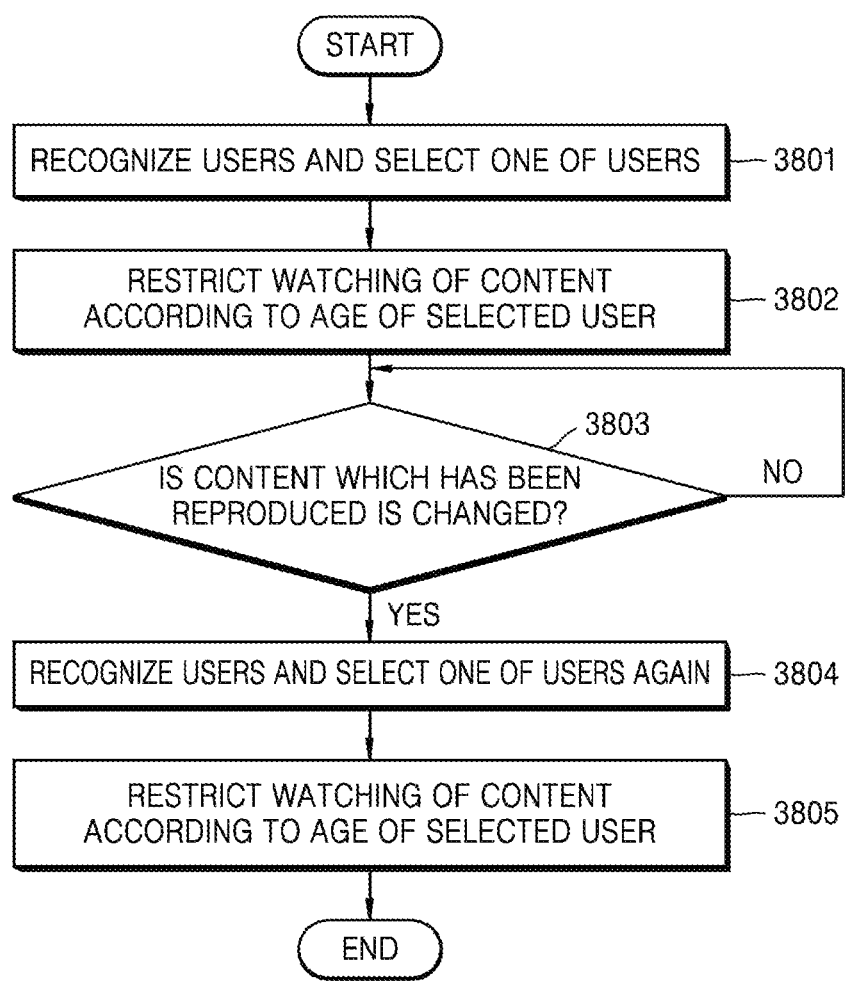
FIG. 38 is a flowchart of a method of recognizing users when content being played changes and of controlling playing of content, according to an exemplary embodiment.

FIG. 38 is a flowchart of a method of recognizing users when content being played changes and of controlling playing of content, according to an exemplary embodiment.

Referring to FIG. 38, in operation 3801, the user recognition apparatus 1100 and the content playing apparatus 1200 recognize users viewing the content and select one of the users. A method of recognizing the users and selecting one of the users based on the ages thereof is the same as the method described with reference to FIG. 4.

In operation 3802, the content playing apparatus 1200 restricts viewing of the content according to the age of the selected user. A detailed method of restricting the viewing of the content by the content playing apparatus 1200 is the same as the methods described with reference to FIGS. 6 to 13.

In operation 3803, the content playing apparatus 1200 determines whether content being played changes.

If it is determined that the content being played changes, the content playing apparatus 1200 recognizes the users and selects one of the users again in operation 3804. A method of recognizing the users and selecting one of the users is the same as the method described in operation 3801.

If the new selection is made, the content playing apparatus 1200 restricts viewing of the content according to the age of the selected user in operation 3805. A detailed method of restricting the viewing of the content by the content playing apparatus 1200 is the same as the methods described with reference to FIGS. 6 to 13.

Figure 39:
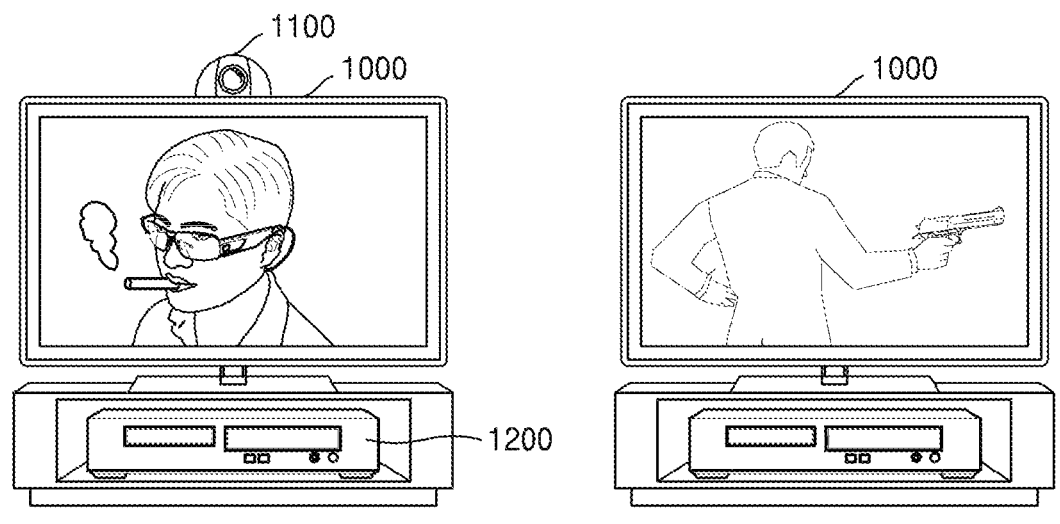
FIGS. 39 and 40 are views for explaining methods of periodically recognizing users and controlling playing of content, according to exemplary embodiments.
Figure 39:
Figure 39:
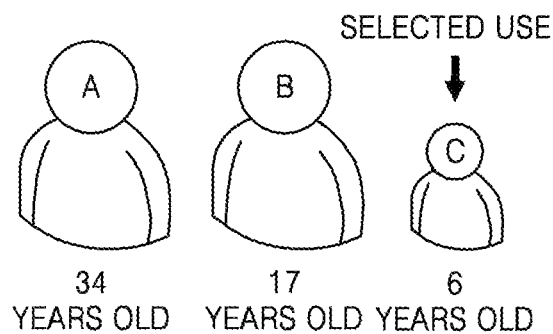
Figure 39:
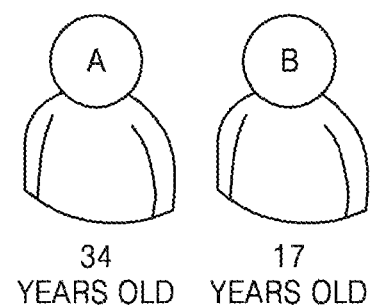
Figure 40:
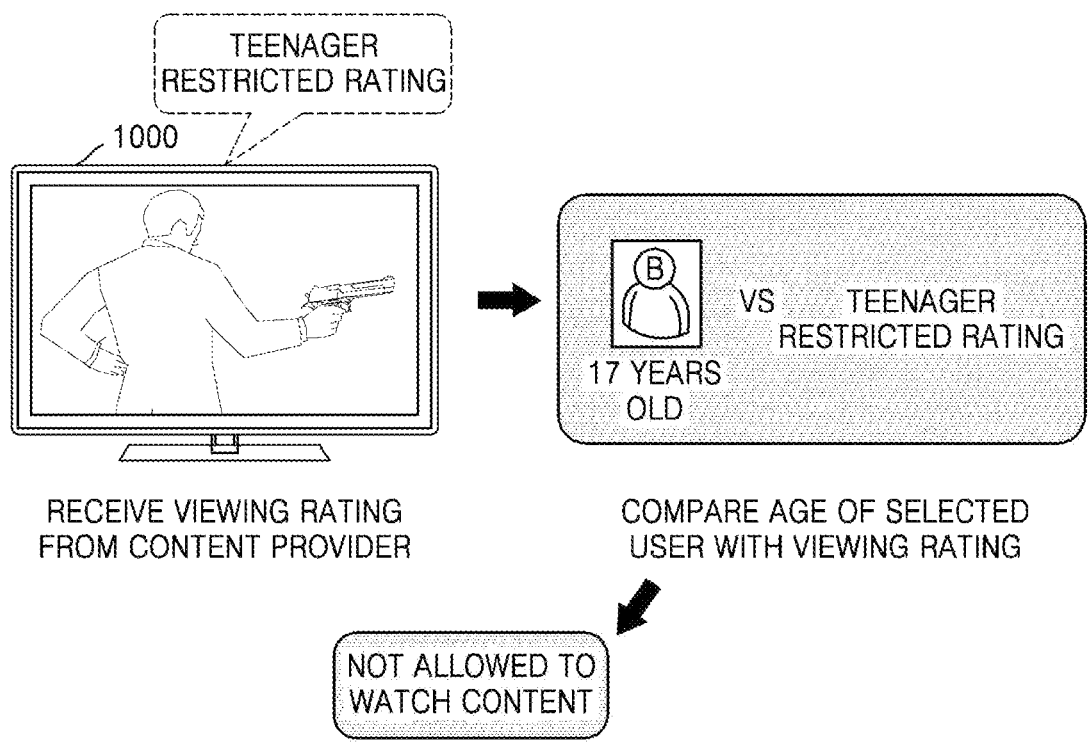

FIGS. 39 and 40 are views for explaining methods of periodically recognizing users and controlling playing of content, according to exemplary embodiments.

Referring to FIG. 39, the user recognition apparatus 1100 and the content playing apparatus 1200 recognize users viewing the content and select the user C who is the youngest. The content playing apparatus 1200 controls the playing of the content according to the age (6 years old) of the selected user, that is, the user C.

After a predetermined amount of time has passed, the user recognition apparatus 1100 and the content playing apparatus 1200 recognize the users and select one of the users again. That is, the user recognition apparatus 1100 and the content playing apparatus 1200 periodically recognize the users and select one of the users. In this case, a cycle in which the users are recognized and one of the users is selected may be arbitrarily set. For example, a user may set the user recognition apparatus 1100 and the content playing apparatus 1200 to recognize the users and select one of the users at 10-minute intervals. In FIG. 39, the user recognition apparatus 1100 and the content playing apparatus 1200 recognize the users A and B viewing the content after a predetermined amount of time has passed and then select the user B who is the youngest.

Referring to FIG. 40, the content playing apparatus 1200 compares the age of the user B who is newly selected against a viewing rating of the content and restricts viewing of the content. The content playing apparatus 1200 receives the viewing rating (a teenager restricted rating) of the content from a content provider and compares the received viewing rating with the age (17 years old) of the user B who is newly selected. Since the age (17 years old) of the selected user is lower than a reference age (19 years old) of viewing rating, the content playing apparatus 1200 determines that the selected user is not allowed to view the content. Therefore, the content playing apparatus 1200 restricts viewing of the content. A detailed method of restricting the viewing of the content by the content playing apparatus 1200 is the same as the methods described with reference to FIGS. 6 to 13.

Figure 41:
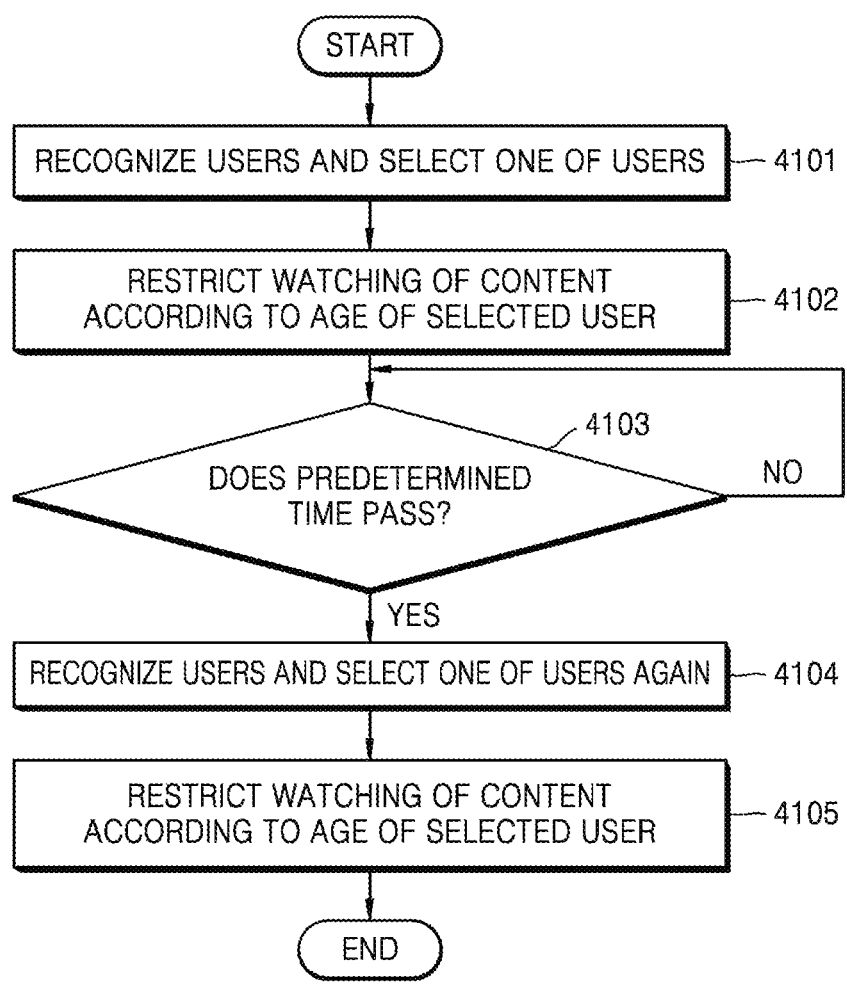
FIG. 41 is a flowchart of a method of periodically recognizing users and controlling playing of content, according to exemplary embodiments.

FIG. 41 is a flowchart of a method of periodically recognizing users and controlling playing of content, according to exemplary embodiments.

Referring to FIG. 41, the user recognition apparatus 1100 and the content playing apparatus 1200 recognize users viewing the content and select any one of the users. A method of recognizing the users and selecting one of the users based on the ages thereof is the same as the method described with reference to FIG. 4.

In operation 4102, the content playing apparatus 1200 restricts the viewing of the content according to the age of the selected user. A detailed method of restricting the viewing of the content by the content playing apparatus 1200 is the same as the methods described with reference to FIGS. 6 to 13.

In operation 4103, the content playing apparatus 1200 determines whether a predetermined amount of time has passed.

After the determination is made, the user recognition apparatus 1100 and the content playing apparatus 1200 recognize the users and select one of the users again. In this case, a method of recognizing the users and selecting one of the users which is performed by the user recognition apparatus 1100 and the content playing apparatus 1200 is the same as the method described in operation 4101.

If the new selection is made, the content playing apparatus 1200 restricts viewing of the content according to the age of the selected user in operation 4105. A detailed method of restricting the viewing of the content by the content playing apparatus 1200 is the same as the methods described with reference to FIGS. 6 to 13.

Figure 42A:
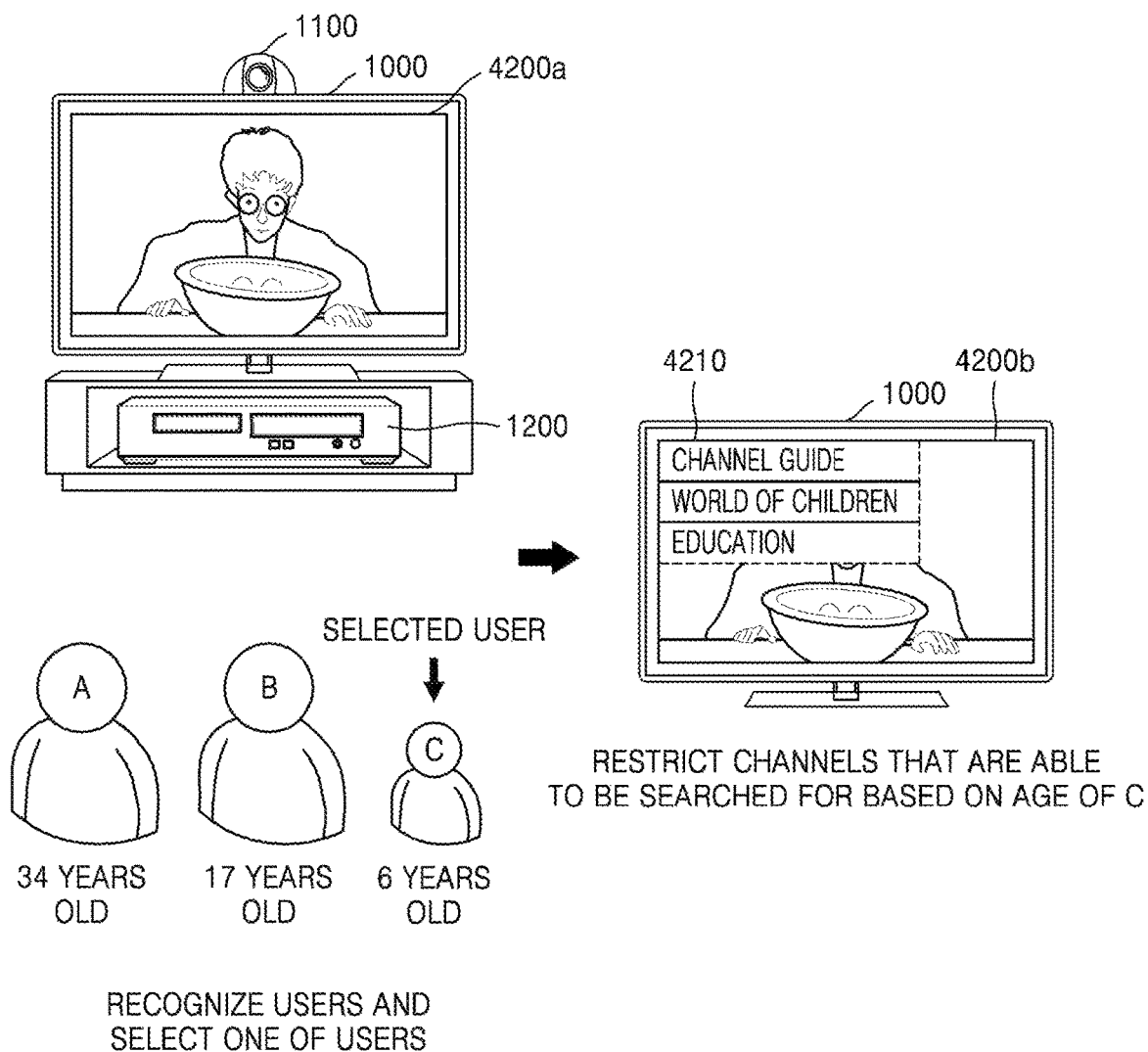
FIG. 42A is a view for explaining a method of restricting channels searchable by a user according to the age of a selected user.

FIG. 42A is a view of explaining a method of restricting channels searchable by a user according to the age of a selected user.

Referring to FIG. 42A, the user recognition apparatus 1100 and the content playing apparatus 1200 recognize users viewing the content and select the user C who is the youngest. The content playing apparatus 1200 controls the playing of the content according to the age (6 years old) of the selected user, that is, the user C. In addition, when a search request is input for searching for channels, the content playing apparatus 1200 may restrict search to certain channels according to the age (6 years old) of the selected user, that is, the user C.

For example, if the search request is received while a first screen 4200*a* is being displayed on the display apparatus 1000, the content playing apparatus 1200 may restrict the search to certain channels according to the age (6 years old) of the selected user, that is, the user C. That is, the content playing apparatus 1200 displays, on a screen of the display apparatus 1000, a search result including channels other than channels inappropriate for the selected user. Referring to FIG. 42A, the content playing apparatus 1200 displays a search result 4210, from which restricted channels have been filtered out, on a second screen 4200*b*.

Figure 42B:
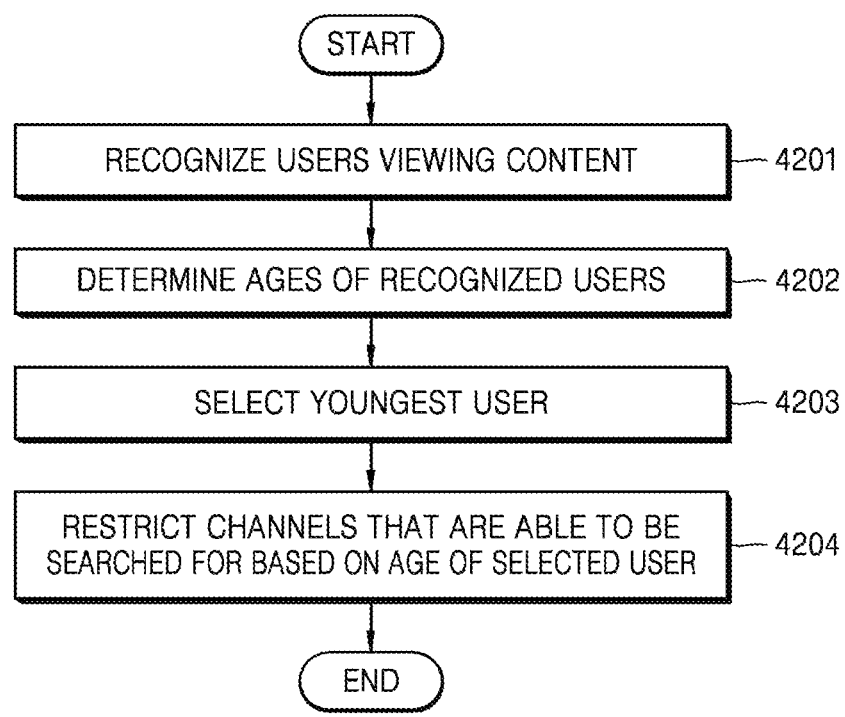
FIG. 42B is a flowchart of a method of restricting a search of channels according to a user selected based on ages, according to an exemplary embodiment.

FIG. 42B is a flowchart of a method of restricting a search of channels according to a user selected based on ages, according to an exemplary embodiment.

Referring to FIG. 42B, the user recognition apparatus 1100 and the content playing apparatus 1200 recognize faces of users viewing the content in operation 4201. For example, the user recognition apparatus 1100 captures images of the users viewing the content and transmits the captured images to the content playing apparatus 1200, and the content playing apparatus 1200 identifies portions of the faces of the users from the transmitted images and extracts characteristics of the users from the captured images.

In operation 4202, the content playing apparatus 1200 compares the recognized faces of the users against previously stored age information of the users so as to determine the ages of the users. In this case, the age information of the users may be in a table form in which the ages of the users are respectively mapped to the images of the users and may be stored in the content playing apparatus 1200 in advance.

A method of recognizing the users and selecting one of the users based on the ages thereof is the same as the method described with reference to FIG. 4.

Once the ages of the users have been determined, the content playing apparatus 1200 selects the youngest user in operation 4203.

In operation 4204, the content playing apparatus 1200 receives a request for searching for channels and restricts channels searchable by the selected user, according to the age of the selected user. That is, the content playing apparatus 1200 displays, on a screen of the display apparatus 1000, a search result including channels other than channels inappropriate for the selected user.

Figure 43A:
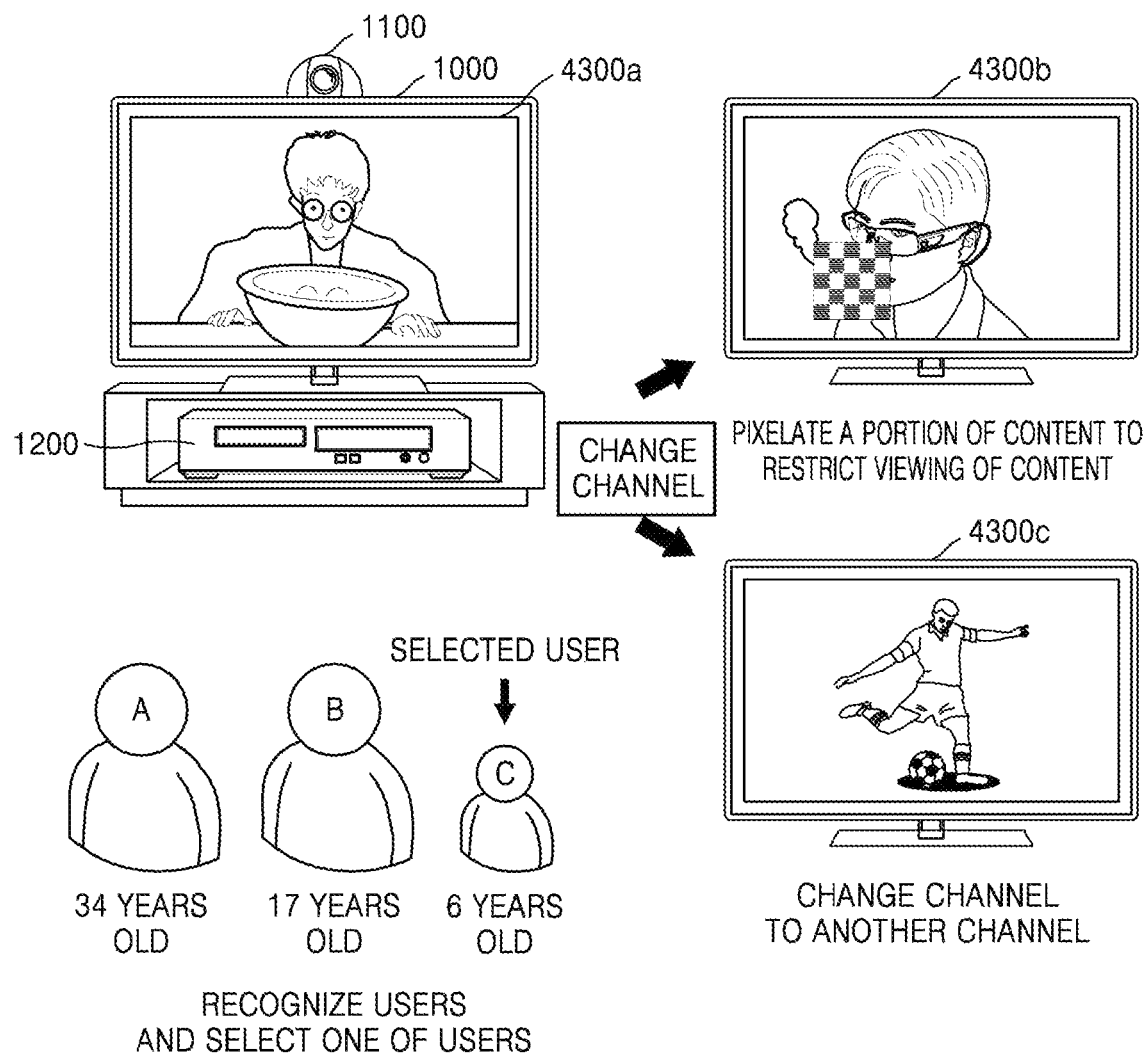
FIG. 43A is a view of a method of restricting playing of content according to a user selected based on ages when a channel changes, according to an exemplary embodiment.

FIG. 43A is a view of a method of restricting playing of content according to a user selected based on ages when a channel changes, according to an exemplary embodiment.

Referring to FIG. 43A, the user recognition apparatus 1100 and the content playing apparatus 1200 recognize users viewing the content and select a user C who is the youngest. The content playing apparatus 1200 controls playing of the content when a channel changes according to the age (6 years old) of the selected user, that is, the user C.

In detail, when the channel displayed on the display apparatus 1000 changes, the content playing apparatus 1200 determines whether content that the user C is not allowed to view is being played on the changed channel. If the user C is not allowed to view the content being displayed on the changed channel, the content playing apparatus 1200 may restrict viewing of the content or may change the channel to another channel on which content appropriate for the user C is being played.

According to FIG. 43A, when a channel on which a first screen 4300*a* that is allowed to the user C is being played changes to a channel on which a second screen 4300*b* that the user C is not allowed to view is being played, the content playing apparatus 1200 may pixelate a portion of the second screen 4300b in order to restrict the viewing of the content, as illustrated in FIG. 43A. A detailed method of restricting the viewing of the content in the content playing apparatus 1200 is the same as the methods described with reference to FIGS. 6 to 13.

Alternatively, the content playing apparatus 1200 may skip the channel on which the content that the user C is not allowed to view is being played and may change the channel to another channel on which content, for example, a third screen 4300c, which is allowed to the user C is being played.

Figure 43B:
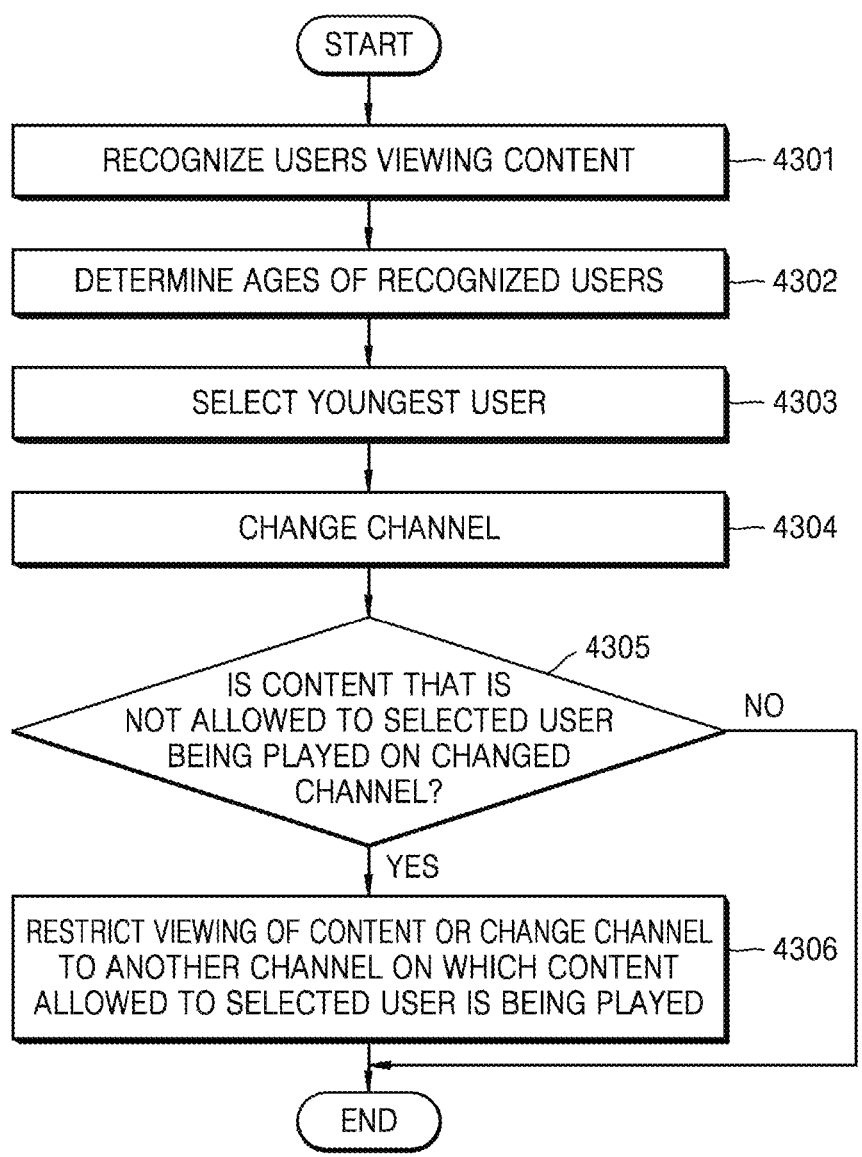
FIG. 43B is a flowchart of a method of restricting playing of content according to a user selected based on ages when a channel changes, according to an exemplary embodiment.

FIG. 43B is a flowchart of a method of restricting playing of content according to a user selected based on ages when a channel changes, according to an exemplary embodiment.

Referring to FIG. 43B, in operation 4301, the user recognition apparatus 1100 and the content playing apparatus 1200 recognize faces of users viewing the content. For example, the user recognition apparatus 1100 captures images of the users viewing the content and transmits the captured images to the content playing apparatus 1200, and the content playing apparatus 1200 may identify portions of the faces of the users from the captured images of the users and then extract facial characteristics.

In operation 4302, the content playing apparatus 1200 compares the recognized faces of the users against the previously stored age information so as to determine the ages of the users. In this case, the age information of the users is in a table form in which the ages of the users are mapped to the images of the users and may be stored in the content playing apparatus 1200 in advance.

The method of recognizing the faces of the users viewing the content and determining the ages of the users is the same as the method described with reference to FIG. 4.

If the ages of the users are determined, the content playing apparatus 1200 selects the youngest user in operation 4303.

When a channel of the display apparatus changes in operation 4304, the content playing apparatus 1200 determines whether content that is not allowed to the selected user is being played on the changed channel in operation 4305.

After the determination is made, if the content that is not allowed to the selected user is being played on the changed channel, the content playing apparatus 1200 may restrict viewing of the content or change the channel to another channel on which content allowed to the selected user is being played, in operation 4306.

Figure 44:
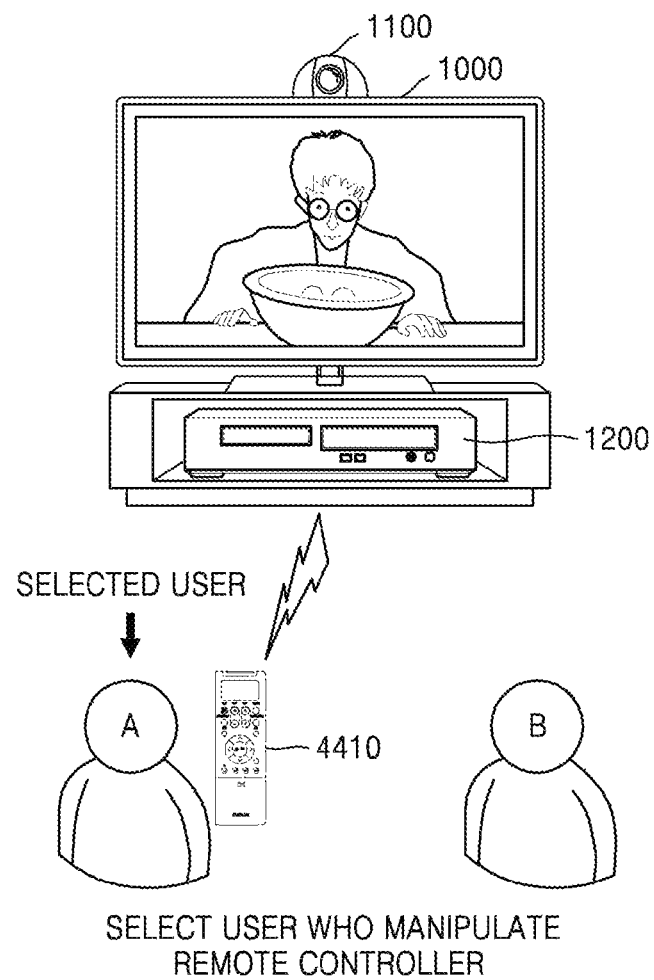
FIGS. 44 and 45 are views for explaining a method of displaying a preferred channel according to a user selected based on an action recognition result, according to an exemplary embodiment.
Figure 45:
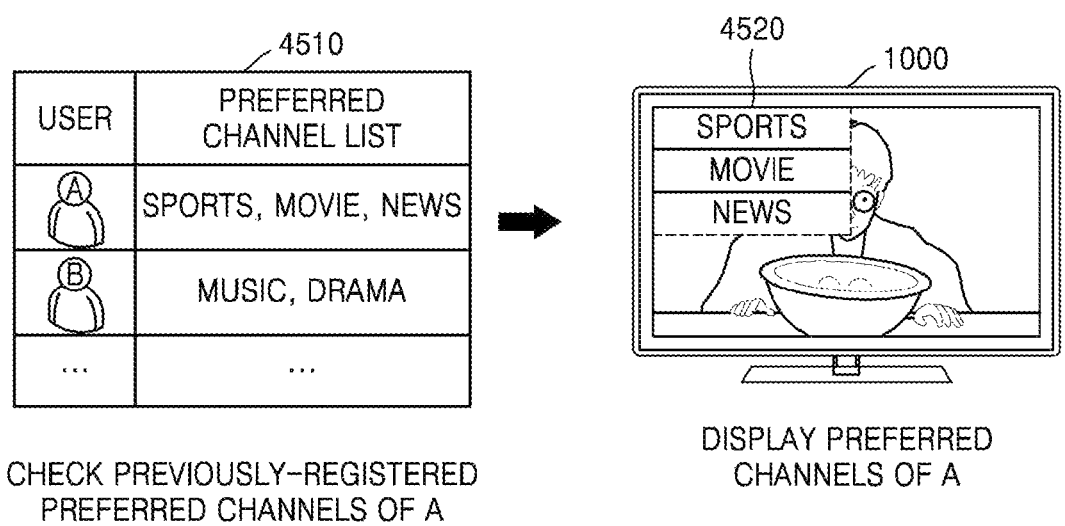

FIGS. 44 and 45 are views for explaining a method of displaying a preferred channel according to a user selected based on an action recognition result, according to an exemplary embodiment.

Referring to FIG. 44, users A and B view content played by the display apparatus 1000. In the present exemplary embodiment, the user recognition apparatus 1100 and the content playing apparatus 1200 recognize actions of the users and select a user who performs a certain action. In particular, the content playing apparatus 1200 selects the user A based on commands input by the user A via a remote control 4410, and channels of the display apparatus 1000 are manipulated by the user A according to a preference of the user A. The content playing apparatus 1200 may select a user based on various actions.

If the user is selected, a feedback based on the preference of the selected user is provided. Referring to FIG. 45, a preferred channel list 4510 with regard to each user is stored in the content playing apparatus 1200 in advance. Preferred channels of the users may be respectively mapped to the images of the users and may be stored in the preferred channel list 4510. In this case, as shown in FIG. 45, categories of channels may be stored or the preferred channels may be respectively stored in the preferred channel list 4510. Since the user A is selected in FIG. 44, the content playing apparatus 1200 confirms that the preferred channels of the user A are sports, movies, and news channels by referring to the preferred channel list 4510. The content playing apparatus 1200 displays, on a screen, a preferred channel list 4520 of the user A.

Figure 46:
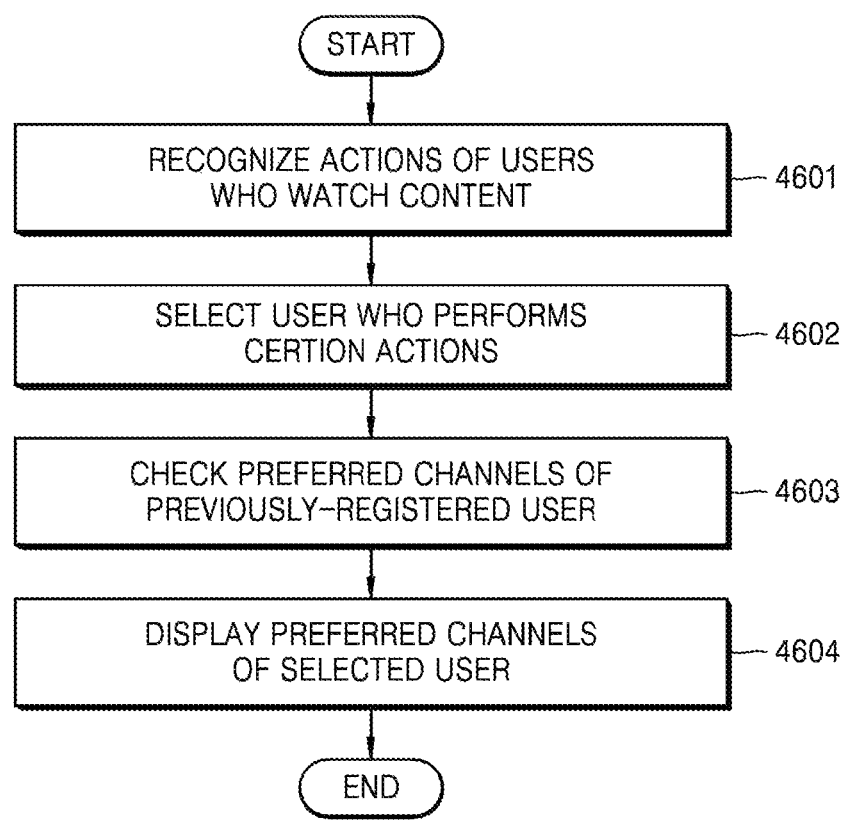
FIG. 46 is a flowchart of a method of displaying preferred channels according to a user selected based on an action recognition result, according to an exemplary embodiment.

FIG. 46 is a flowchart of a method of displaying preferred channels according to a user selected based on an action recognition result, according to an exemplary embodiment.

Referring to FIG. 46, in operation 4601, the user recognition apparatus 1100 and the content playing apparatus 1200 recognize actions of users viewing content by the content playing apparatus 1200. In this case, the content playing apparatus 1200 may recognize actions as well as faces of the users in order to identify each user.

In operation 4602, the content playing apparatus 1200 selects a user who performs a predetermined action. For example, the content playing apparatus 1200 may select a user inputting commands via a remote control. The content playing apparatus 1200 may select a user based on various actions.

In operation 4603, the content playing apparatus 1200 checks previously-stored preferred channels of the selected user. A preferred channel list with regard to each user may be stored in the content playing apparatus 1200 in advance.

In operation 4604, the content playing apparatus 1200 displays a preferred channel list of the selected user on a screen.

Figure 47:
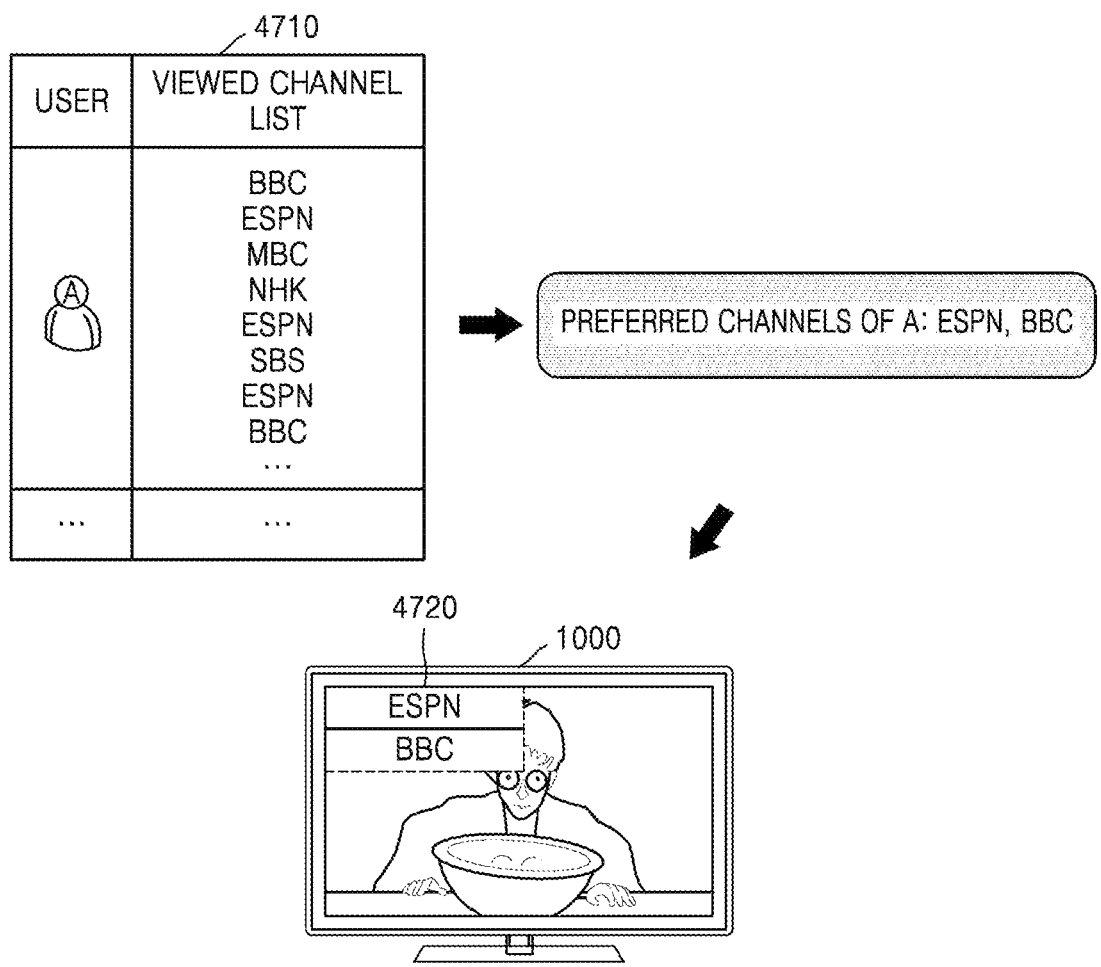
FIG. 47 is a view for explaining a method of determining and displaying preferred channels based on channel histories of users, according to an exemplary embodiment.

FIG. 47 is a view for explaining a method of determining and displaying preferred channels based on channel histories of users, according to an exemplary embodiment.

As shown in FIG. 44, it is assumed that the user A inputting commands via the remote control 4410 is selected. In FIG. 45, a preferred channel list with regard to each user is stored in the content playing apparatus 1200 in advance, and thus, the content playing apparatus 1200 checks preferred channels of the selected user based on the stored preferred channel list. However, in the present exemplary embodiment, a channel history of each user is analyzed to determine preferred channels of each user.

Referring to FIG. 47, the content playing apparatus 1200 analyzes a channel history 4710 of each user. In this case, a list of viewed channels of each user is mapped to an image of each user and is stored in the channel history 4710. The viewed channels stored in the channel history 4710 may be channels viewed by each user for a predetermined time or the predetermined number of channels viewed by each user. A method of forming a channel history may vary. For example, a method of forming a channel history may be formed by using a list of channels viewed by each user at predetermined intervals.

As a result of analyzing the channel history 4710, the content playing apparatus 1200 determines that ESPN and BBC are preferred channels of the user A because ESPN and BBC have been viewed by the user A at least a certain number of times. The content playing apparatus 1200 displays a preferred channel list 4720 of the user A on a screen.

Figure 48:
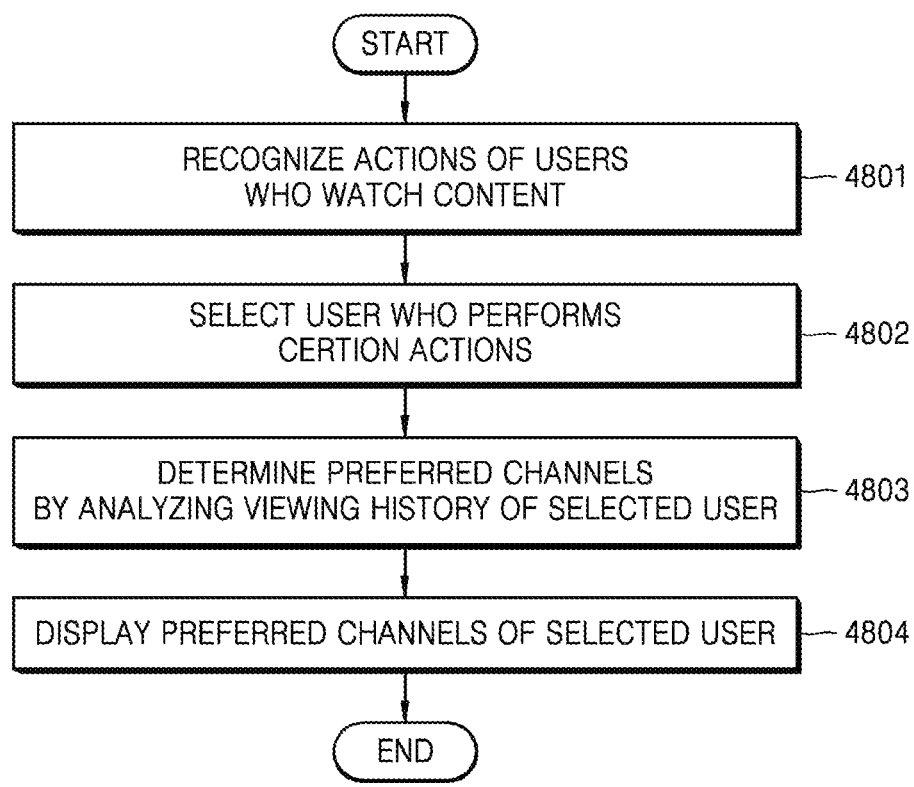
FIG. 48 is a flowchart of a method of determining and displaying preferred channels based on channel histories of users, according to an exemplary embodiment.

FIG. 48 is a flowchart of a method of determining and displaying preferred channels based on channel histories of users, according to an exemplary embodiment.

Referring to FIG. 48, in operation 4801, the user recognition apparatus 1100 and the content playing apparatus 1200 recognize actions of users viewing the content. In this case, the user recognition apparatus 1100 and the content playing apparatus 1200 may recognize the actions as well as faces of the users in order to identify each user.

In operation 4802, the content playing apparatus 1200 selects a user who performs predetermined actions. For example, the content playing apparatus 1200 may select a user inputting commands via a remote control. The content playing apparatus 1200 may select a user based on various actions.

In operation 4803, the content playing apparatus 1200 analyzes a channel history of the selected user and determines preferred channels of the selected user. In detail, the content playing apparatus 1200 analyzes a list of channels viewed by the selected user and may determine that channels, which are viewed by the selected user a certain number of times, are the preferred channels of the selected user.

In operation 4804, the content playing apparatus 1200 displays the preferred channels of the selected user on a screen.

Figure 49:
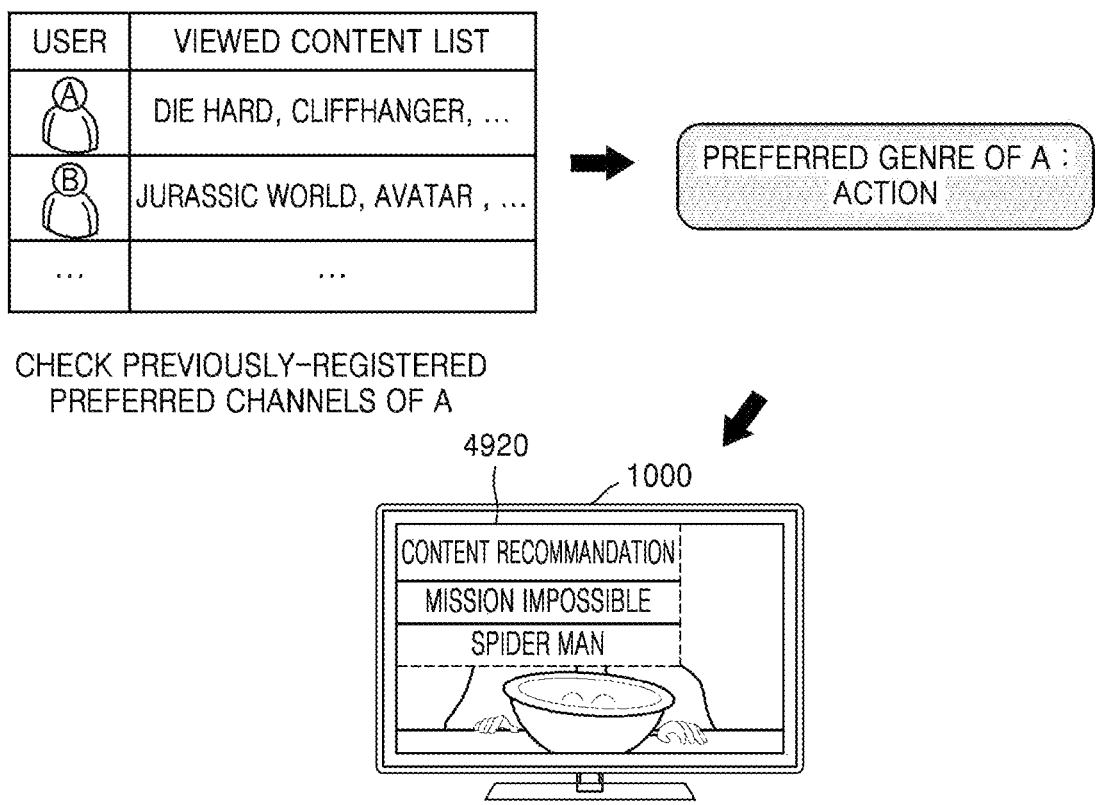
FIG. 49 is a view for explaining a method of determining and displaying preferred content based on a channel history of each user, according to an exemplary embodiment.

FIG. 49 is a view for explaining a method of determining and displaying preferred content based on a channel history of each user, according to an exemplary embodiment.

As shown in FIG. 44, it is assumed that the user inputting commands via the remote control 4410 is selected. FIG. 47 shows that the content playing apparatus 1200 analyzes a list of channels viewed by the users and determines and displays the preferred channels of the selected user. However, in the present exemplary embodiment, the content playing apparatus 1200 analyzes a list of content viewed by the users in order to analyze a genre of preferred content of the selected user and displays, on the display apparatus 1000, another list for recommending other pieces of content included in the preferred genre.

Referring to FIG. 49, the content playing apparatus 1200 analyzes a viewed content list 4910 for each user. In this case, lists of content viewed by the users are respectively mapped to images of the users and are stored in the viewed content lists 4910. The viewed content stored in the viewed content lists 4910 may be content viewed by the users for a predetermined amount of time or a predetermined number of pieces of content viewed by the users. A method of forming a viewed content list may vary, for example, a method of using a list of pieces of content viewed by each user in each time.

The content playing apparatus 1200 determines that a preferred genre of the user A is action based on an analysis of the viewed content list 4910 of the user A. The content playing apparatus 1200 searches for other pieces of content included in the same genre and displays a recommendation list 4920 on the screen.

Figure 50:
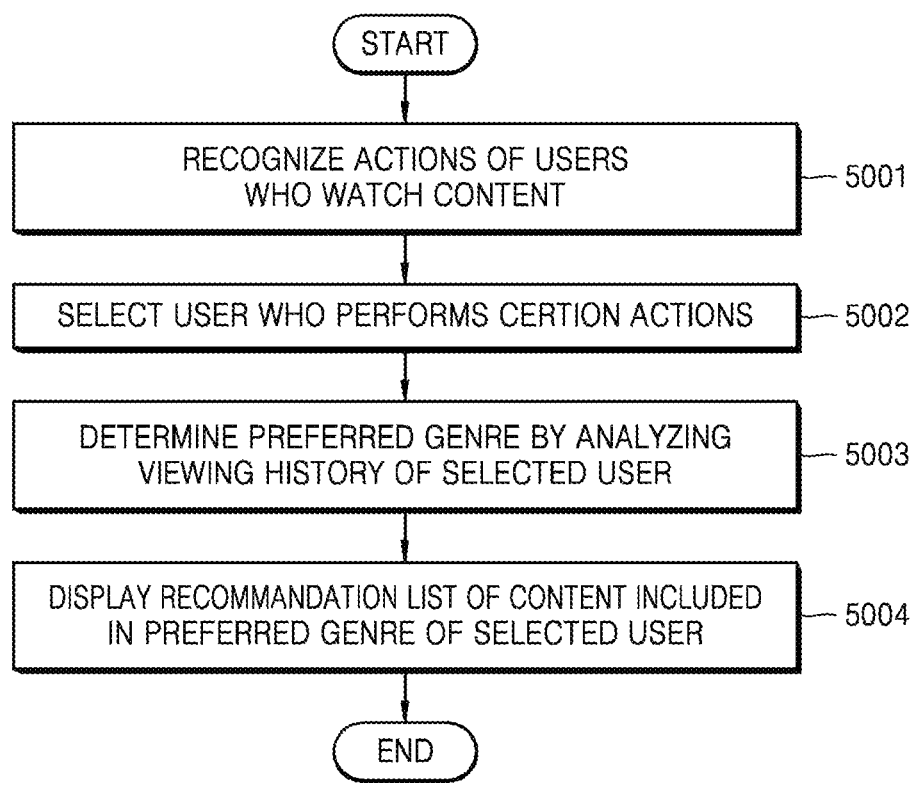
FIG. 50 is a flowchart of a method of determining and displaying preferred content based on channel histories of users, according to an exemplary embodiment

FIG. 50 is a flowchart of a method of determining and displaying preferred content based on channel histories of users, according to an exemplary embodiment.

Referring to FIG. 50, in operation 5001, the user recognition apparatus 1100 and the content playing apparatus 1200 recognize actions of users viewing the content. In this case, the user recognition apparatus 1100 and the content playing apparatus 1200 may recognize the actions as well as faces of the users in order to identify each user.

In operation 5002, the content playing apparatus 1200 selects a user who performs predetermined actions. For example, the content playing apparatus 1200 may select a user inputting commands via a remote control. The content playing apparatus 1200 may select a user based on various actions.

In operation 5003, the content playing apparatus 1200 determines a preferred genre of the selected user based on analysis of a channel history of the selected user. In detail, the content playing apparatus 1200 analyzes a list of pieces of content viewed by the selected user and determines a genre of preferred content of the selected user.

In operation 5004, the content playing apparatus 1200 displays a recommendation list of content included in the preferred genre of the selected user.

Figure 51:
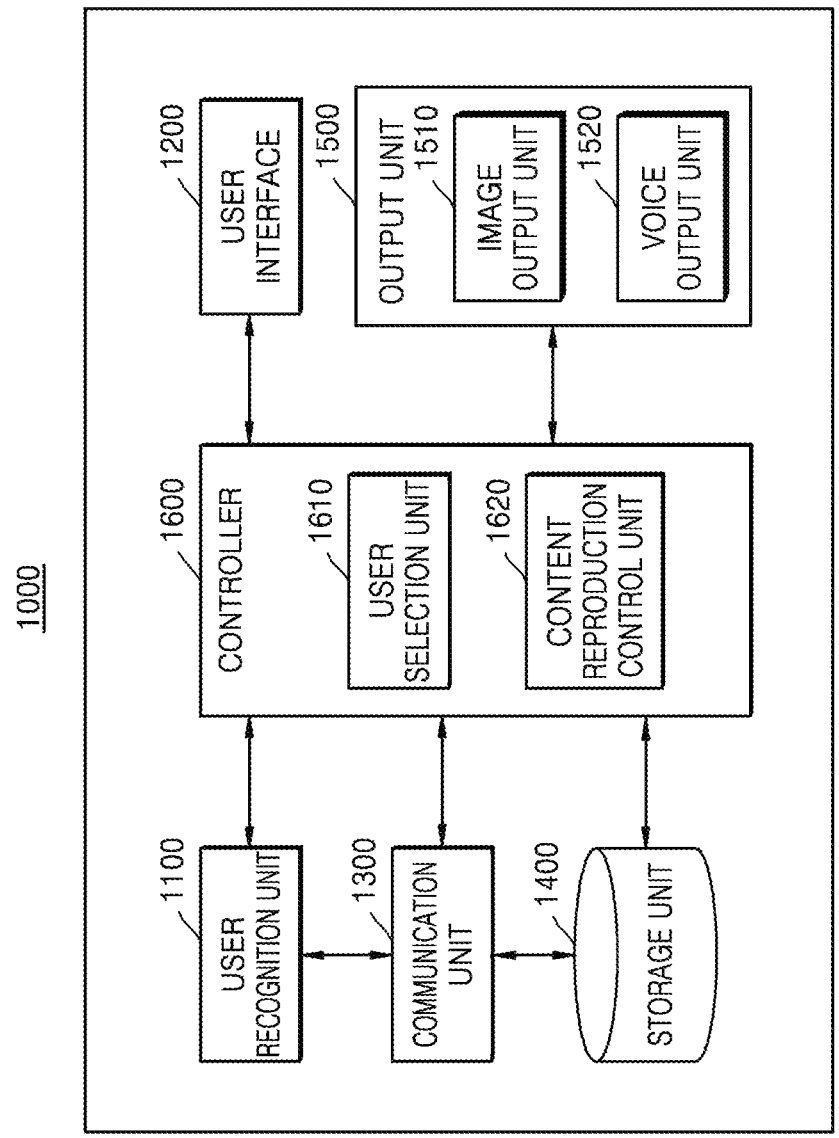
FIG. 51 is a view of a structure of a display apparatus configured to support a content playing control function, according to an exemplary embodiment.

FIG. 51 is a block diagram of a structure of a display apparatus configured to support a content playing control function, according to an exemplary embodiment.

As described above, the above-described processes of controlling the playing of the content may be performed by the content playing apparatus separate from the display apparatus, but all processes may be performed by the display apparatus. In this case, the playing of the content may be controlled by a single apparatus.

Referring to FIG. 51, the display apparatus 1000 may include the user recognition apparatus 1100, a user interface 5160, a communication unit 5130, a storage unit 5140, an output unit 5170, and a controller 5150.

The user recognition apparatus 1100 may recognize users viewing the content. In this case, recognition means identifying the existence of an object or extracting and analyzing characteristics of the object. The user recognition apparatus 1100 may include a detection unit (not shown) for detecting images or voices of users and an analysis unit (not shown) for analyzing the detected images or voices. The detection unit may be a camera, a micro phone, etc. included in the display apparatus 1000, and the analysis unit may be a processor or the like configured to analyze images or voices.

The user interface 5160 is configured to receive various user inputs and may be a manipulation button, a remote control, or the like.

The communication unit 5130 is configured to receive/transmit data from/to a server and may receive content from an external server, etc. via wired or wireless communication.

The storage unit 5140 stores data and may store content transmitted by an external device, age information of users, preferred channel lists of the users, or the like.

The output unit 5170 may include an image output unit 5172 and a voice output unit 5175. Images and voices of content played by the display apparatus 1000 are respectively output through the image output unit 5172 and the voice output unit 5175.

The controller 5150 controls overall operations of components included in the display apparatus 1000. The controller 5150 may be a micro processor, etc. The controller 5150 may include a recognition manager 5152 and a restriction manager 5155.

The recognition manager 5155 may perform user recognition by using captured images or voices of the users which are received from the user recognition apparatus 1100 and may select at least one of the users according to predetermined criteria. In detail, the recognition manager 5152 recognizes portions corresponding to faces of the users from the captured images, analyzes symmetric facial structures, appearances, hair, colors of the eyes, movements of facial muscle, etc. of the users, and extracts facial characteristics of the users. Then, the recognition manager 5152 may compare the extracted facial characteristics with age information of the users which is stored in the storage unit 5140 and may determine the ages of the users. In this case, the age information of the users may be in a form in which the ages of the users are respectively mapped to the images of the users.

Alternatively, the recognition manager 5152 may analyze body shapes of the users from the images transmitted by the user recognition apparatus 1100 or may analyze voices of the users which are transmitted by the user recognition apparatus 1100 in order to compare the analyzed voices with the age information and determine the ages of the users. In this case, the age information of the users may be in a form in which the ages of the users are respectively mapped to the body shapes or voices of the users.

Alternatively, the recognition manager 5152 may analyze the images or voices of the users which are transmitted by the user recognition apparatus 1100 and compare the analyzed images or voices with facial characteristics, body shapes, or voices of age groups, which are stored in the storage unit 5140 in advance, so as to determine the ages of the users.

Alternatively, the recognition manager 5152 may analyze actions of the users from the images transmitted by the user recognition apparatus 1100.

Alternatively, the recognition manager 5152 may recognize a change of the number of users viewing the content and may predict that another user is to be added based on analysis of conversations between the users.

Meanwhile, the recognition manager 5152 may select a user according to the predetermined criteria, for example, the youngest user or a user who performs a certain action. The recognition manager 5152 may select a user according to various criteria other than the above criteria.

The restriction manager 5155 controls playing of the content according to the selected user. For example, when the youngest user is selected, the restriction manager 5155 compares the age of the selected user against a viewing rating of the content and may control playing of pieces of the content that the selected user is not able to view. In this case, the restriction manager 5155 may receive the viewing rating from a content provider, but may determine the viewing rating based on analysis of the content if the viewing rating is not provided.

Components of the display apparatus 1000 may perform the operations for implementing the methods of controlling the playing of the content, which are described with reference to FIGS. 1 to 50, even through some of the operations are not described with reference to FIG. 51.

The embodiment in which the processes of controlling the playing of the content, which are directly performed by the display apparatus 1000, for example, a TV, having a display function, has been described with reference to FIG. 51. However, processes of recognizing the users, determining whether to restrict viewing the content, restricting the viewing of the content, etc. may be performed by a separate device or an external server.

Hereinafter, embodiments in which processes used to control the playing of the content are performed by a device, a server, or the like, which is connected to the display apparatus will be described with reference to FIGS. 52 to 58.

Figure 52:
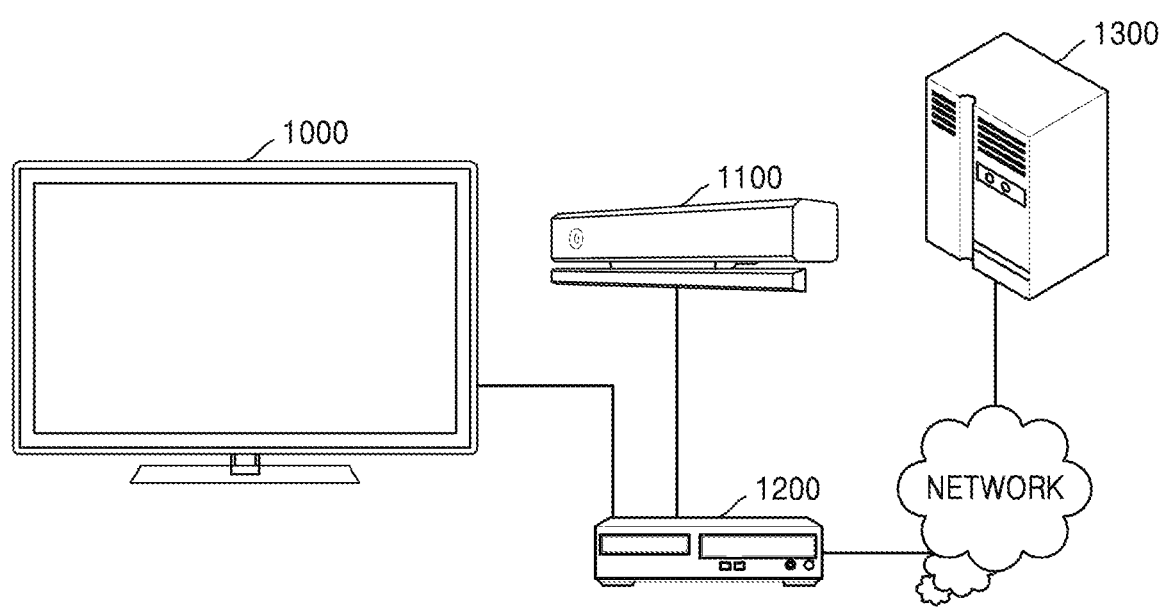
FIG. 52 is a view of a system for controlling playing of content, according to an exemplary embodiment.

FIG. 52 is a view of a system for controlling playing of content, according to an exemplary embodiment. Referring to FIG. 52, the system may include the display apparatus 1000, the user recognition apparatus 1100, the content playing apparatus 1200, and a server 1300. A detailed structure and operation of each component of the system will be described with reference to FIGS. 53 and 54.

Figure 53:
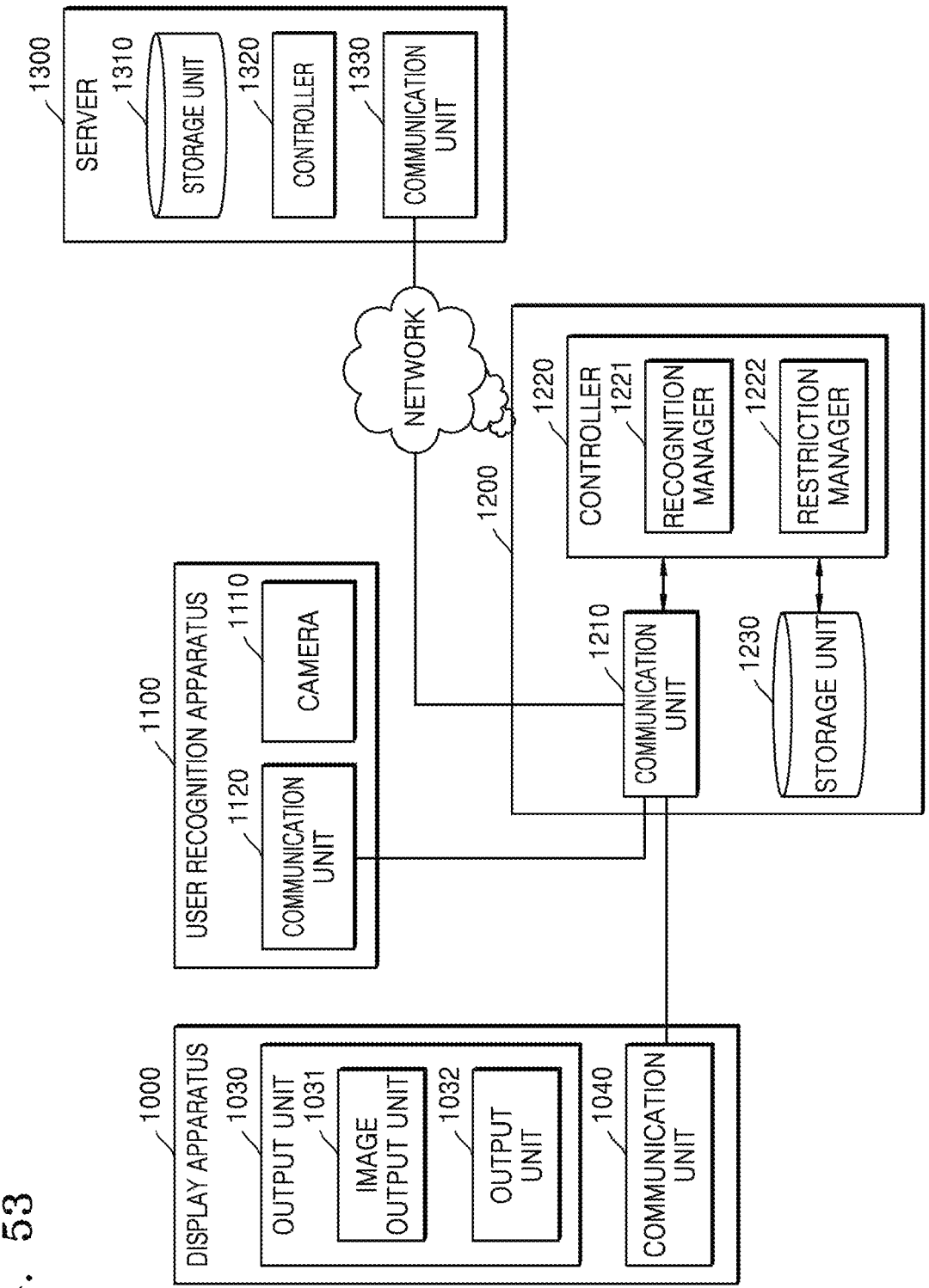
FIG. 53 is a view of detailed structures of devices included in the system of FIG. 52, according to an exemplary embodiment.

FIG. 53 is a view of detailed structures of the devices included in the system of FIG. 52, according to an exemplary embodiment. While devices necessary to perform the present exemplary embodiment are illustrated in FIG. 53, the system may further include common devices other than the illustrated devices.

In the system of FIG. 53, the content playing apparatus 1200 performs all processes such as processes of recognizing users, determining whether to restrict content, and restricting the content. In this case, the server 1300 provides the content playing apparatus 1200 with content to be played, and the user recognition apparatus 1100 transmits captured images of the users to the content playing apparatus 1200.

Referring to FIG. 53, the display apparatus 1000 may include the communication unit 1040 and the output unit 1030. The output unit 1030 may include the image output unit 1031 and the voice output unit 1032. The image output unit 1031 may be, for example, a liquid crystal display (LCD), an organic light-emitting diode (OLED) display having a screen that displays content. The voice output unit 1032 may be, for example, a speaker. The display apparatus 1000 receives, from the content playing apparatus 1200, data used to play the content via the communication unit 1040 and may output the received data to the output unit 1030 as images or voices.

The user recognition apparatus 1100 may include a camera 1111 for capturing images and a communication unit 1120 for transmitting the captured images. Also, the user recognition apparatus 1100 may further include a voice detection unit (not shown) for detecting voices of the users. The user recognition apparatus 1100 may be embodied as an apparatus separated from the display apparatus 1000 or a camera installed in a frame of the display apparatus 1000. Detailed descriptions thereof will be provided below with reference to FIGS. 55 and 56.

The content playing apparatus 1200 may include a communication unit 1210, a controller 1220, and a storage unit 1230, and the controller 1220 may include a recognition manager 1221 and a restriction manager 1222.

The communication unit 1210 receives the images from the user recognition apparatus 1100 and transmits the received images to the controller 1220, and also receives content from the server 1300 and transmits the received content to the controller 1220. The controller 1220 may perform processes of recognizing the users, determining whether to restrict the content, and restricting the content. The recognition manager 1221 receives, from the user recognition apparatus 1100, images of the users viewing the content and may recognize faces, body shapes, or the like, of the users from the received images. Alternatively, the recognition manager 1221 may analyze voices of the users received from the user recognition apparatus 1100.

When the users are recognized, the recognition manager 1221 may select at least one of the users according to predetermined criteria. For example, the recognition manager 1221 may select the youngest user or a user who performs a certain action.

When the selection is completed by the recognition manager 1221, the restriction manager 1222 controls playing of the content according to the selected user. For example, the restriction manager 1222 compares the age of the selected user against a viewing rating of the content in order to determine whether the selected user is allowed to view the content. If the selected user is not allowed to view the content, the restriction manager 1222 may stop playing of the content or reprocess the content and transmits the reprocessed content to the display apparatus 1000.

The controller 1220 may use information, which is necessary to perform the processes of recognizing the users, determining whether to restrict the content, restricting the content, etc., by accessing the storage unit 1230. User information required to recognize the users and select a reference user as well as content-related information required to determine whether to restrict the content may be stored in the storage unit 1230.

The server 1300 may include a communication unit 1330, a controller 1320, and a storage unit 1310. The communication unit 1330 of the server 1300 may be connected to the communication unit 1210 of the content playing apparatus 1200 via a network such as Internet.

When a content request is received from the content playing apparatus 1200, the controller 1320 of the server 1300 extracts a piece of content which is requested from among pieces of content and transmits the extracted piece to the content playing apparatus 1200.

The content playing apparatus 1200 transmits content playing data that is controlled to the communication unit 1040 of the display apparatus 1000 via the communication unit 1210, and the display apparatus 1000 converts the received content playing data and may output images and voices to the output unit 1030.

Figure 54:
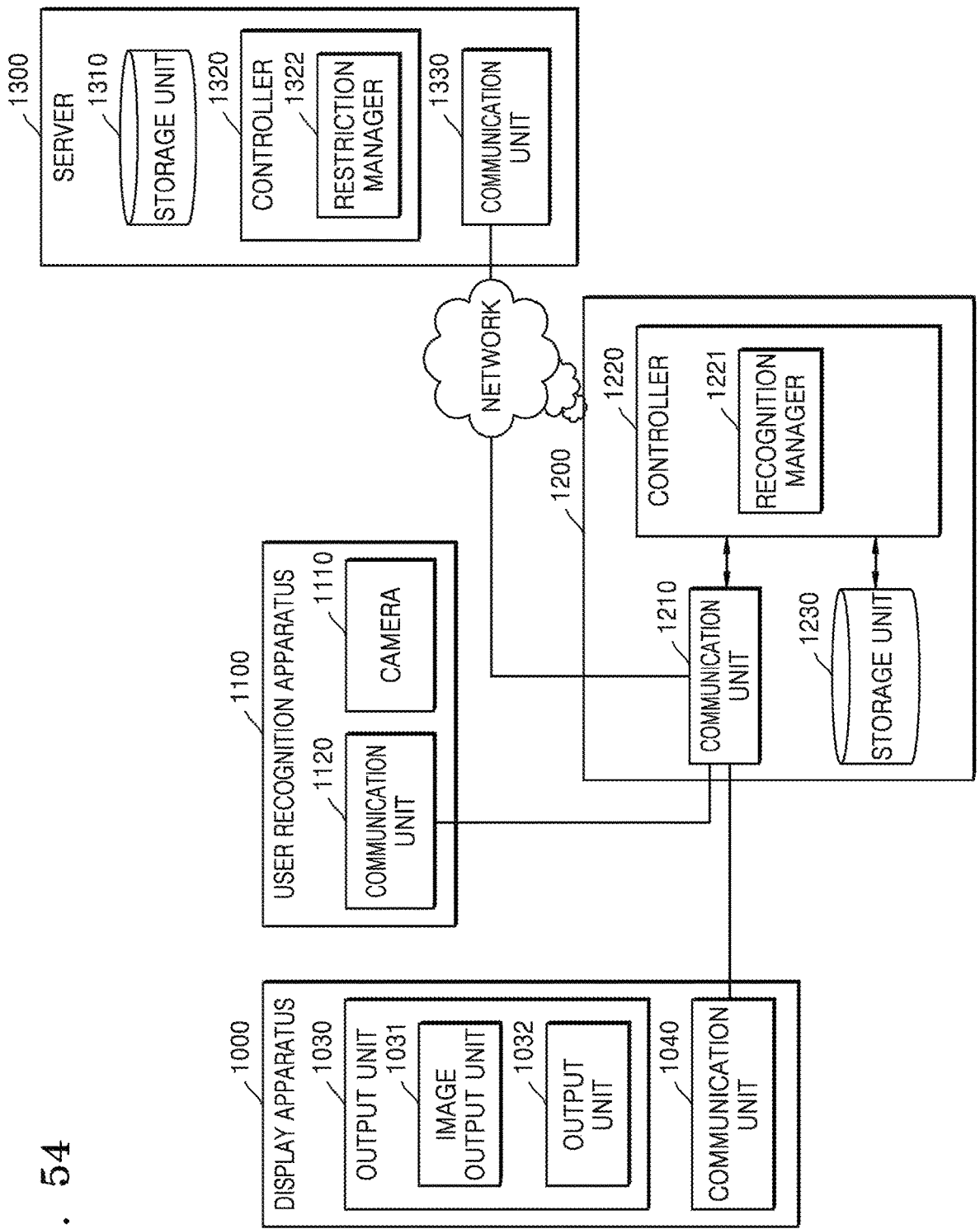
FIG. 54 is a view of detailed structures of devices included in the system of FIG. 52, according to another exemplary embodiment.

FIG. 54 is a view of detailed structures of the devices included in the system of FIG. 52, according to another exemplary embodiment. While devices necessary to perform the present exemplary embodiment are illustrated in FIG. 54, the system may further include common devices other than the illustrated devices.

In the system of FIG. 54, the content playing apparatus 1200 and the server 1300 perform processes for controlling playing of content. In detail, the content playing apparatus 1200 recognizes users, and the server 1300 determines whether to restrict the content based on a recognition result and restricts the content. In this case, the user recognition apparatus 1100 transmits captured images of the users to the content playing apparatus 1200.

Referring to FIG. 54, the display apparatus 1000 may include the communication unit 1040 and the output unit 1030, and the output unit 1030 may include the image output unit 1031 and the voice output unit 1032. The image output unit 1031 may be, for example, an LCD, an OLED display having a screen that displays content. The voice output unit 1032 may be, for example, a speaker. The display apparatus 1000 receives, from the content playing apparatus 1200, data used to play the content via the communication unit 1040 and may output the received data to the output unit 1030 as images or voices.

The user recognition apparatus 1100 may include the camera 1111 for capturing images and the communication unit 1120 for transmitting the captured images. Also, the user recognition apparatus 1100 may further include the voice detection unit (not shown) for detecting voices of the users. The user recognition apparatus 1100 may be embodied as an apparatus separated from the display apparatus 1000 or a camera installed in a frame of the display apparatus 1000. Detailed descriptions thereof will be provided below with reference to FIGS. 55 and 56.

The content playing apparatus 1200 may include the communication unit 1210, the controller 1220, and the storage unit 1230, and the controller 1220 may include the recognition manager 1221.

The communication unit 1210 receives the images from the user recognition apparatus 1100 and transmits the received images to the controller 1220, and also receives content from the server 1300 and transmits the received content to the controller 1220.

The controller 1220 may recognize the users and select a user. The recognition manager 1221 receives, from the user recognition apparatus 1100, images of the users viewing the content and may recognize faces, body shapes, or the like, of the users from the received images. Alternatively, the recognition manager 1221 may analyze voices of the users received from the user recognition apparatus 1100.

When the users are recognized, the recognition manager 1221 may select at least one of the users according to predetermined criteria. For example, the recognition manager 1221 may select the youngest user or a user who performs a certain action. When the selection is completed by the recognition manager 1221, the controller 1220 may transmit a user recognition result and a user selection result to the server 1300 via the communication unit 1210.

The controller 1220 may use the information, which is necessary to perform the processes of recognizing the users, selecting a user, etc., by accessing the storage unit 1230. User information required to recognize the users and select a user may be stored in the storage unit 1230.

The server 1300 may include the communication unit 1330, the controller 1320, and the storage unit 1310, and the controller 1320 may include a restriction manager 1322. The communication unit 1330 of the server 1300 may be connected to the communication unit 1210 of the content playing apparatus 1200 via a network such as Internet.

When a content request is received from the content playing apparatus 1200, the controller 1320 of the server 1300 extracts a piece of content which is requested from among pieces of content and transmits the extracted piece to the content playing apparatus 1200.

In this case, the restriction manager 1322 included in the controller 1320 of the server 1300 controls the playing of the content according to the selected user. For example, the restriction manager 1322 compares the age of the selected user against a viewing rating of the content in order to determine whether the selected user is allowed to view the content. If the selected user is not allowed to view the content, the restriction manager 1322 may stop playing the content or reprocess the content and transmit the reprocessed content to the content playing apparatus 1200.

The content playing apparatus 1200 transmits content playing data that is controlled to the communication unit 1040 of the display apparatus 1000 via the communication unit 1210, and the display apparatus 1000 converts the received content playing data and may output images and voices to the output unit 1030.

Figure 55:
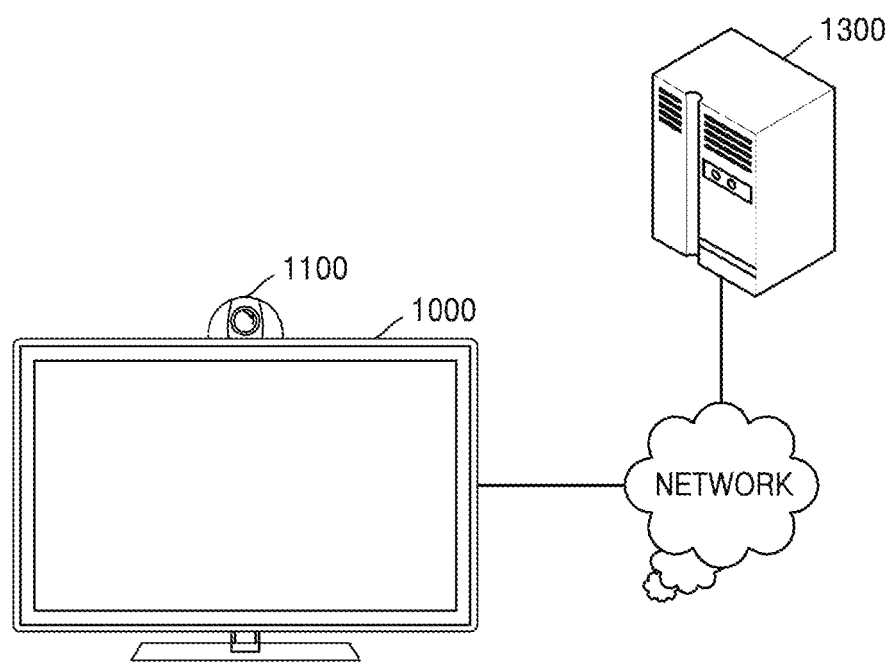
FIG. 55 is a view of a system configured to control playing of content, according to an exemplary embodiment.

FIG. 55 is a view of a system configured to control playing of content, according to an exemplary embodiment. Referring to FIG. 55, the system may include the display apparatus 1000 and the server 1300. Also, the display apparatus 1000 may include the user recognition apparatus 1100. A detailed structure and operation of each component of the system will be described with reference to FIG. 56.

Figure 56:
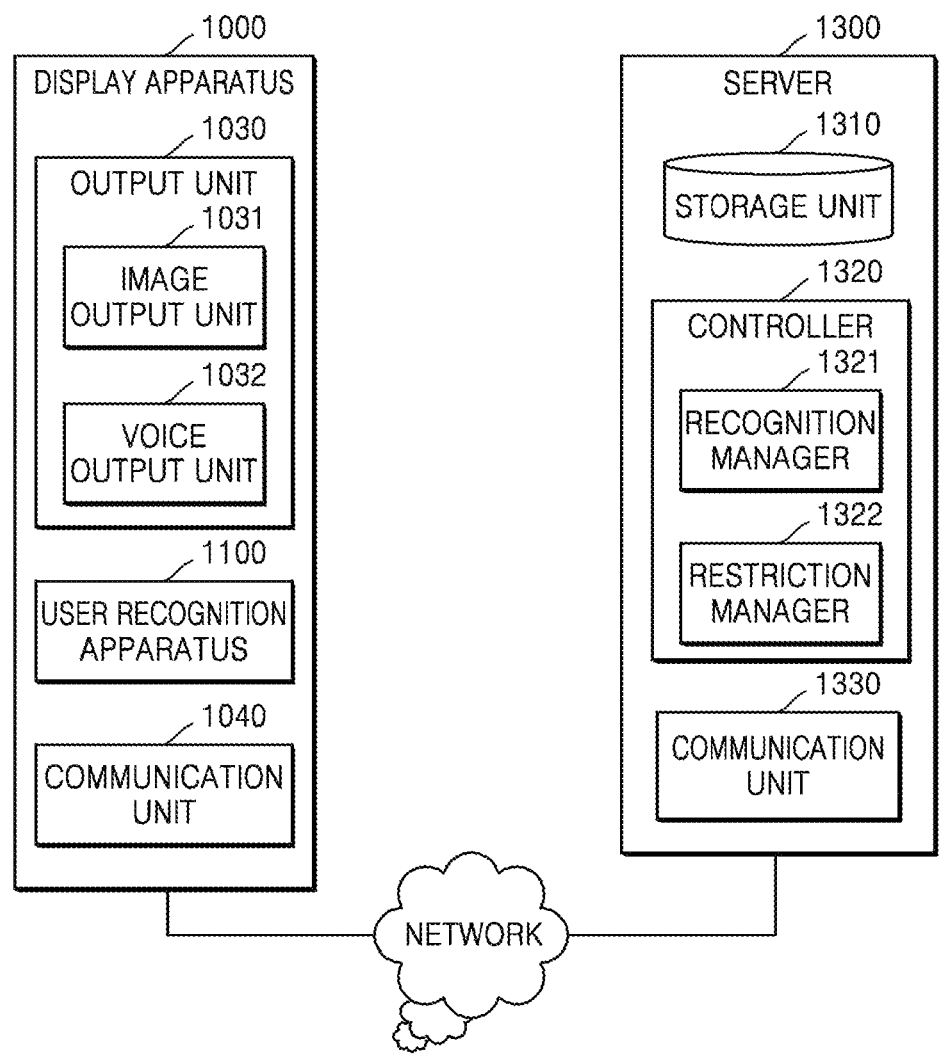
FIG. 56 is a view of detailed structures of devices included in the system of FIG. 55, according to an exemplary embodiment.

FIG. 56 is a view of detailed structures of devices included in the system of FIG. 55, according to an exemplary embodiment. While devices necessary to perform the present exemplary embodiment are illustrated in FIG. 56, the system may further include common devices other than the illustrated devices.

In the system of FIG. 56, the server 1300 performs all processes such as processes of recognizing users, selecting a user, determining whether to restrict content, and restricting the content without a separate device for playing content.

Referring to FIG. 56, the display apparatus 1000 may include the communication unit 1040 and the output unit 1030 as shown in FIG. 53 and may further include the user recognition apparatus 1100. Therefore, the user recognition apparatus 1100 captures images of the users, and the captured images are transmitted to the server 1300 via the communication unit 1040.

Operations of the communication unit 1040 and the output unit 1030 of the display apparatus 1000 are the same as described with reference to FIG. 53, and thus, repeated descriptions will be omitted.

The server 1300 may include the communication unit 1330, the controller 1320, and the storage unit 1310. The controller 1320 may include the recognition manager 1321 and the restriction manager 1322. The communication unit 1330 of the server 1300 may be connected to the communication unit 1040 of the display apparatus 1000 via a network such as the Internet.

When a content request is received from the display apparatus 1000, the controller 1320 extracts a piece of content which is requested from among pieces of content and transmits the extracted piece to the display apparatus 1000 via the communication unit 1330. In this case, the recognition manager 1321 and the restriction manager 1322 perform the processes of recognizing the users, selecting a user, determining whether to restrict content, and restricting the content by using captured images of the users which are received from the display apparatus 1000.

When the images of the users viewing the content are received from the display apparatus 1000, the recognition manager 1321 may analyze faces, body shapes, or the like, of the users from the received images. Alternatively, the recognition manager 1321 may analyze voices of the users received from the display apparatus 1000.

When the users are recognized, the recognition manager 1321 may select at least one of the users according to the predetermined criteria, for example, the youngest user or a user who performs a certain action.

When the selection is completed by the recognition manager 1321, the restriction manager 1322 controls playing of the content according to the selected user. For example, the restriction manager 1322 compares the age of the selected user against a viewing rating of the content in order to determine whether the selected user is allowed to view the content. If the selected user is not allowed to view the content, the restriction manager 1322 may stop playing of the content or reprocess the content and transmit the reprocessed content to the display apparatus 1000.

The controller 1320 may use information, which is necessary to perform the processes of recognizing the users, selecting a user, determining whether to restrict the content, restricting the content, etc., by accessing the storage unit 1310. User information required to recognize the users and select a reference user as well as content-related information required to determine whether to restrict the content may be stored in the storage unit 1310.

Figure 57:
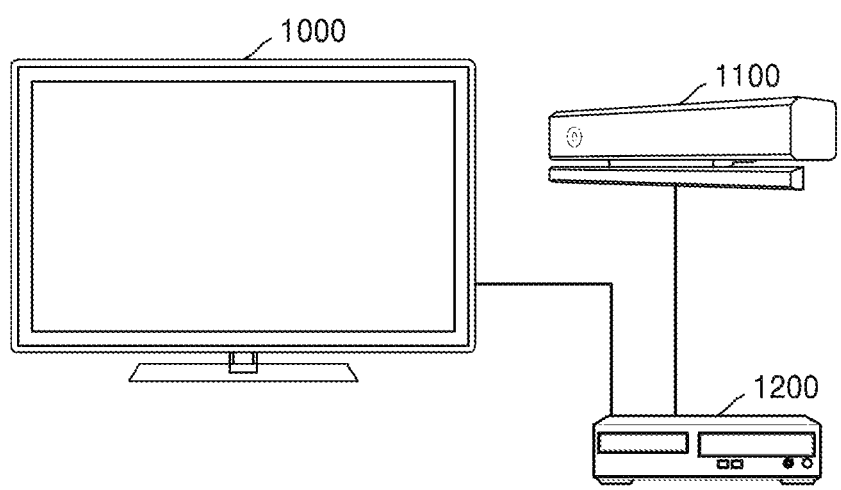
FIG. 57 is a view of a system for controlling playing of content, according to an exemplary embodiment.

FIG. 57 is a view of a system for controlling playing of content, according to an exemplary embodiment. Referring to FIG. 57, the system may include the display apparatus 1000, the user recognition unit 1100, and the content playing apparatus 1200. The system of FIG. 57 does not include a server, and the content playing apparatus 1200 directly provides content and controls playing of the content. A detailed structure and operation of each component of the system will be described with reference to FIG. 58.

Figure 58:
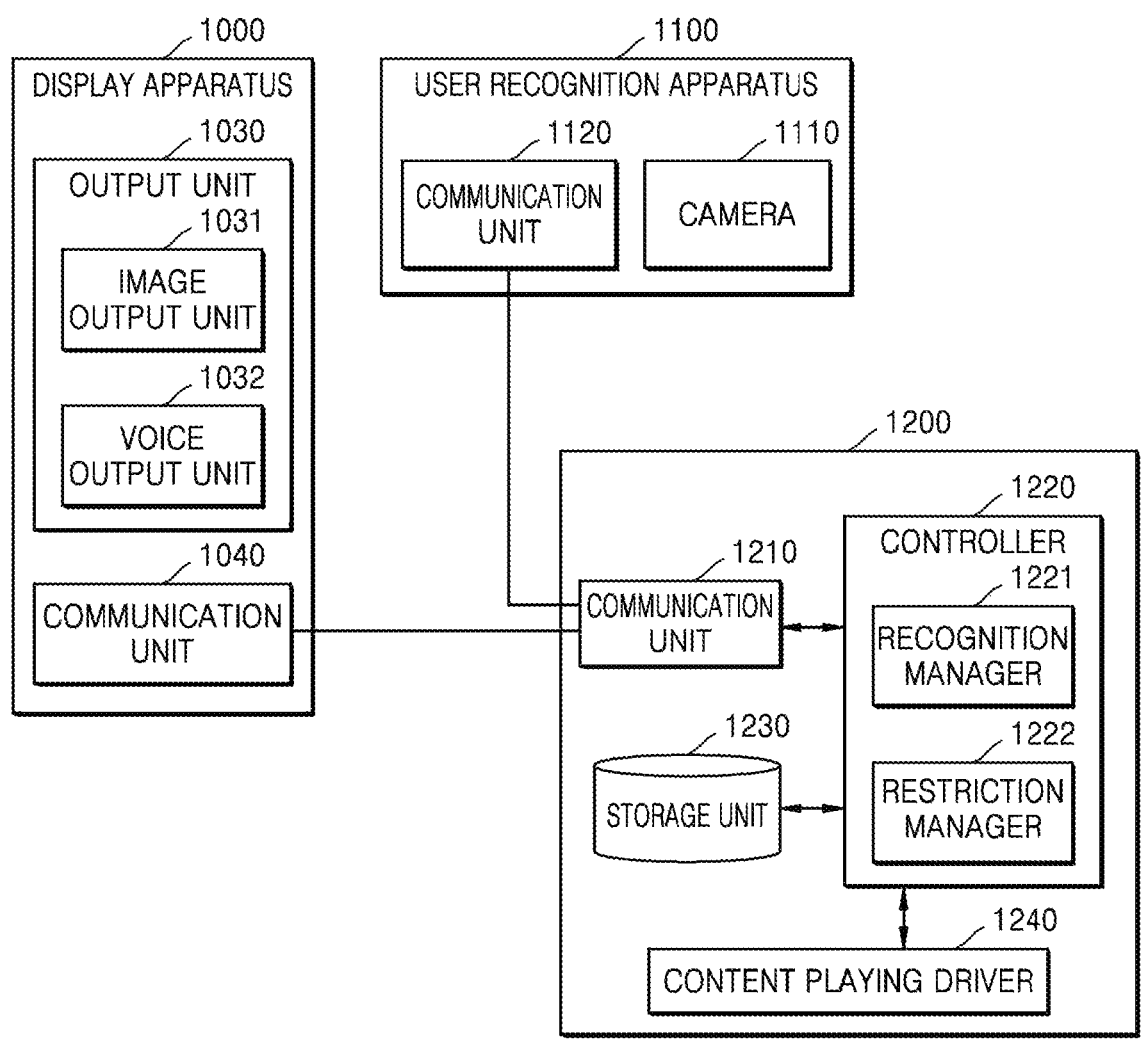
FIG. 58 is a view of detailed structures of devices included in the system of FIG. 57, according to an exemplary embodiment.

FIG. 58 is a view of detailed structures of devices included in the system of FIG. 57, according to an exemplary embodiment. While devices necessary to perform the present exemplary embodiment are illustrated in FIG. 58, the system may further include common devices other than the illustrated devices. The system of FIG. 58 does not include a server, and the content playing apparatus 1200 directly provides content and controls playing of the content. That is, the content playing apparatus 1200 directly provides content by using a content playing driver 1240 without receiving content from an external server. In this case, the content playing driver 1240 is configured to play content recorded in a storage medium such as a CD/DVD driver or a universal serial bus (USB) driver.

Referring to FIG. 58, the display apparatus 1000 may include the communication unit 1040 and the output unit 1030. The output unit 1030 may include the image output unit 1031 and the voice output unit 1032. The image output unit 1031 may be, for example, an LCD, an OLED display having a screen that displays content. The voice output unit 1032 may be, for example, a speaker. The display apparatus 1000 receives, from the content playing apparatus 1200, data used to play the content via the communication unit 1040 and may output the received data to the output unit 1030 as images or voices.

The user recognition apparatus 1100 may include the camera 1111 for capturing images and the communication unit 1120 for transmitting the captured images. Also, the user recognition apparatus 1100 may further include the voice detection unit (not shown) for detecting voices of the users. The user recognition apparatus 1100 may be embodied as an apparatus separated from the display apparatus 1000 or a camera installed in a frame of the display apparatus 1000. Detailed descriptions thereof have been provided with reference to FIGS. 55 and 56.

The content playing apparatus 1200 may include the communication unit 1210, the controller 1220, and the storage unit 1230, and the controller 1220 may include the recognition manager 1221 and the restriction manager 1222.

The communication unit 1210 receives the images from the user recognition apparatus 1100 and transmits the received images to the controller 1220, and also receives content from the controller 1120 and transmits the received content to the display apparatus 1000.

The controller 1220 may perform processes of recognizing the users, determining whether to restrict the content, and restricting the content. The recognition manager 1221 receives, from the user recognition apparatus 1100, images of the users viewing the content and may recognize faces, body shapes, or the like, of the users from the received images. Alternatively, the recognition manager 1221 may analyze voices of the users received from the user recognition apparatus 1100.

When the users are recognized, the recognition manager 1221 may select at least one of the users according to predetermined criteria. For example, the recognition manager 1221 may select the youngest user or a user who performs a certain action.

When the selection is completed by the recognition manager 1221, the restriction manager 1222 controls playing of the content from the content playing driver 1240 according to the selected user. For example, the restriction manager 1222 compares the age of the selected user against a viewing rating of the content in order to determine whether the selected user is allowed to view the content. If the selected user is not allowed to view the content, the restriction manager 1222 may stop playing of the content or reprocess the content and transmits the reprocessed content to the display apparatus 1000.

The controller 1220 may use information, which is necessary to perform the processes of recognizing the users, determining whether to restrict the content, restricting the content, etc., by accessing the storage unit 1230. User information required to recognize the users and select a reference user as well as content-related information required to determine whether to restrict the content may be stored in the storage unit 1230.

While the inventive concept has been particularly shown and described with reference to preferred exemplary embodiments thereof, it will be understood by those skilled in the art that various changes in form and details may be made therein without departing from the spirit and scope of the inventive concept as defined by the appended claims. The preferred exemplary embodiments should be considered in descriptive sense only and not for purposes of limitation. Therefore, the scope of the inventive concept is defined not by the detailed description of the inventive concept but by the appended claims, and all differences within the scope will be construed as being included in the inventive concept.

The exemplary embodiments of the inventive concept can be written as computer programs and can be implemented in general-use digital computers that execute the programs using a computer-readable recording medium. Examples of the computer-readable recording medium include magnetic storage media (e.g., ROM, floppy disks, hard disks, etc.), optical recording media (e.g., CD-ROMs, or DVDs), etc.

What is claimed is:

1. A content playing system comprising:
an output device including a display and a speaker; and
one or more controllers, each including a processor, configured to:
recognize a plurality of users viewing content being output by the output device based on one or more captured images including the users,
receive at least one voice signal including at least one voice of at least one user, via a microphone,
perform voice recognition on the at least one voice signal to recognize content of a conversation of the at least one user,
predict an additional user, not included in the plurality of recognized users, who will be expected to view the content being output, based on analysis of the conversation content to identify information representing the predicted additional user, and
control playing of the content being output according to a youngest age determined by comparing a predicted age of the predicted additional user with ages of the plurality of recognized users,
wherein the at least one user is selected from among the plurality of recognized users and the predicted additional user.

2. The content playing system of claim 1, wherein the one or more controllers are configured to determine a viewing rating based on analysis of the content being output and compare the determined viewing rating against the predicted age of the predicted additional user in order to determine whether to output some or all of the content.

3. The content playing system of claim 1, wherein the one or more controllers are configured to detect a change in the number of users viewing the content being output, and
repeat the recognizing, receiving, performing, predicting, and controlling when the number of users changes.

4. The content playing system of claim 1, wherein the one or more controllers are further configured to recognize activities of the plurality of recognized users, select at least one recognized user performing a predetermined activity, and control output of the content according to a preference of the at least one recognized user selected by performing the predetermined activity.

5. The content playing system of claim 4, wherein the one or more controllers are configured to generate for display, on the output device, a list of channels or a list of content preferred by the at least one recognized user selected by performing the predetermined activity.

6. The content playing system of claim 1, wherein the information representing the predicted additional user includes a suggestion by the at least one user for the predicted additional user to view the content being output.

7. A method of controlling playing of content on an output device including a display and a speaker, the method comprising:
recognizing a plurality of users viewing the content being output by the output device based on one or more captured images including the users;
receiving at least one voice signal including at least one voice of at least one user, via a microphone,
performing voice recognition on the at least one voice signal to recognize content of a conversation of the at least one user,
predicting an additional user, not included in the plurality of recognized users, who will be expected to view the content being output, based on analysis of the conversation content to identify information representing the predicted additional user, and
controlling playing of the content being output according to a youngest age determined by comparing a predicted age of the predicted additional user with ages of the plurality of recognized users,
wherein the at least one user is selected from among the plurality of recognized users and the predicted additional user.

8. The method of claim 7, wherein the controlling comprises:
determining a viewing rating based on analysis of the content being output;
comparing the determined viewing rating against the predicted age of the predicted additional user in order to determine whether to output some or all of the content.

9. The method of claim 7, wherein the recognizing, receiving, performing, predicting, and controlling are performed whenever the number of users viewing the content changes.

10. The method of claim 7, wherein the recognizing, receiving, performing, predicting, and controlling are performed whenever the content being output changes.

11. A computer program product comprising a non-transitory computer-readable storage medium configured to store one or more computer programs including instructions that, when executed by at least one processor, cause the at least one processor to control to perform the method of claim 7.

12. The method of claim 7, wherein the information representing the predicted additional user includes a suggestion by the at least one user for the predicted additional user to view the content being output.

13. A system for controlling output of content by an output device including one or both of a display and a speaker, the system including:
one or more controllers configured to:
recognize users viewing and/or listening to the content being output based on one or more captured images including the users,
receive at least one voice signal including at least one voice of at least one user, via a microphone,
perform voice recognition on the at least one voice signal to recognize content of a conversation of the at least one user, predict an additional user, not included in the plurality of recognized users, who will be expected to view and/or listen to the content based on analysis of the conversation content to identify information representing the predicted additional user, and control playing of the content being output according to a youngest age determined by comparing a predicted age of the predicted additional user with ages of the plurality of recognized users, wherein the at least one user is selected from among the plurality of recognized users and the predicted additional user.

14. The system of claim 13, further comprising:
a camera for capturing images of the users for use by the one or more controllers in recognizing the users.

15. The system of claim 13, wherein the information representing the predicted additional user includes a suggestion by the at least one user for the predicted additional user to view the content being output.

* * * * *